(12) United States Patent
Murata et al.

(10) Patent No.: US 11,149,562 B2
(45) Date of Patent: *Oct. 19, 2021

(54) METHOD FOR DISASSEMBLING/ASSEMBLING GAS TURBINE, SEAL PLATE ASSEMBLY, AND GAS TURBINE ROTOR

(71) Applicant: Mitsubishi Hitachi Power Systems, Ltd., Kanagawa (JP)

(72) Inventors: Masahiro Murata, Yokohama (JP); Eiichi Tsutsumi, Yokohama (JP); Yoshimasa Takaoka, Yokohama (JP); Shinya Hashimoto, Yokohama (JP); Naoki Ikushima, Yokohama (JP); Tetsuya Shimmyo, Yokohama (JP)

(73) Assignee: MITSUBISHI POWER, LTD., Kanagawa (JP)

(*) Notice: Subject to any disclaimer, the term of this patent is extended or adjusted under 35 U.S.C. 154(b) by 145 days.

This patent is subject to a terminal disclaimer.

(21) Appl. No.: 16/463,906

(22) PCT Filed: Dec. 13, 2017

(86) PCT No.: PCT/JP2017/044657
§ 371 (c)(1),
(2) Date: May 24, 2019

(87) PCT Pub. No.: WO2018/110581
PCT Pub. Date: Jun. 21, 2018

(65) Prior Publication Data
US 2019/0292926 A1    Sep. 26, 2019

(30) Foreign Application Priority Data
Dec. 13, 2016  (JP) .............................. JP2016-241693

(51) Int. Cl.
F01D 5/30 (2006.01)
F01D 25/28 (2006.01)
(Continued)

(52) U.S. Cl.
CPC ............. *F01D 5/30* (2013.01); *F01D 5/3007* (2013.01); *F01D 5/3015* (2013.01); *F01D 11/00* (2013.01);
(Continued)

(58) Field of Classification Search
CPC . F01D 5/323; F01D 5/326; F01D 5/32; F01D 11/006; F01D 5/3015;
(Continued)

(56) References Cited

U.S. PATENT DOCUMENTS 3,010,696 A * 11/1961 Everett ..................... F01D 5/30
                                                    416/97 R
3,266,770 A *  8/1966 Harlow ..................... F01D 5/22
                                                    416/92
(Continued)

FOREIGN PATENT DOCUMENTS

| CN | 103388492 | 11/2013 |
| CN | 104956034 | 9/2015 |

(Continued)

OTHER PUBLICATIONS

Office Action dated Apr. 7, 2020 in corresponding Japanese Patent Application No. 2018-556707 with English-language translation.
(Continued)

*Primary Examiner* — Woody A Lee, Jr.
*Assistant Examiner* — Brian Christopher Delrue
(74) *Attorney, Agent, or Firm* — Wenderoth, Lind & Ponack, L.L.P.

(57) ABSTRACT

A method for disassembling/assembling a gas turbine including a seal plate disposed on a first side of a rotor disc
(Continued)

in an axial direction of the rotor disc, and a seal plate restraint part for restricting movement of the seal plate relative to the rotor disc in a radial direction of the rotor disc includes a seal-plate-restraint-state switching step of moving the seal plate restraint part along the axial direction to switch between a seal plate non-restraint state where the seal plate restraint part does not restrict movement of the seal plate in the radial direction and a seal plate restraint state where at least a part of the seal plate restraint part protrudes in the axial direction from the seal plate and thereby restricts movement of the seal plate in the radial direction.

18 Claims, 43 Drawing Sheets

(51) Int. Cl.
| F02C 7/28 | (2006.01) |
| F01D 11/00 | (2006.01) |
| F16J 15/00 | (2006.01) |

(52) U.S. Cl.
CPC .......... *F01D 11/006* (2013.01); *F01D 25/285* (2013.01); *F02C 7/28* (2013.01); *F05D 2230/60* (2013.01); *F05D 2230/70* (2013.01); *F05D 2260/30* (2013.01); *F16J 15/00* (2013.01)

(58) Field of Classification Search
CPC ...... F01D 5/3007; F01D 11/00; F01D 25/285; F05D 2230/64; F05D 2260/30; F05D 2230/60; F05D 2230/70
See application file for complete search history.

(56) References Cited

U.S. PATENT DOCUMENTS

| | | | | |
|---|---|---|---|---|
| 3,501,249 A * | 3/1970 | Scalzo | ................. | F01D 5/3015 416/95 |
| 3,572,966 A * | 3/1971 | Borden | .................. | F01D 5/081 416/95 |
| 3,644,058 A * | 2/1972 | Barnabei | ................ | F01D 5/326 416/95 |
| 3,728,042 A * | 4/1973 | Hugoson | ................. | F01D 5/326 416/95 |
| 3,748,060 A * | 7/1973 | Hugoson | ............... | F01D 5/3015 416/92 |
| 3,853,425 A * | 12/1974 | Scalzo | ...................... | F01D 5/18 416/95 |
| 4,021,138 A * | 5/1977 | Scalzo | .................... | F01D 5/081 416/95 |
| 4,343,594 A * | 8/1982 | Perry | .................... | F01D 5/3015 416/193 A |
| 4,932,207 A * | 6/1990 | Harris | ..................... | F01D 11/00 415/170.1 |
| 5,125,228 A * | 6/1992 | Jewess | .................. | F01D 25/145 60/804 |
| 5,257,909 A * | 11/1993 | Glynn | ................... | F01D 5/3015 416/219 R |
| 6,220,814 B1 * | 4/2001 | Brushwood | ............. | F01D 11/24 415/47 |
| 7,371,050 B2 * | 5/2008 | Pasquiet | ............... | F01D 5/3015 416/204 A |
| 7,500,832 B2 * | 3/2009 | Zagar | .................... | F01D 5/3015 416/220 R |
| 7,566,201 B2 * | 7/2009 | Brillert | ................... | F01D 5/081 29/889.2 |
| 7,762,112 B2 * | 7/2010 | Brucher | ................ | F01D 11/006 72/31.1 |
| 8,007,230 B2 * | 8/2011 | Hafner | ..................... | F01D 5/08 415/173.7 |
| 9,181,810 B2 * | 11/2015 | Dimmick, III | ........ | F01D 5/3015 |
| 10,060,276 B2 * | 8/2018 | Tanaka | .................. | F01D 11/003 |
| 2003/0017050 A1 * | 1/2003 | Simeone | ............... | F01D 11/006 416/96 R |
| 2003/0131602 A1 * | 7/2003 | Ingistov | ................. | F01D 11/001 60/772 |
| 2006/0073021 A1 * | 4/2006 | Garner | .................... | F01D 5/323 416/220 R |
| 2008/0008593 A1 * | 1/2008 | Zagar | .................... | F01D 5/3015 416/220 R |
| 2008/0173062 A1 * | 7/2008 | Brucher | ................. | B21D 39/02 72/429 |
| 2008/0181767 A1 * | 7/2008 | Brillert | ................... | F01D 5/081 415/170.1 |
| 2013/0294927 A1 * | 11/2013 | Dimmick, III | ........ | F01D 11/006 416/96 R |
| 2015/0369062 A1 * | 12/2015 | Tanaka | .................. | F01D 11/006 415/208.1 |
| 2016/0376891 A1 * | 12/2016 | Bricaud | ................ | F01D 5/3007 416/1 |
| 2019/0277146 A1 * | 9/2019 | Murata | ................... | F01D 5/326 |

FOREIGN PATENT DOCUMENTS

| | | | | |
|---|---|---|---|---|
| EP | 1 944 472 | | 7/2008 | |
| EP | 1 959 101 | | 8/2008 | |
| EP | 2 586 988 | | 5/2013 | |
| EP | 2586988 | A1 * | 5/2013 | ........... F01D 5/3015 |
| EP | 3 536 906 | | 9/2019 | |
| EP | 3536906 | A4 * | 1/2020 | ............... F01D 5/30 |
| FR | 3 020 407 | | 10/2015 | |
| GB | 1141280 | | 1/1969 | |
| GB | 2 258 273 | | 2/1993 | |
| JP | 46-11683 | | 3/1971 | |
| JP | 48-37530 | | 6/1973 | |
| JP | 48-25686 | | 7/1973 | |
| JP | 61-51406 | | 4/1986 | |
| JP | 2008-106765 | | 5/2008 | |
| JP | 2013-234588 | | 11/2013 | |
| JP | 2013-234659 | | 11/2013 | |
| JP | 2014-185552 | | 10/2014 | |
| KR | 10-2015-0103172 | | 9/2015 | |
| WO | 03/016679 | | 2/2003 | |
| WO | 2008/143634 | | 11/2008 | |
| WO | WO-2008143634 | A2 * | 11/2008 | ........... F01D 5/3015 |
| WO | 2014/148566 | | 9/2014 | |
| WO | 2015/129580 | | 9/2015 | |
| WO | 2018/110581 | | 6/2018 | |
| WO | WO-2018110581 | A1 * | 6/2018 | ........... F01D 25/285 |

OTHER PUBLICATIONS

Office Action dated Aug. 18, 2020 in corresponding Korean Application No. 10-2019-7016122, with English Translation.
Japanese Office Action dated Apr. 7, 2020 in counterpart JP application No. 2018-556706 with English translation.
Extended European Search Report dated Dec. 10, 2019 in corresponding European Patent Application No. 17881406.7.
International Search Report dated Mar. 6, 2018 in International (PCT) Application No. PCT /JP20 17/044653 with English translation.
International Preliminary Report on Patentability and Written Opinion of the International Searching Authority dated Jun. 27, 2019 in International (PCT) Application No. PCT/JP20 17/044653 with English translation.
Office Action dated Jan. 26, 2021 in U.S. Appl. No. 16/463,588.
International Search Report dated Jan. 23, 2018 in International (PCT) Application No. PCT/JP2017/044657 with English translation.
International Preliminary Report on Patentability and Written Opinion of the International Searching Authority dated Jan. 23, 2018 in International (PCT) Application No. PCT/JP2017/044657 with English translation.
The 1st Office Action dated Feb. 27, 2019, in Taiwanese Application No. 106143702.

(56) References Cited

OTHER PUBLICATIONS

The 2nd Office Action dated Jul. 17, 2019, in Taiwanese Application No. 106143702.
Office Action dated Sep. 18, 2020 in corresponding Korean Patent Application No. 10-2019-7016121 with English-language translation.
Extended European Search Report dated Dec. 16, 2019 in corresponding European Patent Application No. 17881792.2.

* cited by examiner

METHOD FOR DISASSEMBLING/ASSEMBLING GAS TURBINE, SEAL PLATE ASSEMBLY, AND GAS TURBINE ROTOR

TECHNICAL FIELD

The present disclosure relates to a method for disassembling/assembling a gas turbine, a seal plate assembly, and a gas turbine rotor.

BACKGROUND ART

A gas turbine generally includes a gas turbine rotor including a rotor disc, a plurality of blades mounted on an outer peripheral surface of the rotor disc, and at least one seal plate assembly for the blades.

The seal plate assembly is disposed on at least one axial side of the rotor disc to seal the axial gas flow in a space between blades which are adjacent in the circumferential direction of the rotor disc.

A gas turbine generally includes a rotor disc, a plurality of blades mounted on an outer peripheral surface of the rotor disc, and at least one seal plate assembly for the blades.

Patent Document 1 discloses a gas turbine including a seal plate assembly (locking plate assembly) disposed on axially upstream and downstream sides of a rotor disc.

In the gas turbine according to Patent Document 1, the upstream seal plate assembly includes a seal plate (locking plate) configured to engage with a blade to restrict movement of the blade in the axial direction, and a seal plate restraint part (eccentric cam) configured to engage with the rotor disc to restrict movement of the seal plate in the radial direction. The eccentric cam is held to the seal plate while being in contact with the outer peripheral surface of the rotor disc. When the eccentric cam rotates, the position of the rotation center of the eccentric cam relative to the outer peripheral surface of the rotor disc changes in accordance with the phase of the eccentric cam, and the seal plate moves in the radial direction of the rotor disc.

When the gas turbine is disassembled or assembled, the eccentric cam is rotated and moved in the radial direction of the rotor disc to switch between a state where the seal plate engages with the blade and a state where the seal plate does not engage with the blade.

CITATION LIST

Patent Literature

Patent Document 1: US Patent Application Publication No. 2006/0073021

SUMMARY

Problems to be Solved

As described above, in the seal plate assembly disclosed in Patent Document 1, the state where the seal plate engages with the blade and the state where the seal plate does not engage with the blade are switched by rotation of the eccentric cam.

Thus, there is a risk that, when the eccentric cam rotates by friction caused between the outer peripheral surface of the rotor disc and the outer peripheral surface of the eccentric cam due to vibration during operation of the gas turbine or due to acceleration or deceleration of rotation of the rotor disc during operation of the gas turbine, the seal plate moves in the radial direction at an unintended timing, which can release the engagement between the seal plate and the blade.

At least one embodiment of the present invention was made in view of the above typical problem, and an object thereof is to provide a method for disassembling/assembling a gas turbine, a seal plate assembly, and a gas turbine rotor including the same whereby it is possible to control switching between the engagement state and the non-engagement between the seal plate and the blade at an unintended timing.

Solution to the Problems (1) According to at least one embodiment of the present invention, a method for disassembling/assembling a gas turbine including a seal plate disposed on a first side of a rotor disc in an axial direction of the rotor disc and a seal plate restraint part for restricting movement of the seal plate relative to the rotor disc in a radial direction of the rotor disc comprises a seal-plate-restraint-state switching step of moving the seal plate restraint part along the axial direction to switch between a seal plate non-restraint state where the seal plate restraint part does not restrict movement of the seal plate in the radial direction and a seal plate restraint state where at least a part of the seal plate restraint part protrudes in the axial direction from the seal plate and thereby restricts movement of the seal plate in the radial direction.

With the method for disassembling/assembling a gas turbine described in the above (1), in the seal-plate-restraint-state switching step, the seal plate non-restraint state and the seal plate restraint state are switched by moving the seal plate restraint part along the axial direction.

Thus, for instance, even if force acts on the seal plate restraint part in a direction different from the axial direction of the seal plate restraint part by friction caused between the outer peripheral surface of the rotor disc and the seal plate restraint part due to vibration during operation of the gas turbine, or due to acceleration or deceleration of rotation of the rotor disc during operation of the gas turbine, the seal plate non-restraint state and the seal plate restraint state are not easily switched.

Thus, it is possible to control switching between the engagement state and the non-engagement state between the seal plate and the blade at an unintended timing.

(2) In some embodiments, in the method for disassembling/assembling a gas turbine described in the above (1), the first side in the axial direction is a downstream side of a combustion gas flow in the axial direction, and the second side in the axial direction is an upstream side of the combustion gas flow in the axial direction.

With the method for disassembling/assembling a gas turbine described in the above (2), it is possible to switch between the seal plate restraint state and the seal plate non-restraint state in the seal plate assembly disposed downstream of the rotor disc, from the upstream side of the rotor disc, while visually recognizing whether the seal plate restraint part is in the seal plate restraint state or the seal plate non-restraint state, when disassembling or assembling the gas turbine. Thus, it is possible to easily and appropriately switch between the seal plate restraint state and the seal plate non-restraint state of the seal plate assembly disposed downstream of the rotor disc from the upstream side of the rotor disc.

Consequently, it is easy to appropriately switch between the engagement state and the non-engagement state between the seal plate and the blade in the seal plate assembly disposed downstream of the rotor disc, from the upstream side of the rotor disc, when disassembling or assembling the gas turbine.

Further, in a case where a casing of the gas turbine has an opening (e.g., opening for attaching combustor or entrance for operators) on the upstream side of the rotor disc, it is possible to attach or remove the blade with respect to the rotor disc, without removing the casing of the gas turbine, from the upstream side of the rotor disc. Thus, it is possible to improve maintenance performance of the gas turbine.

(3) In some embodiments, in the method for disassembling/assembling a gas turbine described in the above (1) or (2), the seal-plate-restraint-state switching step includes operating the seal plate restraint part through a space between two adjacent blades, on a radially inner side of platforms of the two blades, to switch between the seal plate non-restraint state and the seal plate restraint state.

With the method for disassembling/assembling a gas turbine described in the above (3), in some cases, a relatively wide space is ensured between two adjacent blades, on the radially inner side of the platforms of the two blades, for a reason described later. Thus, it is possible to easily switch between the seal plate non-restraint state and the seal plate restraint state by operating the seal plate restraint part through the relatively wide space.

(4) In some embodiments, in the method for disassembling/assembling a gas turbine described in any one of the above (1) to (3), the rotor disc includes a through hole extending along the axial direction, and the seal-plate-restraint-state switching step includes operating the seal plate restraint part via the through hole to switch between the seal plate non-restraint state and the seal plate restraint state.

(5) In some embodiments, in the method for disassembling/assembling a gas turbine described in any one of the above (1) to (4), the seal-plate-restraint-state switching step includes switching between a state where the seal plate restraint part does not engage with the rotor disc and a state where the seal plate restraint part engages with the rotor disc by moving the seal plate restraint part along the axial direction to switch between the seal plate non-restraint state and the seal plate restraint state.

With the method for disassembling/assembling a gas turbine described in the above (5), in the seal-plate-restraint-state switching step, the seal plate non-restraint state and the seal plate restraint state are switched by moving the seal plate restraint part along the axial direction.

Thus, for instance, even if force acts on the seal plate restraint part in a direction different from the axial direction of the seal plate restraint part by friction caused between the outer peripheral surface of the rotor disc and the seal plate restraint part due to vibration during turning of the gas turbine rotor, or due to acceleration or deceleration of rotation of the rotor disc during turning of the gas turbine rotor, the seal plate non-restraint state and the seal plate restraint state are not easily switched.

Thus, it is possible to control switching between the engagement state and the non-engagement state between the seal plate and the blade at an unintended timing.

Further, since the seal plate non-restraint state and the seal plate restraint state are switched by switching between the engagement state and the non-engagement state between the seal plate restraint part and the rotor disc, it is possible to enhance the effect of controlling switching between the engagement state and the non-engagement state between the seal plate and the blade at an unintended timing.

(6) In some embodiments, in the method for disassembling/assembling a gas turbine described in any one of the above (1) to (5), the seal-plate-restraint-state switching step includes moving the seal plate restraint part between a position where the seal plate restraint part and the rotor disc do not overlap in the axial direction and a position where the seal plate restraint part and the rotor disc overlap in the axial direction to switch between the seal plate non-restraint state and the seal plate restraint state.

With the method for disassembling/assembling a gas turbine described in the above (6), it is possible to enhance the effect of controlling switching between the engagement state and the non-engagement state between the seal plate and the blade at an unintended timing.

(7) In some embodiments, in the method for disassembling/assembling a gas turbine described in any one of the above (1) to (6), the seal-plate-restraint-state switching step includes rotating the seal plate restraint part while one of a female thread or a male thread provided in the seal plate restraint part is screwed with the other of the female thread or the male thread provided in the seal plate to switch between the seal plate non-restraint state and the seal plate restraint state.

With the method for disassembling/assembling a gas turbine described in the above (7), since the seal plate non-restraint state and the seal plate restraint state are switched by rotating the seal plate restraint part while the male thread is screwed with the female thread, even if force acts on the seal plate restraint part in the axial direction, the seal plate non-restraint state and the seal plate restraint state are not easily switched. Thus, it is possible to enhance the effect of controlling switching between the engagement state and the non-engagement state between the seal plate and the blade at an unintended timing.

Further, since the seal plate non-restraint state and the seal plate restraint state are not switched unless the seal plate restraint part is rotated, it is easy to move the seal plate in the radial direction while keeping the seal plate non-restraint state, for instance.

(8) In some embodiments, in the method for disassembling/assembling a gas turbine described in any one of the above (1) to (7), the seal-plate-restraint-state switching step includes moving the seal plate restraint part along the axial direction against a biasing force of a biasing part biasing the seal plate restraint part to switch from the seal plate restraint state to the seal plate non-restraint state.

With the method for disassembling/assembling a gas turbine described in the above (8), even if a weaker force than the biasing force of the biasing part acts on the seal plate restraint part, the seal plate restraint state is not switched to the seal plate non-restraint state. Thus, it is possible to enhance the effect of controlling switching between the engagement state and the non-engagement state between the seal plate and the blade at an unintended timing.

Further, in a case where the method for disassembling/assembling a gas turbine described in the above (8) is the disassembling/assembling method described in the above (7), the biasing force of the biasing part reduces loosening of the thread. Thus, also for this reason, it is possible to enhance the effect of controlling switching between the engagement state and the non-engagement state between the seal plate and the blade at an unintended timing.

(9) In some embodiments, in the method for disassembling/assembling a gas turbine described in any one of the above (1) to (4), the seal-plate-restraint-state switching step includes switching between a state where the seal plate restraint part does not engage with the seal plate and a state where the seal plate restraint part engages with the seal plate to switch between the seal plate non-restraint state and the seal plate restraint state.

With the method for disassembling/assembling a gas turbine described in the above (9), since the seal plate non-restraint state and the seal plate restraint state are switched by switching between the engagement state and the non-engagement state between the seal plate restraint part and the seal plate, it is possible to enhance the effect of controlling switching between the engagement state and the non-engagement state between the seal plate and the blade at an unintended timing.

(10) In some embodiments, in the method for disassembling/assembling a gas turbine described in the above (9), the seal plate restraint part is a seal plate fall prevention pin extending along the axial direction, and the seal-plate-restraint-state switching step includes switching between a state where a leading end of the seal plate fall prevention pin does not engage with a recess formed in the seal plate and a state where the leading end of the seal plate fall prevention pin engages with the recess formed in the seal plate to switch between the seal plate non-restraint state and the seal plate restraint state.

With the method for disassembling/assembling a gas turbine described in the above (10), since the seal plate non-restraint state and the seal plate restraint state are switched by moving the seal plate fall prevention pin linearly relative to the recess along the axis of the recess, it is possible to easily switch between the seal plate non-restraint state and the seal plate restraint state.

(11) In some embodiments, in the method for disassembling/assembling a gas turbine described in the above (9), the seal plate restraint part is a seal plate fall prevention piece, and the seal-plate-restraint-state switching step includes removing the seal plate fall prevention piece mounted in a recess formed in the seal plate from the recess, or mounting the seal plate fall prevention piece in the recess, to switch between the seal plate non-restraint state and the seal plate restraint state.

With the method for disassembling/assembling a gas turbine described in the above (11), since the seal plate non-restraint state and the seal plate restraint state are switched by removing or mounting the seal plate fall prevention piece from or to the recess of the seal plate, it is possible to easily switch between the seal plate non-restraint state and the seal plate restraint state.

(12) In some embodiments, in the method for disassembling/assembling a gas turbine described in the above (9), the seal-plate-restraint-state switching step includes rotating the seal plate restraint part while a female thread provided in the rotor disc is screwed with a male thread provided in the seal plate restraint part to switch between the seal plate non-restraint state and the seal plate non-restraint state.

With the method for disassembling/assembling a gas turbine described in the above (12), since the seal plate non-restraint state and the seal plate restraint state are switched by rotating the seal plate restraint part while the male thread is screwed with the female thread, even if force acts on the seal plate restraint part in the axial direction, the seal plate non-restraint state and the seal plate restraint state are not easily switched. Thus, it is possible to enhance the effect of controlling switching between the engagement state and the non-engagement state between the seal plate and the blade at an unintended timing.

Further, since the seal plate non-restraint state and the seal plate restraint state are not switched unless the seal plate restraint part is rotated, it is easy to move the seal plate in the radial direction while keeping the seal plate non-restraint state, for instance.

(13) In some embodiments, in the method for disassembling/assembling a gas turbine described in any one of the above (1) to (6), the seal plate and the seal plate restraint part are formed integrally, and the seal-plate-restraint-state switching step includes plastically deforming the seal plate restraint part to switch between the seal plate non-restraint state and the seal plate restraint state.

With the method for disassembling/assembling a gas turbine described in the above (13), since the seal plate non-restraint state and the seal plate restraint state are switched by plastic deformation of the seal plate restraint part, it is possible to easily switch between the seal plate non-restraint state and the seal plate restraint state of the seal plate assembly with a simple configuration.

(14) In some embodiments, in the method for disassembling/assembling a gas turbine described in any one of the above (1) to (6), the seal-plate-restraint-state switching step includes rotating the seal plate restraint part while a male thread provided in the seal plate restraint part is screwed with a female thread provided in a through hole penetrating the seal plate to switch between the seal plate non-restraint state and the seal plate restraint state.

With the method for disassembling/assembling a gas turbine described in the above (14), since the seal plate non-restraint state and the seal plate restraint state are switched by rotating the seal plate restraint part while the male thread is screwed with the female thread, even if force acts on the seal plate restraint part in the axial direction, the seal plate non-restraint state and the seal plate restraint state are not easily switched. Thus, it is possible to enhance the effect of controlling switching between the engagement state and the non-engagement state between the seal plate and the blade at an unintended timing.

Further, since the seal plate non-restraint state and the seal plate restraint state are not switched unless the seal plate restraint part is rotated, it is easy to move the seal plate in the radial direction while keeping the seal plate non-restraint state, for instance.

(15) In some embodiments, in the method for disassembling/assembling a gas turbine described in any one of the above (1) to (14), the method further comprises a blade-restraint-state switching step of moving the seal plate in the radial direction to switch between a blade non-restraint state where the seal plate does not restrict movement of a blade along the axial direction and a blade restraint state where the seal plate restraint part restricts movement of the blade along the axial direction.

With the method for disassembling/assembling a gas turbine described in the above (15), since the seal-plate-restraint-state switching step described in the above (1) is included, it is easy to appropriately switch between the seal plate restraint state and the seal plate non-restraint state from the opposite side of the rotor disc from the seal plate. Thus, it is easy to appropriately switch between the blade non-restraint state and the blade restraint state from the opposite side of the rotor disc from the seal plate, when disassembling or assembling the gas turbine.

(16) In some embodiments, in the method for disassembling/assembling a gas turbine described in the above (15), a jig engagement recess or a jig engagement protrusion capable of engaging with a jig is formed in a surface of the seal plate which faces toward the second side in the axial direction, and the blade-restraint-state switching step includes moving the seal plate in the radial direction while the jig engagement recess or the jig engagement protrusion engages with the jig to switch between the blade non-restraint state and the blade restraint state.

With the method for disassembling/assembling a gas turbine described in the above (16), in the blade-restraint-state switching step, the seal plate can be easily moved in the radial direction by the jig. Thus, it is easy to appropriately switch between the blade non-restraint state and the blade restraint state from the opposite side of the rotor disc from the seal plate, when disassembling or assembling the gas turbine.

(17) In some embodiments, in the method for disassembling/assembling a gas turbine described in the above (15) or (16), the method further comprises a blade-fitting-state switching step of switching a blade non-fitting state where the blade is not fitted in the rotor disc and a blade fitting state where the blade is fitted in the rotor disc.

With the method for disassembling/assembling a gas turbine described in the above (17), it is possible to easily and appropriately switch between the blade restraint state where the seal plate restricts movement of the blade along the axial direction and the blade non-fitting state where the blade is not fitted in the rotor disc, only by operation on the opposite side of the rotor disc from the seal plate.

(18) According to at least one embodiment of the present invention, a seal plate assembly for a blade of a gas turbine comprises a seal plate having a first surface and a second surface which face in opposite directions; and a movable part capable of protruding from the first surface at a variable protrusion amount.

With the seal plate assembly described in the above (18), by changing the protrusion amount of the movable part from the first surface, it is possible to switch between the seal plate non-restraint state where the movable part does not restrict movement of the seal plate in the direction along the first surface and the seal plate restraint state where the movable part restricts movement of the seal plate in the direction along the first surface.

Thus, for instance, even if force acts on the movable part in a direction intersecting with the protruding direction of the movable part by friction caused between the outer peripheral surface of the rotor disc and the movable part due to vibration during operation of the gas turbine, or due to acceleration or deceleration of rotation of the rotor disc during operation of the gas turbine, the seal plate non-restraint state and the seal plate restraint state are not easily switched.

Thus, it is possible to control switching between the engagement state and the non-engagement state between the seal plate and the blade at an unintended timing.

(19) In some embodiments, in the seal plate assembly described in the above (18), the seal plate has one of a female thread or a male thread extending along a direction perpendicular to the first surface, and the movable part has the other of the female thread or the male thread which is screwed with the one of the female thread or the male thread.

With the seal plate assembly described in the above (19), since the seal plate non-restraint state and the seal plate restraint state are switched by rotating the movable part while the male thread is screwed with the female thread, even if force acts on the movable part in the axial direction of the thread, the seal plate non-restraint state and the seal plate restraint state are not easily switched. Thus, it is possible to enhance the effect of controlling switching between the engagement state and the non-engagement state between the seal plate and the blade at an unintended timing.

Further, since the seal plate non-restraint state and the seal plate restraint state are not switched unless the movable part is rotated, it is easy to move the seal plate in the direction along the first surface while keeping the seal plate non-restraint state, for instance.

(20) In some embodiments, in the seal plate assembly described in the above (19), a surface of the movable part which faces in the same direction as the first surface is provided with a recess having a non-circular cross-sectional shape.

With the seal plate assembly described in the above (20), by engaging a jig with the recess and thereby rotating the movable part, it is possible to switch between the seal plate non-restraint state and the seal plate restraint state.

(21) In some embodiments, the seal plate assembly described in the above (19) or (20) further comprises a washer clamped between the movable part and the seal plate.

With the seal plate assembly described in the above (21), loosening of the thread is reduced by the washer. Thus, it is possible to enhance the effect of controlling switching between the engagement state and the non-engagement state between the seal plate and the blade at an unintended timing.

(22) In some embodiments, the seal plate assembly described in any one of the above (18) to (21) further comprises a biasing part biasing the movable part in a direction in which the movable part protrudes from the first surface.

With the seal plate assembly described in the above (22), even if a weaker force than the biasing force of the biasing part acts on the movable part, the seal plate restraint state is not switched to the seal plate non-restraint state. Thus, it is possible to enhance the effect of controlling switching between the engagement state and the non-engagement state between the seal plate and the blade at an unintended timing.

Further, in a case where the seal plate assembly described in the above (22) is the seal plate assembly described in the above (19), the biasing force of the biasing part reduces loosening of the thread. Thus, also for this reason, it is possible to enhance the effect of controlling switching between the engagement state and the non-engagement state between the seal plate and the blade at an unintended timing.

(23) In some embodiments, the seal plate assembly described in the above (18) further comprises a biasing part biasing the movable part in a direction in which the movable part protrudes from the first surface, and the seal plate has one of a female thread or a male thread extending along a direction perpendicular to the first surface, and the movable part has the other of the female thread or the male thread which is screwed with the one of the female thread or the male thread.

With the seal plate assembly described in the above (23), since the seal plate non-restraint state and the seal plate restraint state are switched by rotating the movable part while the male thread is screwed with the female thread, even if force acts on the movable part in the axial direction of the thread, the seal plate non-restraint state and the seal plate restraint state are not easily switched. Thus, it is possible to enhance the effect of controlling switching between the engagement state and the non-engagement state between the seal plate and the blade at an unintended timing.

Further, the biasing force of the biasing part reduces loosening of the thread. Thus, also for this reason, it is possible to enhance the effect of controlling switching between the engagement state and the non-engagement state between the seal plate and the blade at an unintended timing.

(24) In some embodiments, in the seal plate assembly described in the above (22) or (23), the biasing part includes a disc spring, a coil spring, or a leaf spring.

With the seal plate assembly described in the above (24), in case of using the disc spring as the biasing part, even if cracks occur in the biasing part, the size of the biasing part in the axial direction of the spring is not likely to become small. Thus, it is possible to bias the movable part relatively stably.

(25) In some embodiments, in the seal plate assembly described in any one of the above (18) to (24), the seal plate includes a plate part and an accommodation chamber forming part forming an accommodation chamber for accommodating the movable part, and the movable part is configured so that at least a part of the movable part is capable of protruding from an opening formed in the first surface of the accommodation chamber forming part.

With the seal plate assembly described in the above (25), since the accommodation chamber forming part for at least partially accommodating the movable part is provided, it is possible to achieve the effects of the seal plate assembly described in any one of the above (18) to (24) while suppressing the reduction in seal performance of the seal plate.

(26) In some embodiments, in the seal plate assembly described in the above (25), the accommodation chamber forming part protrudes from the plate part in a direction in which the second surface faces.

With the seal plate assembly described in the above (26), it is possible to achieve the effects of the seal plate assembly described in the above (25) while ensuring a space allowing the movable part to move.

(27) In some embodiments, in the seal plate assembly described in the above (26), the accommodation chamber forming part protrudes from the plate part in the direction in which the second surface faces in both a range where the movable part exists in a width direction of the seal plate and a range where the movable part does not exist in the width direction.

If the accommodation chamber forming part protrudes in the direction in which the second surface faces only in a range where the movable part exists in the width direction, windage loss occurs due to the protruding portion of the accommodation chamber forming part when the gas turbine rotor rotates in response to operation of the gas turbine, which causes the reduction in gas turbine efficiency.

In view of this, as described in the above (27), with the configuration in which the accommodation chamber forming part protrudes in both a range where the movable part exists in the circumferential direction and a range where the movable part does not exist in the circumferential direction, it is possible to reduce the windage loss.

Herein, "width direction" corresponds to a direction (circumferential direction) perpendicular to each of the protruding direction (radial direction) of the projection of the seal plate and the thickness direction (axial direction) of the seal plate and corresponds to a direction perpendicular to each of the extension direction (radial direction) of stepped portions disposed on both sides of the seal plate where adjacent seal plates overlap and the protruding direction (axial direction) of the movable part in the following detailed description.

(28) In some embodiments, in the seal plate assembly described in the above (26) or (27), the accommodation chamber forming part protrudes from the plate part in the direction in which the second surface faces over a range of 80% or more of a length of the seal plate in a width direction of the seal plate.

With the seal plate assembly described in the above (28), since the accommodation chamber forming part protrudes from the plate part in a direction in which the second surface faces over most of the range in the width direction, it is possible to suppress the increase in windage loss, compared with the case where the accommodation chamber forming part protrudes locally in the range in the width direction.

(29) In some embodiments, in the seal plate assembly described in any one of the above (25) to (28), the accommodation chamber forming part has a thinned portion at a different position from the accommodation chamber.

With the seal plate assembly described in the above (29), it is possible to adjust the stiffness of the seal plate by provision of the thinned portion. By adjusting the stiffness of the seal plate, it is possible to adjust the natural frequency of the blade. By adjusting the natural frequency of the blade, it is possible to suppress the occurrence of resonance of the blade.

(30) In some embodiments, in the seal plate assembly described in any one of the above (18) to (29), the movable part is disposed away from a center of the seal plate in a width direction of the seal plate.

During operation of the gas turbine, since centrifugal force acts on components of the gas turbine rotor, the seal plate is pressed radially outward toward the blade. Accordingly, if the boundary position between adjacent seal plates is positioned between the blade roots of blades so that one seal plate is pressed to one blade during operation, structural stability can be obtained.

In this regard, in the seal plate assembly described in the above (30), in the case where the boundary position between adjacent seal plates is positioned between blade roots of two adjacent blades to obtain the above advantage, since the movable part is disposed away from the center of the seal plate in the width direction of the seal plate, it is possible to make use of the space between the adjacent blades as a passage for a jig to operate the movable part.

(31) In some embodiments, in the seal plate assembly described in the above (30), the seal plate has a projection protruding from an edge of the seal plate extending in the width direction, and the projection is located across the center of the seal plate in the width direction from the movable part.

With the seal plate assembly described in the above (31), by causing the projection to abut on a step provided in the blade, it is possible to restrict movement of the seal plate in the width direction relative to the blade.

(32) According to at least one embodiment of the present invention, a seal plate assembly for a blade of a gas turbine comprises: a seal plate having a first surface and a second surface which face in opposite directions and having a recess formed in the first surface; and a recess engagement member engaging with the recess and extending along a direction perpendicular to the first surface.

With the seal plate assembly described in the above (32), since the seal plate non-restraint state and the seal plate restraint state are switched by moving the recess engagement member linearly relative to the recess along the perpendicular direction, it is possible to easily switch between the seal plate non-restraint state and the seal plate restraint state.

(33) According to at least one embodiment of the present invention, a gas turbine rotor comprises: a rotor disc; a plurality of blades mounted on the rotor disc; and at least one seal plate assembly for the blades. The at least one seal plate assembly includes the seal plate assembly described in any one of the above (18) to (32).

With the gas turbine rotor described in the above (33), since the seal plate assembly described in any one of the above (18) to (32) is included, it is possible to control switching between the engagement state and the non-engagement state between the seal plate and the blade at an unintended timing.

(34) In some embodiments, the gas turbine rotor described in the above (33) further comprises: a locking plate for holding the seal plate between the locking plate and an end surface of the rotor disc; and a locking piece configured to press the locking plate toward the end surface of the rotor disc.

With the gas turbine rotor described in the above (34), when the engagement state and the non-engagement state between the seal plate and the blade are switched on the second surface side of the seal plate assembly, the switching can be easily performed by mounting or removing the locking piece and the locking plate.

(35) According to at least one embodiment of the present invention, a gas turbine rotor comprises: a rotor disc; a plurality of blades mounted on the rotor disc; and at least one seal plate assembly for the blades. The at least one seal plate assembly includes a pair of seal plate assemblies which are adjacent to each other in a circumferential direction of the rotor disc, and each of the pair of seal plate assemblies is the seal plate assembly described in any one of the above (18) to (32).

With the gas turbine rotor described in the above (35), since the adjacent seal plate assemblies of the pair are the seal plate assemblies described in any one of the above (18) to (32), it is possible to control switching between the engagement state and the non-engagement state between the seal plate and the blade at an unintended timing.

Further, through a space caused by removing a pair of blades corresponding to the pair of seal plate assemblies from the rotor disc, other seal plates at different positions from the pair of seal plate assemblies can be moved in the circumferential direction and thereby can be easily removed from respective blades. Thus, it is possible to efficiently disassemble the gas turbine.

(36) According to at least one embodiment of the present invention, a gas turbine rotor comprises: a rotor disc; a plurality of blades mounted on the rotor disc; and at least one seal plate assembly for the blades. The at least one seal plate assembly includes a plurality of seal plate assemblies arranged symmetrically around a rotation center of the rotor disc, and each of the plurality of seal plate assemblies arranged symmetrically is the seal plate assembly described in any one of the above (18) to (32).

With the gas turbine rotor described in the above (36), since the seal plate assemblies arranged symmetrically around the rotation center of the rotor disc are the seal plate assemblies described in any one of the above (18) to (32), it is possible to control switching between the engagement state and the non-engagement state between the seal plate and the blade at an unintended timing in the seal plate assembly.

Further, through spaces caused by removing a plurality of blades corresponding to the plurality of seal plate assemblies from the rotor disc, other seal plates at different positions from the plurality of seal plate assemblies can be moved in the circumferential direction and thereby can be easily removed from respective blades.

Further, since the spaces caused by removing the plurality of blades corresponding to the plurality of seal plate assemblies from the rotor disc are positioned symmetrically with respect to the rotation center of the rotor disc, it is possible to remove the blades by moving the other seal plates in the circumferential direction a short distance. Thus, it is possible to efficiently disassemble the gas turbine.

(37) According to at least one embodiment of the present invention, a gas turbine rotor comprises: a rotor disc; a plurality of blades mounted on the rotor disc; and the seal plate assembly described in any one of the above (18) to (32), in which the seal plate includes a plate part and an accommodation chamber forming part forming an accommodation chamber for accommodating the movable part, the accommodation chamber forming part protrudes from the plate part in a direction in which the second surface faces, the gas turbine rotor further comprises a seal plate not provided with the movable part, and the seal plate not provided with the movable part includes a plate part and a projecting part protruding from the plate part in a direction in which the second surface faces.

In the gas turbine rotor described in the above (37), the direction in which the accommodation chamber forming part protrudes from the plate part of the seal plate assembly (direction in which second surface faces) coincides with the direction in which the projecting part of the seal plate not provided with the movable part protrudes from the seal plate. Thus, by making the difference in protrusion amount between the accommodating chamber forming part and the projecting part close to zero, it is possible to suppress the increase in windage loss due to protrusion of the accommodating chamber forming part during rotation of the gas turbine rotor.

(38) According to at least one embodiment of the present invention, a gas turbine rotor comprises: a rotor disc; a plurality of blades mounted on the rotor disc; and the seal plate assembly described in any one of the above (18) to (32), in which the seal plate includes a plate part and an accommodation chamber forming part forming an accommodation chamber for accommodating the movable part, the accommodation chamber forming part protrudes from the plate part in a direction in which the second surface faces, the accommodation chamber forming part has a first thinned portion at a position different from the accommodation chamber, the gas turbine rotor further comprises another seal plate not provided with the movable part, the another seal plate includes a plate part and a projecting part protruding from the plate part in a direction in which the second surface faces, and the projecting part has a second thinned portion having a different dimension from the first thinned portion.

With the gas turbine rotor described in the above (38), by making difference between the dimension of the first thinned portion formed in the accommodation chamber forming part of the seal plate with the movable part and the dimension of the second thinned portion formed in the projecting part of the other seal plate with no movable part, it is possible to adjust the stiffness of each seal plate. By adjusting the stiffness of the seal plate, it is possible to adjust the natural frequency of the blade. By adjusting the natural frequency of the blade, it is possible to suppress the occurrence of resonance of the blade.

(39) According to at least one embodiment of the present invention, a gas turbine comprises: the gas turbine rotor described in any one of the above (33) to (38) and a casing covering the gas turbine rotor.

With the gas turbine rotor described in the above (39), since the gas turbine rotor described in any one of the above (33) to (38) is included, it is possible to control switching between the engagement state and the non-engagement state between the seal plate and the blade at an unintended timing.

(40) According to at least one embodiment of the present invention, a method for producing a gas turbine including a seal plate disposed on a first side of a rotor disc in an axial direction of the rotor disc and a seal plate restraint part for restricting movement of the seal plate relative to the rotor disc in a radial direction of the rotor disc comprises a seal-plate-restraint-state switching step of moving the seal plate restraint part along the axial direction to switch from a seal plate non-restraint state where the seal plate restraint part does not restrict movement of the seal plate in the radial direction to a seal plate restraint state where at least a part of the seal plate restraint part protrudes in the axial direction from the seal plate and thereby restricts movement of the seal plate in the radial direction.

With the method for producing a gas turbine described in the above (40), in the seal-plate-restraint-state switching step, the seal plate non-restraint state and the seal plate restraint state are switched by moving the seal plate restraint part along the axial direction.

Thus, for instance, even if force acts on the seal plate restraint part in a direction different from the axial direction of the seal plate restraint part by friction caused between the outer peripheral surface of the rotor disc and the seal plate restraint part due to vibration during operation of the gas turbine, or due to acceleration or deceleration of rotation of the rotor disc during operation of the gas turbine, the seal plate non-restraint state and the seal plate restraint state are not easily switched.

Thus, it is possible to control switching between the engagement state and the non-engagement state between the seal plate and the blade at an unintended timing.

Advantageous Effects

According to at least one embodiment of the present invention, there is provided a method for disassembling/assembling a gas turbine, a seal plate assembly, and a gas turbine rotor including the same whereby it is possible to control switching between the engagement state and the non-engagement between the seal plate and the blade at an unintended timing.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Schematic Configuration of Gas Turbine)

Figure 1:
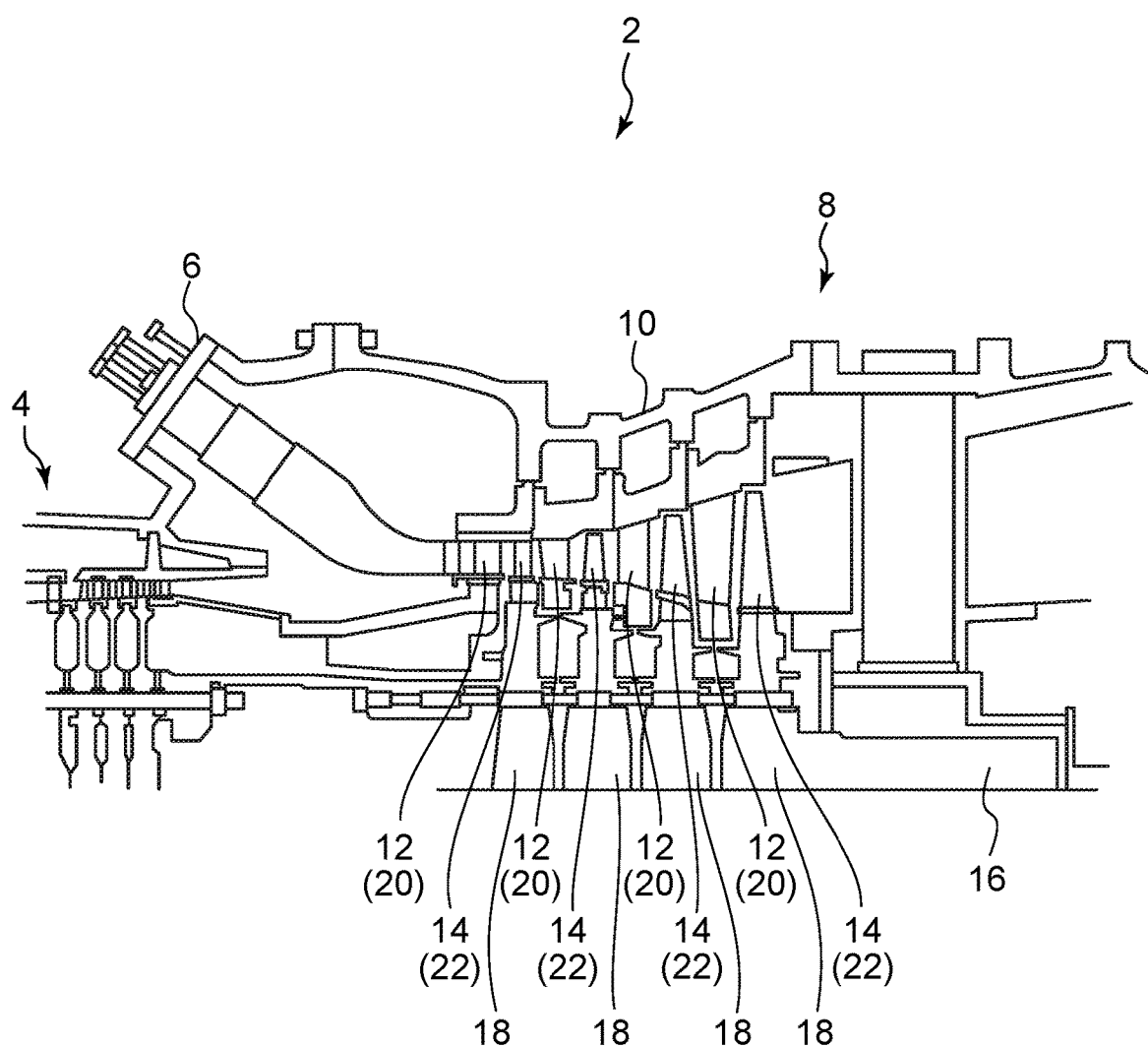
FIG. 1 is a schematic cross-sectional view of a gas turbine 2 according to an embodiment of the present invention, taken along the rotational axis of the gas turbine 2.

FIG. 1 is a schematic cross-sectional view of a gas turbine 2 according to an embodiment of the present invention, taken along the rotational axis of the gas turbine 2.

As shown in FIG. 1, the gas turbine 2 includes a compressor 4 for compressing air to produce compressed air, a combustor 6 for mixing the compressed air with fuel supplied from a fuel supply source (not shown) and combusting the mixture to produce combustion gas, and a turbine 8 rotationally driven by the combustion gas.

The turbine 8 includes a turbine casing 10, a plurality of vane rows 12 fixed to an inner side of the turbine casing 10, and a gas turbine rotor 16 including a plurality of blade rows 14 and configured to rotate within the turbine casing 10. The gas turbine rotor 16 includes a plurality of rotor discs 18 arranged in the axial direction of the rotor and mutually connected. Each of the rotor discs 18 is mounted with a corresponding one of the blade rows 14. The vane rows 12 and the blade rows 14 are arranged alternately along the axial direction of the gas turbine rotor 16.

Each of the vane rows 12 includes a plurality of vanes 20 arranged in the circumferential direction of the gas turbine rotor 16, and each of the vanes 20 is fixed to the inner side of the turbine casing 10. Each of the blade rows 14 includes a plurality of blades 22 arranged in the circumferential direction of the gas turbine rotor 16, and each of the blades 22 is mounted to an outer peripheral surface of the rotor disc 18.

Hereinafter, unless otherwise stated, the axial direction of the gas turbine rotor 16 (axial direction of the rotor disc 18) is referred to as merely "axial direction" or "axially", and the circumferential direction of the gas turbine rotor 16 (circumferential direction of the rotor disc 18) is referred to as merely "circumferential direction" or "circumferentially", and the radial direction of the gas turbine rotor 16 (radial direction of the rotor disc 18) is referred to as merely "radial direction" or "radially". Further, the upstream side and the downstream side of a combustion gas flow in the axial direction are referred to as merely "upstream side in axial direction" or "axially upstream side" and "downstream side in axial direction" or "axially downstream side", respectively.

Figure 2:
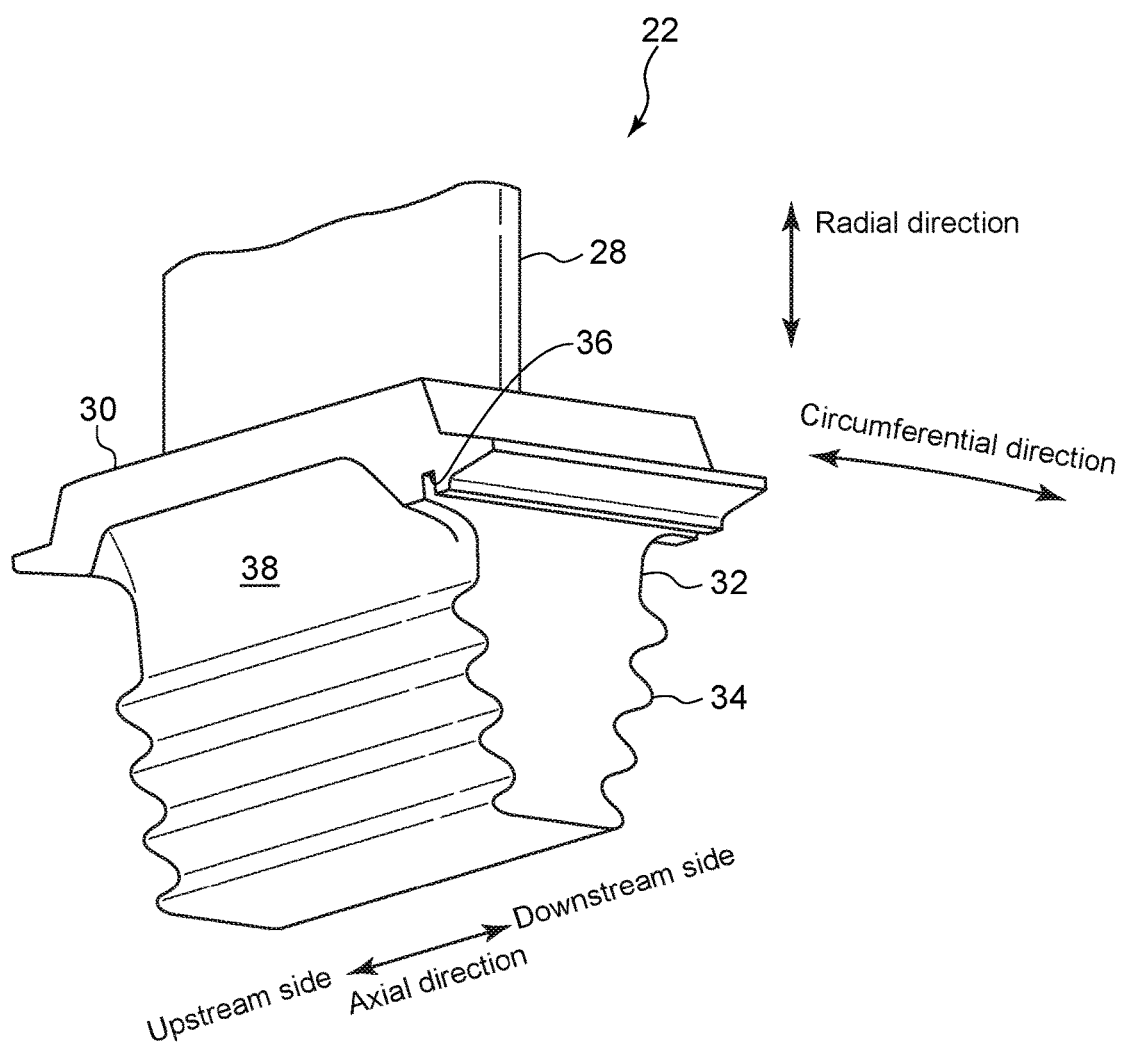
FIG. 2 is a schematic configuration diagram of a blade 22.
Figure 3:
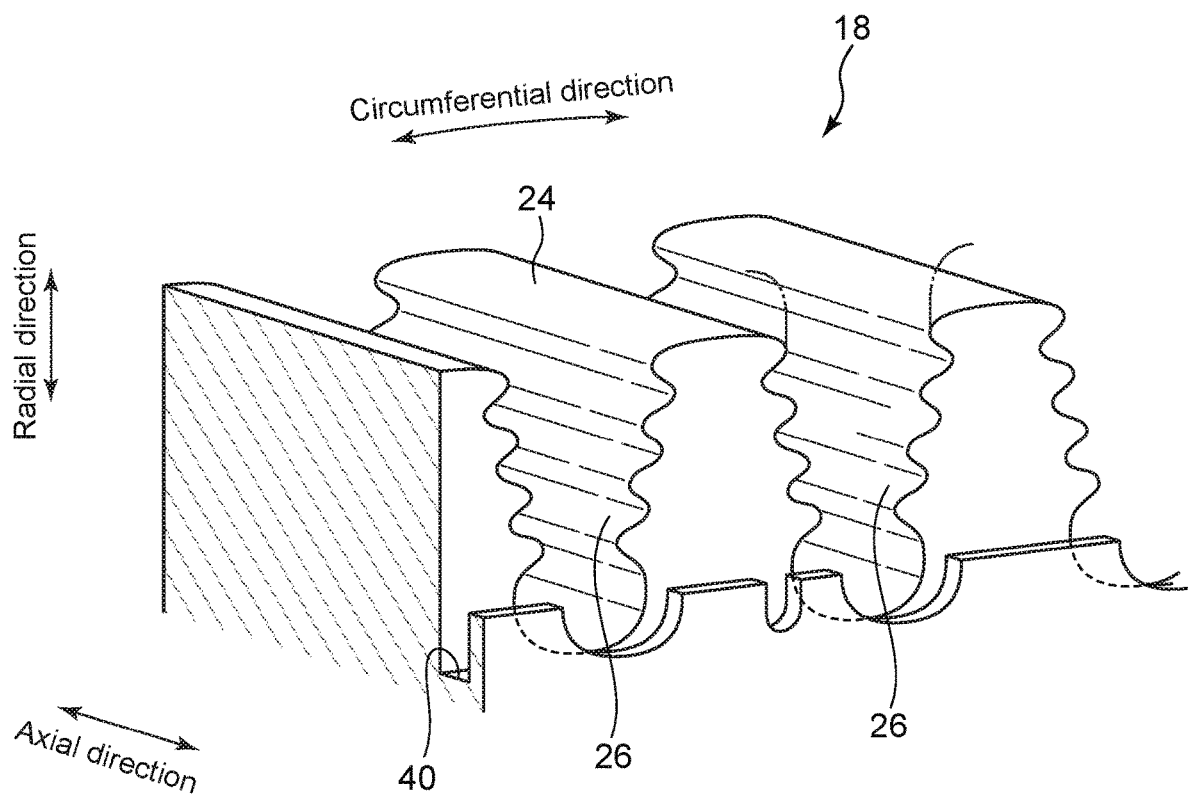
FIG. 3 is a schematic configuration diagram of a blade groove 26 formed in an outer peripheral surface 24 of a gas turbine rotor 16.

FIG. 2 is a schematic configuration diagram of the blade 22. FIG. 3 is a schematic configuration diagram of a blade groove 26 formed in the outer peripheral surface 24 of the gas turbine rotor 16.

As shown in FIG. 2, the blade 22 includes a blade body 28, a platform 30 disposed on an inner side of the blade body 28 in the radial direction, a shank 32 disposed on an inner side of the platform 30 in the radial direction, and a blade root 34 disposed on an inner side of the shank 32 in the radial direction. An inner peripheral surface of an axially downstream end portion of the platform 30 has an outer groove 36 recessed outward in the radial direction and extending in the circumferential direction. The cross-section of the blade root 34 (cross-section perpendicular to the chordwise direction of the blade body 28) has a Christmas-tree-like shape having alternate enlarged and reduced width portions in which the width in the circumferential direction increases and decreases alternately toward the inner side in the radial direction. Further, a clearance 38 is provided between the shanks 32 of two adjacent blades 22 so that cooling air flows into the clearance 38 to cool the blades 22.

As shown in FIG. 3, the outer peripheral surface 24 of the rotor disc 18 has a blade groove 26 into which the blade root 34 of the blade 22 is fitted. The blade groove 26 extends through the rotor disc 18 from the upstream end to the downstream end of the rotor disc 18 in the axial direction and has a cross-sectional shape corresponding to the Christmas-tree-like shape of the blade root 34. With the above configuration, by inserting the blade root 34 of the blade 22 into the blade groove 26 along the axial direction and fitting the blade root 34 into the blade groove 26, the blade 22 is restrained in the circumferential direction and in the radial direction. Further, the rotor disc 18 has an inner groove 40 formed downstream of the blade groove 26, recessed inward in the radial direction, and extending in the circumferential direction. Herein, "outer peripheral surface 24 of rotor disc 18" means a surface of the rotor disc 18 in which the blade groove 26 is formed, and does not include a surface in which the inner groove 40 is formed.

(Configuration of Seal Plate Assembly)

Figure 4:
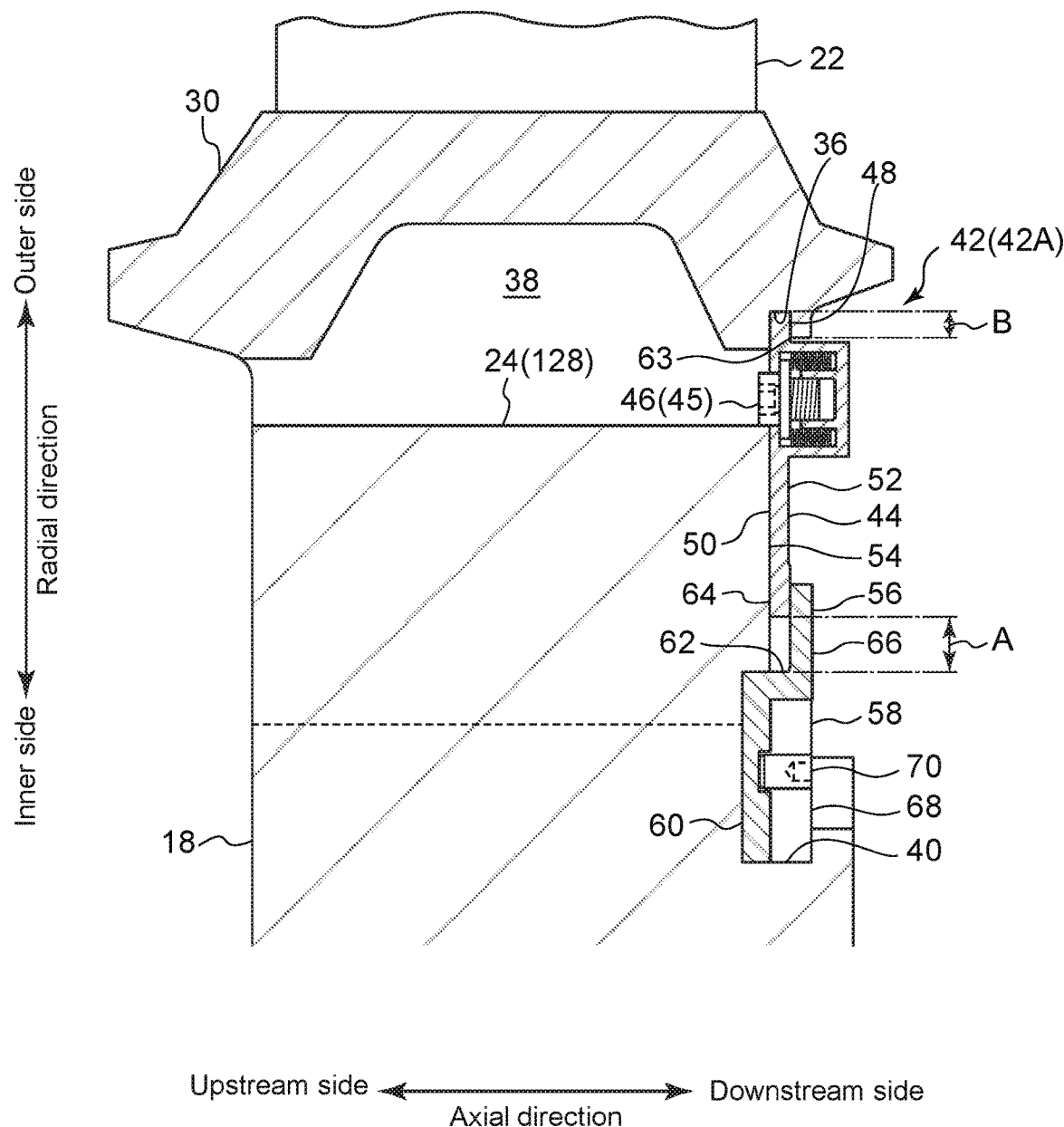
FIG. 4 is a diagram for describing the configuration of a seal plate assembly 42(42A) according to an embodiment, which shows a partial cross-section of a gas turbine rotor 16 taken along the axial direction.

FIG. 4 is a diagram for describing the configuration of a seal plate assembly 42(42A) according to an embodiment, which shows a partial cross-section of the gas turbine rotor 16 taken along the axial direction.

The gas turbine rotor 16 includes a plurality of seal plate assemblies 42(42A) for a plurality of blades 22.

In some embodiments, as shown in FIG. 4, the seal plate assembly 42(42A) includes a seal plate 44 disposed downstream of the rotor disc 18 in the axial direction, and a seal plate restraint part 46 for restricting movement of the seal plate 44 relative to the rotor disc 18 in the radial direction. In the illustrated embodiment, the seal plate restraint part 46 is configured as a plug 45.

The seal plate 44 has a radially outer end portion 48 configured to be fitted into the outer groove 36 of the blade 22 and thereby engages with the blade 22 to restrict movement of the blade 22 along the axial direction. Further, the outer groove 36 restricts movement of the seal plate 44 in the radial direction to prevent radially outward movement of the seal plate 44. The seal plate 44 has a first surface 50 and a second surface 52 which face in opposite directions. The first surface 50 faces upstream in the axial direction, while the second surface 52 faces downstream in the axial direction.

Figure 5:
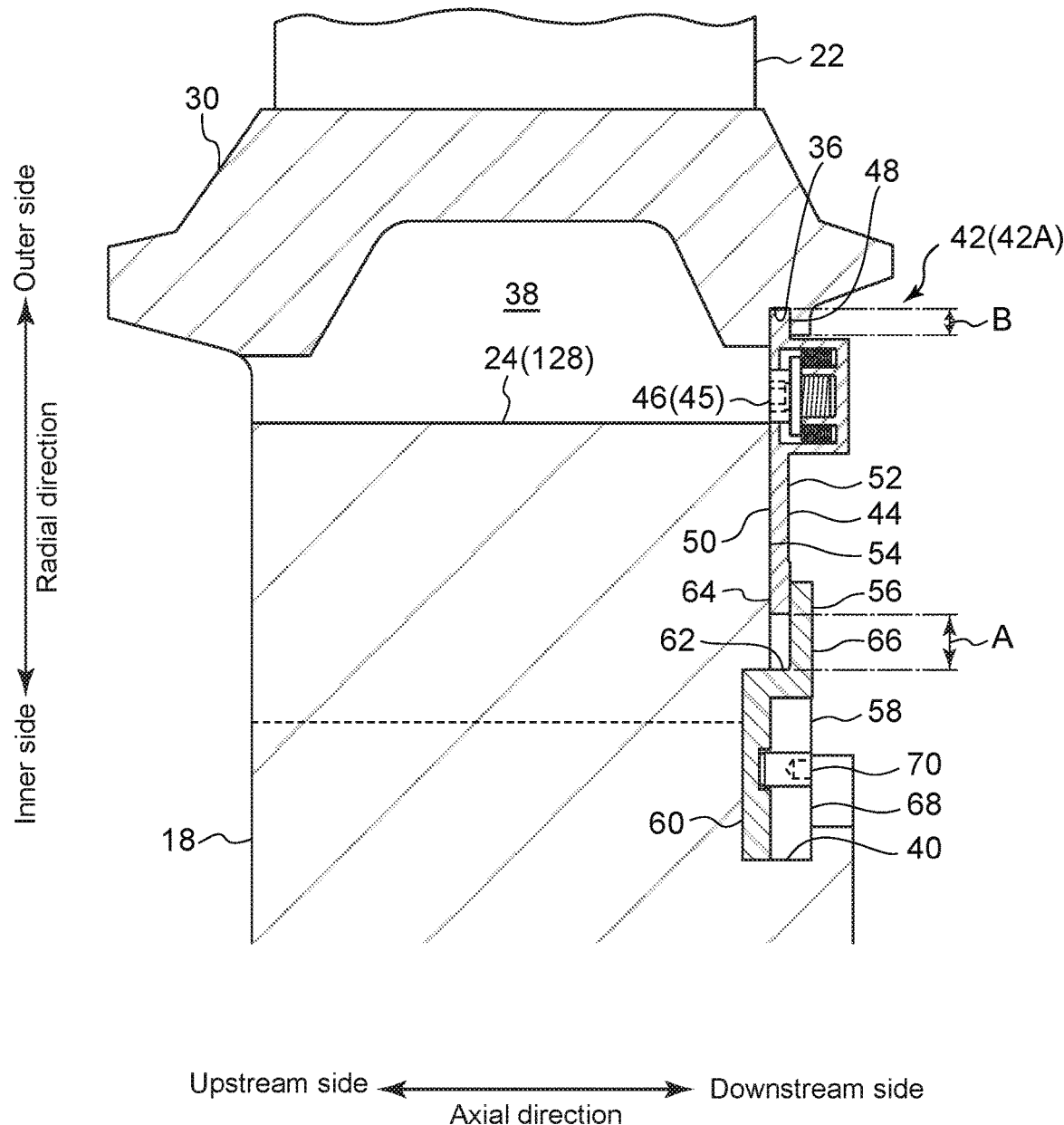
FIG. 5 is a diagram for describing the configuration of a seal plate assembly 42(42A) according to an embodiment, which shows a partial cross-section of a gas turbine rotor 16 taken along the axial direction.

The seal plate restraint part 46 is configured to be switchable between a seal plate restraint state (see FIG. 4) where at least a part of the seal plate restraint part 46 protrudes upstream in the axial direction from the seal plate 44 and thereby restricts movement of the seal plate 44 in the radial direction and a seal plate non-restraint state (see FIG. 5) where movement of the seal plate 44 is not restricted in the radial direction. In the illustrated embodiment, the seal plate restraint part 46 is configured as a movable part capable of protruding from the first surface 50 at a variable protrusion amount. The seal plate restraint part 46 engages with the rotor disc 18 in such a manner that the peripheral surface of the seal plate restraint part 46 is caught on the outer peripheral surface 24 of the rotor disc 18, thereby restricting radially inward movement of the seal plate 44. The protruding direction (moving direction) of the seal plate restraint part 46 may not be parallel to the axial direction but includes an axial component. For instance, the seal plate restraint part 46 may protrude (move) along the extension direction of the blade groove 26.

Further, in the illustrated embodiment, the gas turbine rotor 16 includes a locking plate 56 for holding the seal plate 44 between the locking plate 56 and a downstream end surface 54 of the rotor disc 18, and a locking piece 58 configured to press the locking plate 56 to the end surface 54 of the rotor disc 18. The locking plate 56 and the locking piece 58 are held in the inner groove 40 of the rotor disc 18.

The locking plate 56 includes a plate body part 60 extending in the radial direction along the end surface 54 on the downstream side of the gas turbine rotor 16, a rising part 62 extending downward from a radially outer end portion of the plate body part 60, and a lap part 66 extending radially outward from a downstream end portion of the rising part 62 and overlapping a radially inner end portion 64 of the seal plate 44 in the radial direction. Thus, the locking plate 56 has a crank-shaped cross-section. The lap part 66 is disposed with a gap from the end surface 54 on the downstream side of the gas turbine rotor 16, and the radially inner end portion 64 of the seal plate 44 is held within the gap. As shown in FIG. 4, in a state where the seal plate restraint part 46 engages with the outer peripheral surface 24 of the rotor disc 18, a distance A between the radially inner end portion 64 of the seal plate 44 and the rising part 62 in the radial direction is larger than a depth B of the outer groove 36 (depth based on a downstream edge 63 of the outer groove 36). Thus, by moving the seal plate 44 radially inward by a distance equal to or more than the dimension B, it is possible to release the restriction of axially upstream movement of the blade 22 by the seal plate 44.

The locking piece 58 includes a support plate 68 and a pressing screw 70. The support plate 68 is disposed downstream of the plate body part 60 in the axial direction so as to adjoin the plate body part 60 and extends along the plate body part 60 in the radial direction. The pressing screw 70 is screwed into the support plate 68. In response to rotation of the pressing screw 70, the support plate 68 is separated from the locking plate 56 in the axial direction, and the support plate 68 and the locking plate 56 are fixed to the inner groove 40 by tension.

Figure 6:
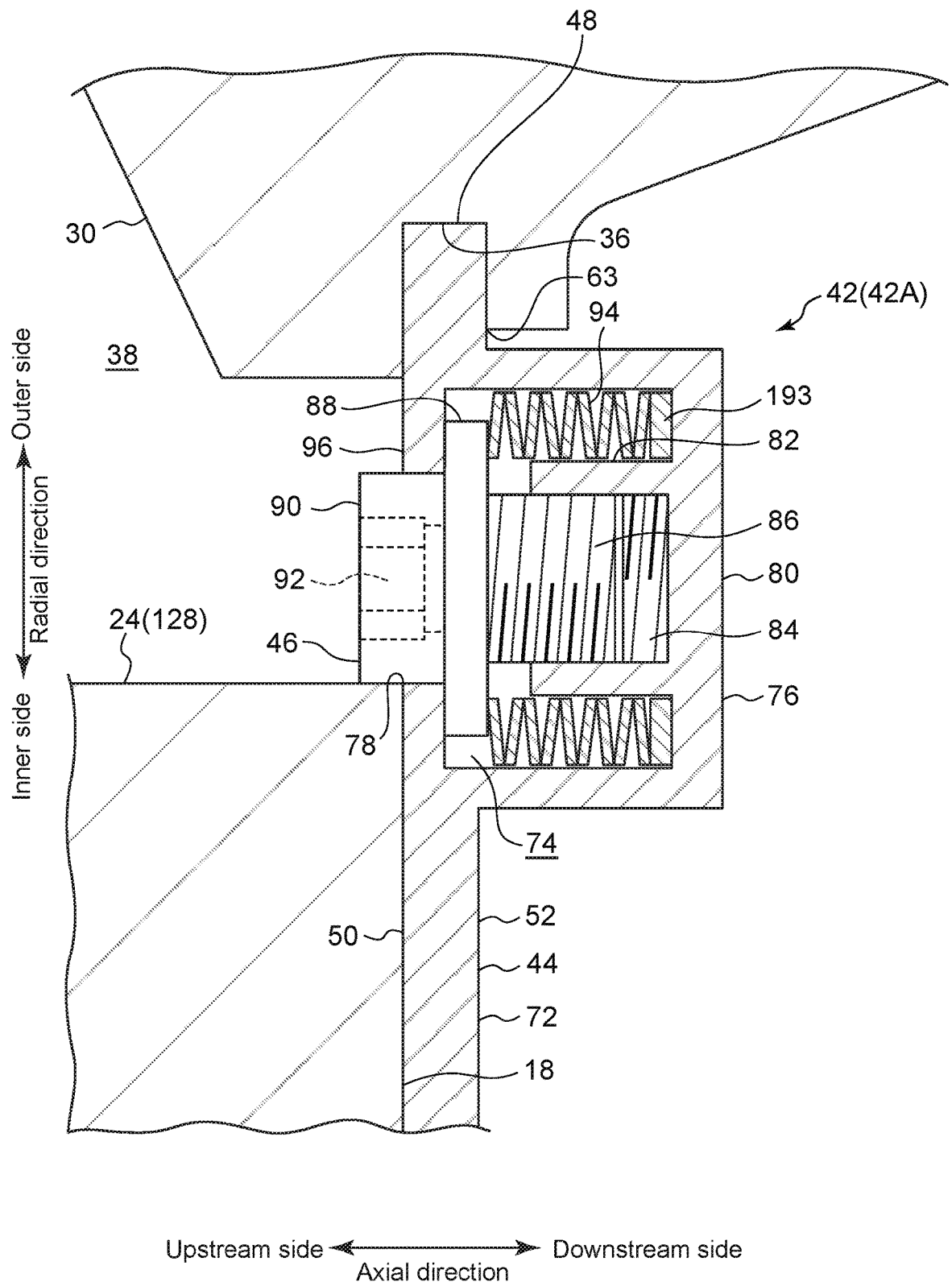
FIG. 6 is an enlarged cross-sectional view of the vicinity of a seal plate restraint part 46 of a seal plate assembly 42(42A), taken along the axial direction.

FIG. 6 is an enlarged cross-sectional view of the vicinity of the seal plate restraint part 46 of the seal plate assembly 42(42A), taken along the axial direction.

As shown in FIG. 6, the seal plate 44 includes a plate part 72 extending in the radial direction and an accommodation chamber forming part 76 forming an accommodation chamber 74 for at least partially accommodating the seal plate restraint part 46. The seal plate restraint part 46 is configured so that a part of the seal plate restraint part 46 is capable of protruding from an opening 78 formed in an axially upstream portion (first surface 50 of seal plate 44) of the accommodation chamber forming part 76. The accommodation chamber forming part 76 is provided in a radially outer portion of the seal plate 44 and protrudes downstream in the axial direction (direction to which second surface 52 faces) from the plate part 72.

The accommodation chamber forming part 76 of the seal plate 44 includes a cylindrical part 82 extending upstream in the axial direction from a wall part 80 disposed downstream in the axial direction, and a female thread 84 extending along the axial direction (direction perpendicular to first surface 50) is formed in an inner peripheral surface of the cylindrical part 82.

An axially downstream end portion of the seal plate restraint part 46 has a male thread 86 configured to be screwed with the female thread 84. The seal plate restraint part 46 includes a brim part 88 adjoining the axially upstream side of the male thread 86 and protruding in the radial direction of the male thread 86, and a protruding part 90 protruding upstream in the axial direction from the brim part 88.

The protruding part 90 of the seal plate restraint part 46, i.e., the axially upstream end portion of the seal plate restraint part 46 has a jig engagement portion 92 capable of engaging with a jig for rotating the seal plate restraint part 46. The jig engagement portion 92 is formed as a recess having a non-circular (e.g., hexagonal) cross-sectional shape in a surface of the protruding part 90 of the seal plate restraint part 46 which faces in the same direction as the first surface 50.

The seal plate assembly 42(42A) includes a biasing part 94 disposed on the outer peripheral side of the cylindrical part 82 and configured to bias the brim part 88 upstream in the axial direction. The biasing part 94 biases the seal plate restraint part 46 in a direction in which the seal plate restraint part 46 protrudes from the first surface 50. The biasing part 94 includes, for instance, a disc spring, a coil spring, or a leaf spring. In case of using the disc spring as the biasing part 94, even if cracks occur in the biasing part 94, the axial size of the biasing part 94 is not likely to become small. Thus, it is possible to bias the seal plate restraint part 46 relatively stably. In the illustrated embodiment, an annular spacer 193 is provided on the outer peripheral side of the cylindrical part 82. The annular spacer 193 is sandwiched between the wall part 80 and the disc spring serving as the biasing part 94.

The accommodation chamber forming part 76 includes a brim restraint part 96 disposed upstream of the brim part 88 in the axial direction to restrict axially upstream movement of the brim part 88. The opening 78 is provided in the brim restraint part 96, and a part of the protruding part 90 is configured to protrude upstream in the axial direction from the opening 78 in a state where the brim part 88 abuts on the brim restraint part 96.

Figure 7:
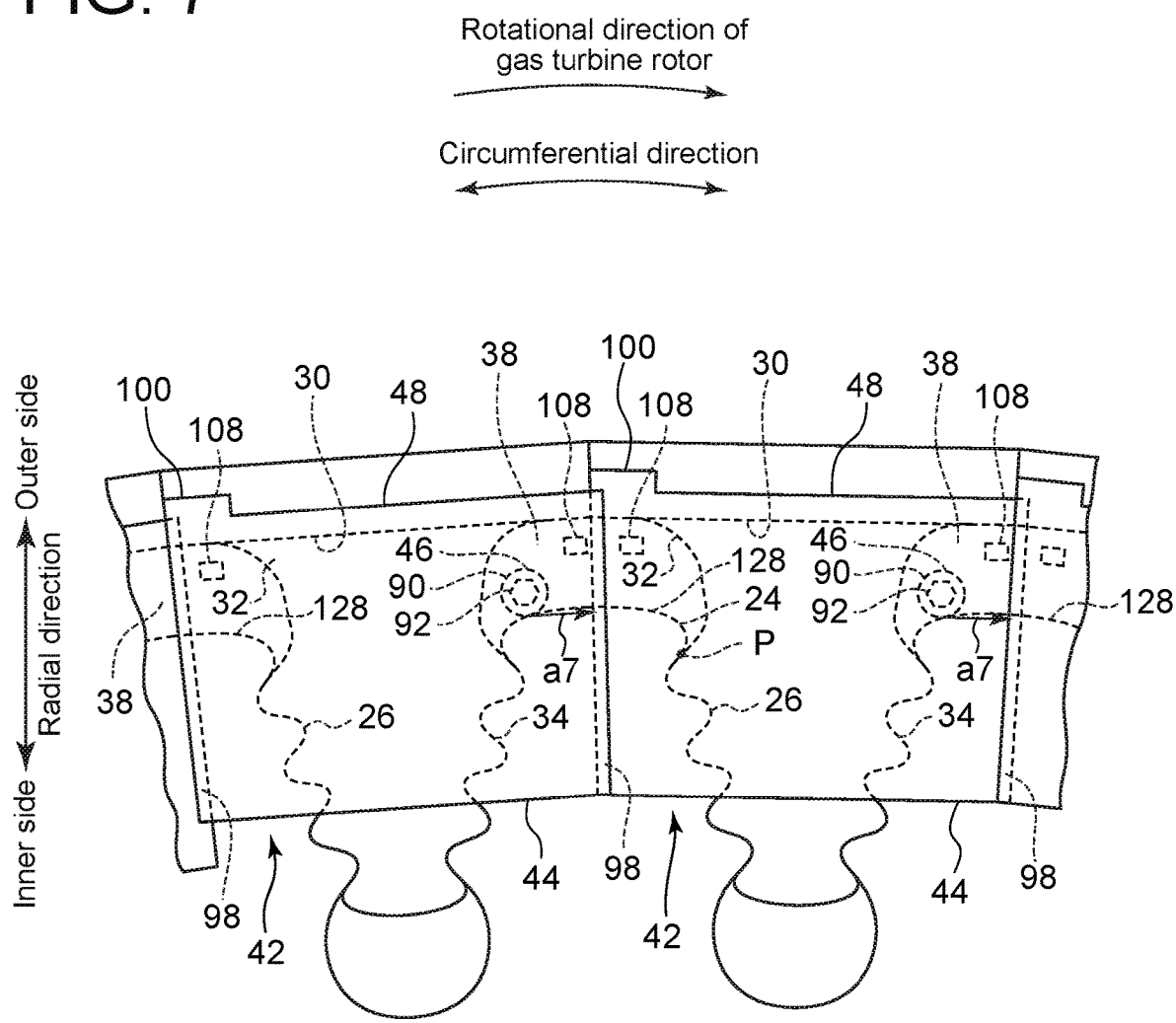
FIG. 7 is a schematic diagram showing the arrangement of a plurality of seal plate assemblies 42(42A), viewed from downstream in the axial direction.

FIG. 7 is a schematic diagram showing the arrangement of a plurality of seal plate assemblies 42(42A), viewed from downstream in the axial direction.

As shown in FIG. 7, the seal plate assemblies 42(42A) are arranged in the circumferential direction, and a circumferential end portion of the seal plate 44 of each seal plate assembly 42(42A) is superimposed on a circumferential end portion of another circumferentially adjacent seal plate 44 (or seal plate 110 described later) to form a stepped portion 98 where the circumferential end portions of the two adjacent seal plates 44 overlap each other. This structure prevents leakage of cooling air in the clearance 38 through a gap between the circumferential end portions of the circumferentially adjacent seal plates 44 to a space downstream of the rotor disc 18 in the axial direction.

The clearance 38 is formed between a region 128 on the outer peripheral surface 24 of the rotor disc 18 except the blade groove 26 and the platform 30 of the blade 22, as shown in FIG. 7. Further, the jig engagement portion 92 of the seal plate restraint part 46 is disposed to overlap the clearance 38 when viewed in the axial direction. Here, when the radially outermost position of a portion fitted with the blade 22 on the outer peripheral surface 24 of the rotor disc 18 is defined as position P, the blade groove 26 means a portion of the outer peripheral surface 24 positioned radially inside the position P. Further, the region 128 means a portion of the outer peripheral surface 24 positioned radially outside the position P.

Further, the radially outer end portion 48 (upper edge) of the seal plate 44 is provided with a projection 100 protruding radially outward. The projection 100 is disposed across the center of the seal plate 44 in the circumferential direction from the seal plate restraint part 46. The radially outer end portion 48 of the seal plate 44 and the projection 100 are together fitted into the outer groove 36 (see FIG. 6). At this time, the projection 100 of the seal plate 44 abuts on a step (not shown) provided in the outer groove 36 and thereby restricts movement of the seal plate 44 in the circumferential direction. In other embodiments, the projection 100 and the seal plate restraint part 46 may be positioned on the same side of the center of the seal plate 44 in the circumferential direction, or the projection 100 may be positioned at the center of the seal plate 44 in the circumferential direction. Alternatively, the seal plate restraint part 46 may be positioned at the center of the seal plate 44 in the circumferential direction.

Figure 8:
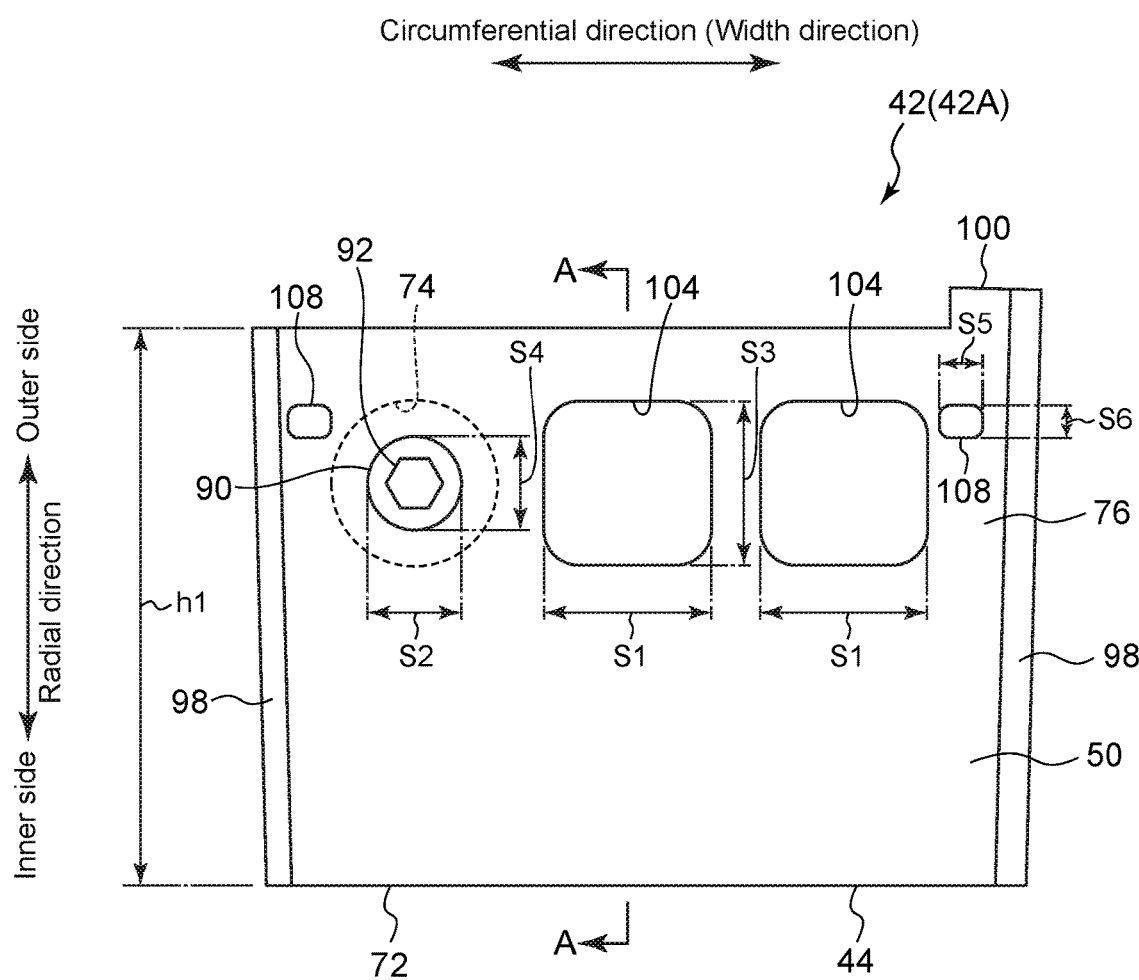
FIG. 8 is a schematic diagram showing a seal plate assembly 42(42A), viewed from upstream in the axial direction.
Figure 9:
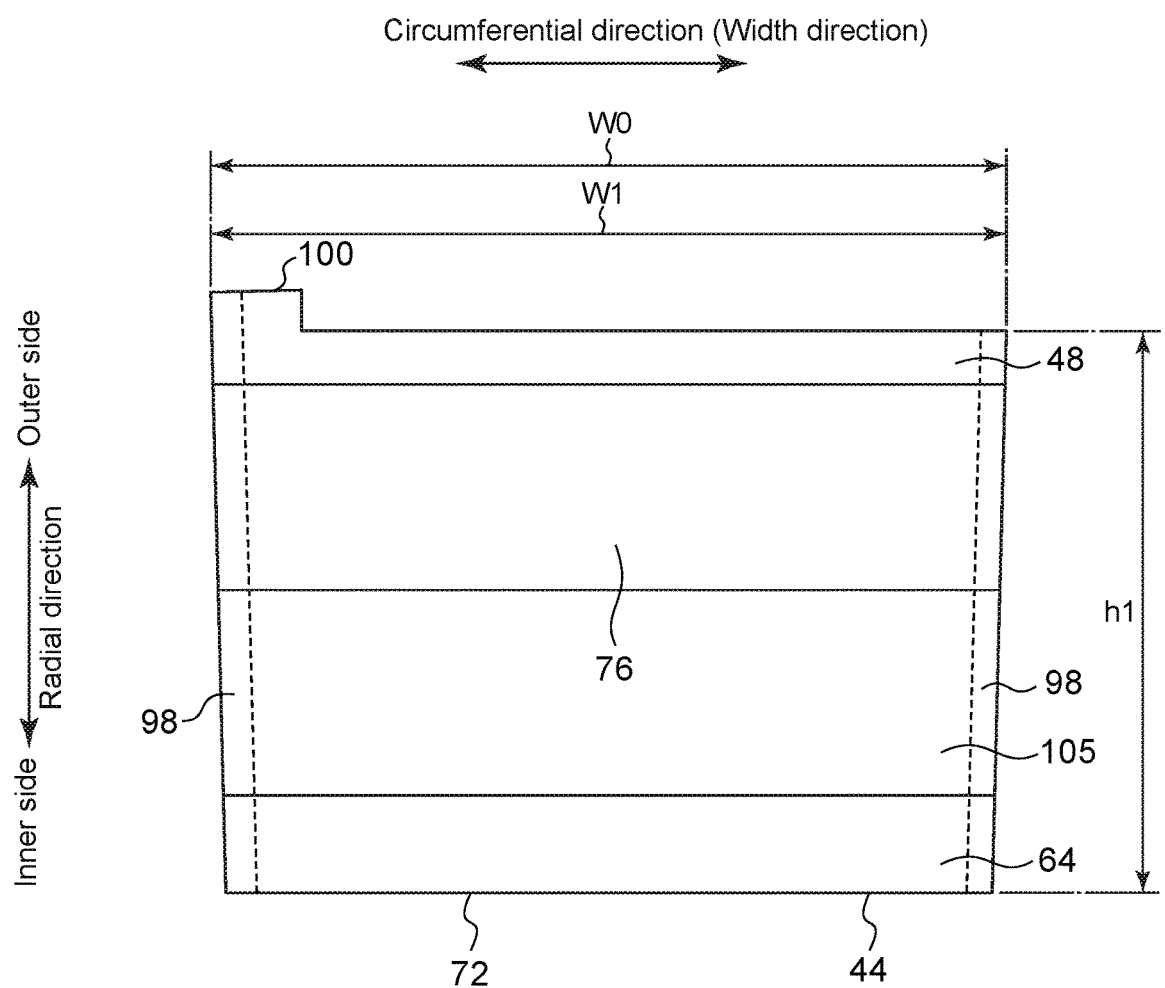
FIG. 9 is a schematic diagram showing a seal plate assembly, viewed from downstream in the axial direction.
Figure 10:
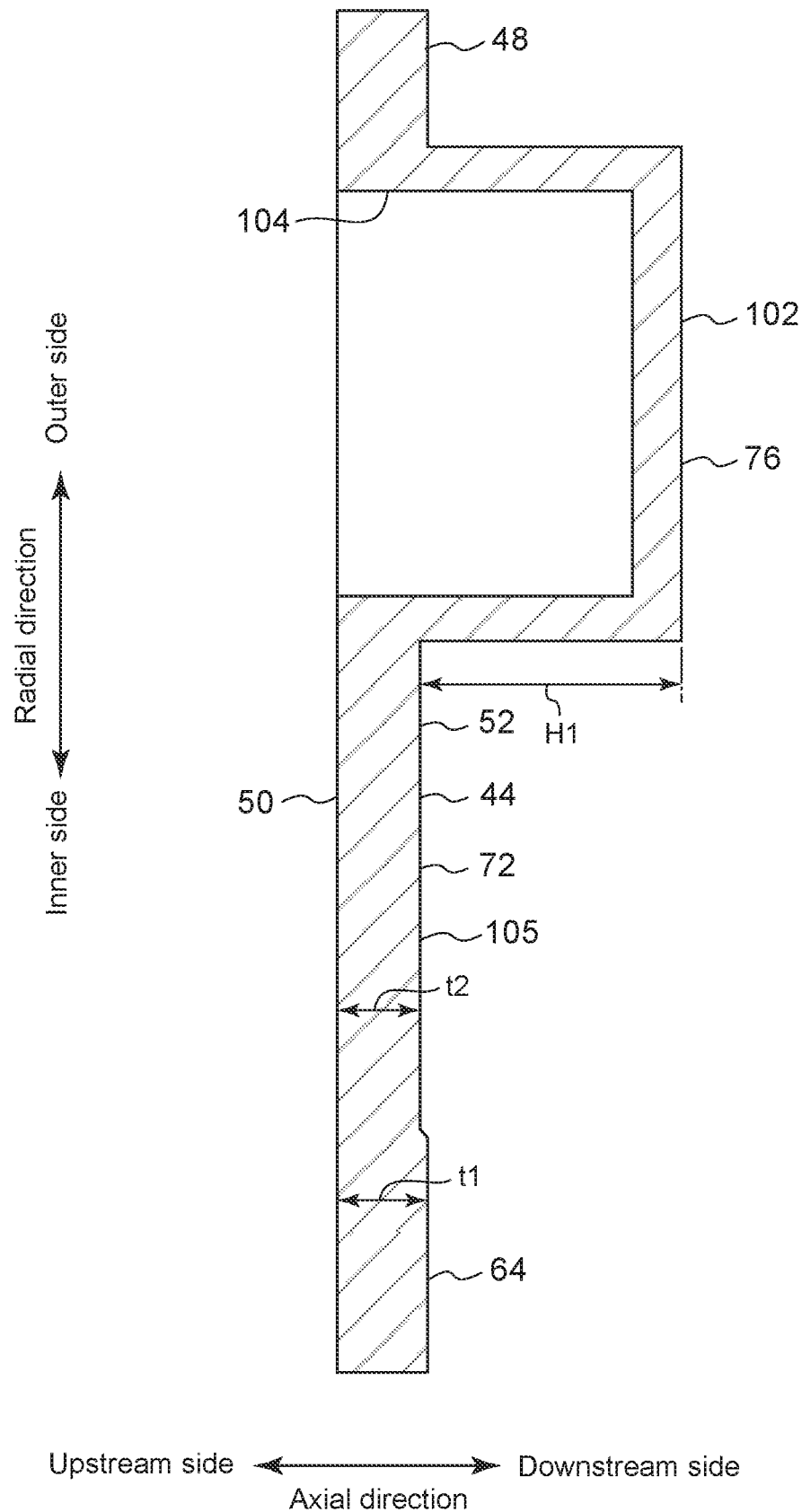
FIG. 10 is a schematic cross-sectional view taken along line A-A in FIG. 8.

FIG. 8 is a schematic diagram showing the seal plate assembly 42(42A), viewed from upstream in the axial direction. FIG. 9 is a schematic diagram showing the seal plate assembly, viewed from downstream in the axial direction. FIG. 10 is a schematic cross-sectional view taken along line A-A in FIG. 8. In the illustrated exemplary embodiment, the seal plate 44 is formed in a rectangular shape when viewed in the axial direction, in which the long-side direction of the seal plate 44 coincides with the circumferential direction, the short-side direction of the seal plate 44 coincides with the radial direction, and the thickness direction of the seal plate 44 coincides with the axial direction. In the illustrated embodiment, the width direction of the seal plate 44 is perpendicular to each of the protruding direction (radial direction) of the projection 100 of the seal plate 44 and the thickness direction (axial direction) of the seal plate 44. Further, the width direction of the seal plate 44 is perpendicular to each of the extension direction (radial direction) of the stepped portions 98 disposed on both circumferential ends of the seal plate 44 to overlap flanking seal plates 44 and the protruding direction (axial direction) of the seal plate restraint part 46.

As shown in FIGS. 6 and 10, the accommodation chamber forming part 76 protrudes downstream in the axial direction (direction to which second surface 52 faces) from the plate part 72 in both a range where the seal plate restraint part 46 exists in the circumferential direction (width direction of seal plate 44) (see FIG. 6) and a range where the seal plate restraint part 46 does not exist in the circumferential direction (see FIG. 10). As shown in FIGS. 6 and 10, an axially downstream end surface 102 of the accommodation chamber forming part 76 is formed along a plane perpendicular to the axial direction. Further, as shown in FIG. 9, the accommodation chamber forming part 76 protrudes downstream in the axial direction from the plate part 72 over a range W1 which is 80% or more of an existence range W0 where the seal plate 44 exists in the circumferential direction. In the embodiment shown in FIG. 9, the accommodation chamber forming part 76 protrudes downstream uniformly over the entire circumferential range W1 except for a range where the stepped portion 98 is formed on one circumferential side of the downstream surface of the seal plate 44.

As shown in FIG. 10, the plate part 72 of the seal plate 44 includes two or more portions having different thicknesses. In the illustrated embodiment, the thickness t1 of the radially inner end portion 64 of the plate part 72 is larger than the thickness t2 of a portion 105 of the plate part 72 between the radially inner end portion 64 and the accommodation chamber forming part 76.

As shown in FIG. 8, the accommodation chamber forming part 76 has at least one recessed or thinned portion 104 (first thinned part) at a position different from the accommodation chamber 74. In the illustrated exemplary embodiment, the at least one thinned portion 104 includes a plurality of thinned portions 104 disposed on different positions from the accommodation chamber 74 in the circumferential direction, and each of the thinned portions 104 is disposed in a range overlapping the accommodation chamber 74 in the radial direction. Further, the circumferential size S1 of the thinned portion 104 is larger than the circumferential size S2 of the protruding part 90 of the seal plate restraint part 46, and the radial size S3 of the thinned portion 104 is larger than the radial size S4 of the protruding part 90 of the seal plate restraint part 46. In other embodiments, the magnitude relationship between the sizes S1, S2, S3, S4 may be different from the above relationship.

By adjusting the size, shape, number or arrangement of the thinned portion appropriately, it is possible to adjust the stiffness of the blade 22 and adjust the natural frequency. As shown in FIG. 8, a jig engagement recess 108 capable of engaging with a jig is formed in the first surface 50 of the seal plate 44. The jig engagement recess 108 is configured as at least one slot having a circumferential length S5 longer than a radial length S6. In the illustrated exemplary embodiment, one jig engagement recess 108 is provided on each of the circumferential ends of the seal plate 44. As shown in FIG. 7, each jig engagement recess 108 is positioned so as to overlap the clearance 38 between a region of the outer peripheral surface 24 of the rotor disc 18 except the blade groove 26 and the platform of the blade 22 (clearance between shanks 32), when viewed in the axial direction. Further, a direction of a straight line connecting these jig engagement recesses 108 coincides with the width direction of the seal plate 44. In other embodiments, a jig engagement protrusion capable of engaging with a jig may be formed on the first surface 50 of the seal plate 44.

Generally, a blade is inserted into a blade groove extending obliquely with respect to the axial direction of a rotor disc. Accordingly, for instance, in a case where a rod-like jig is inserted into the clearance 38 between the blades 22 on the radially inner side of the platforms 30 of the blades 22 shown in FIG. 7 to move the seal plate 44 in the radial direction by the jig, the jig engagement recesses 108 is preferably configured as a slot having a circumferential length S5 longer than a radial length S6, as described above. Thereby, it is possible to easily inert a rod-like jig into the jig engagement recesses 108 while the jig is inclined with respect to the first surface 50 (axially upstream facing surface) of the seal plate 44. Thus, it is easy to move the seal plate 44 in the radial direction.

Figure 11:
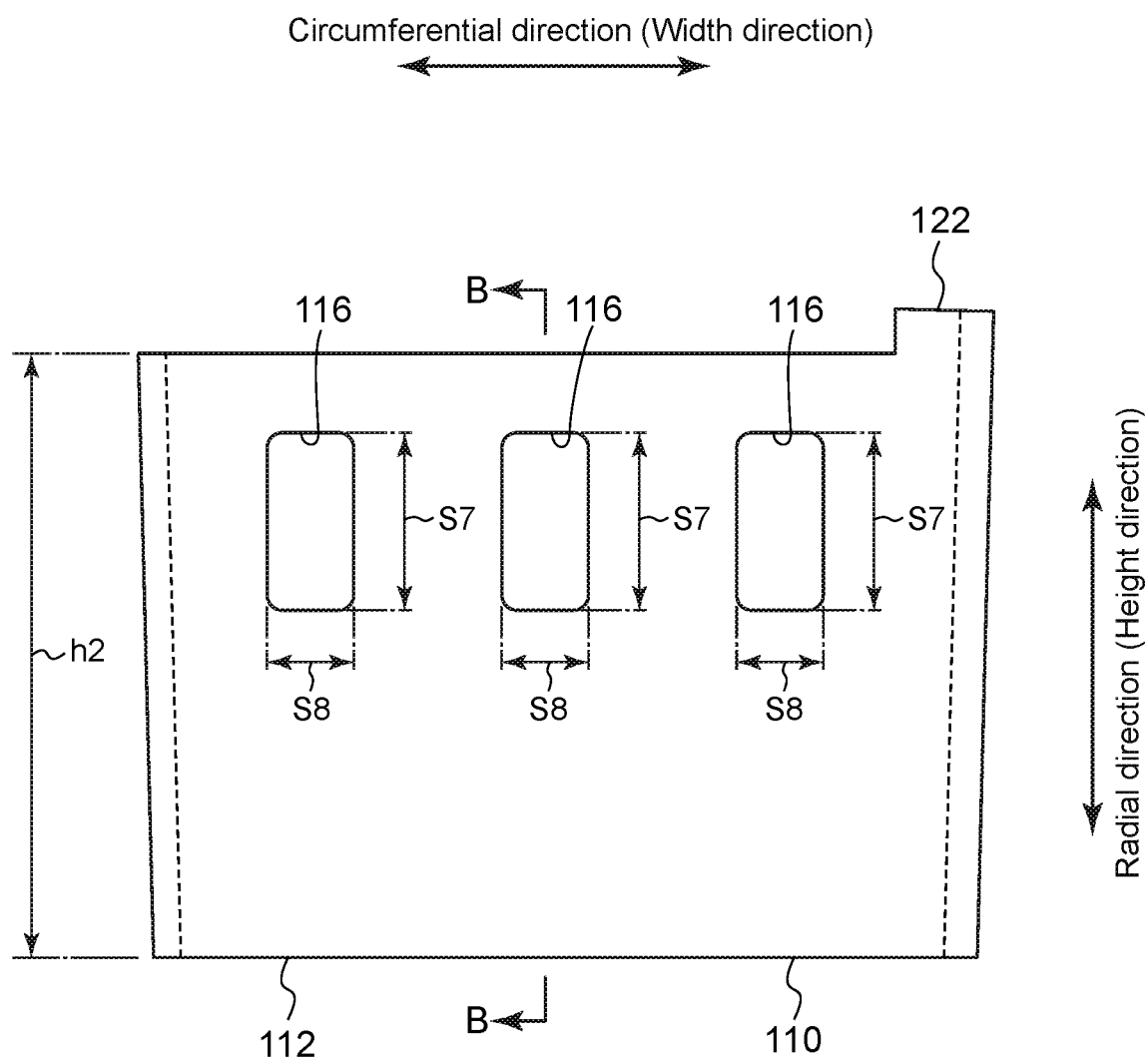
FIG. 11 is a schematic diagram of a seal plate 110 according to an embodiment, viewed from upstream in the axial direction.
Figure 12:
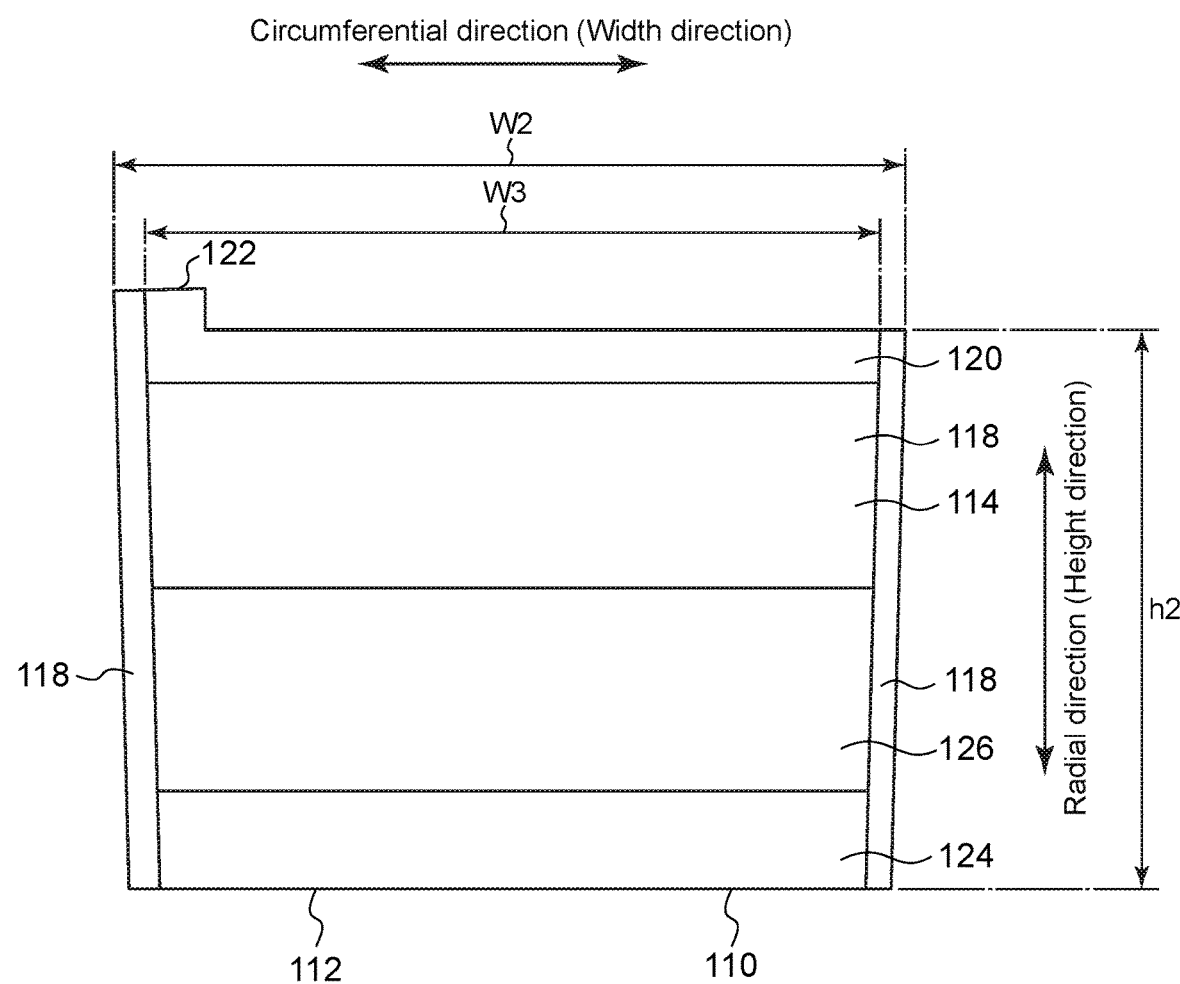
FIG. 12 is a schematic diagram of the seal plate 110 according to an embodiment, viewed from downstream in the axial direction.
Figure 13:
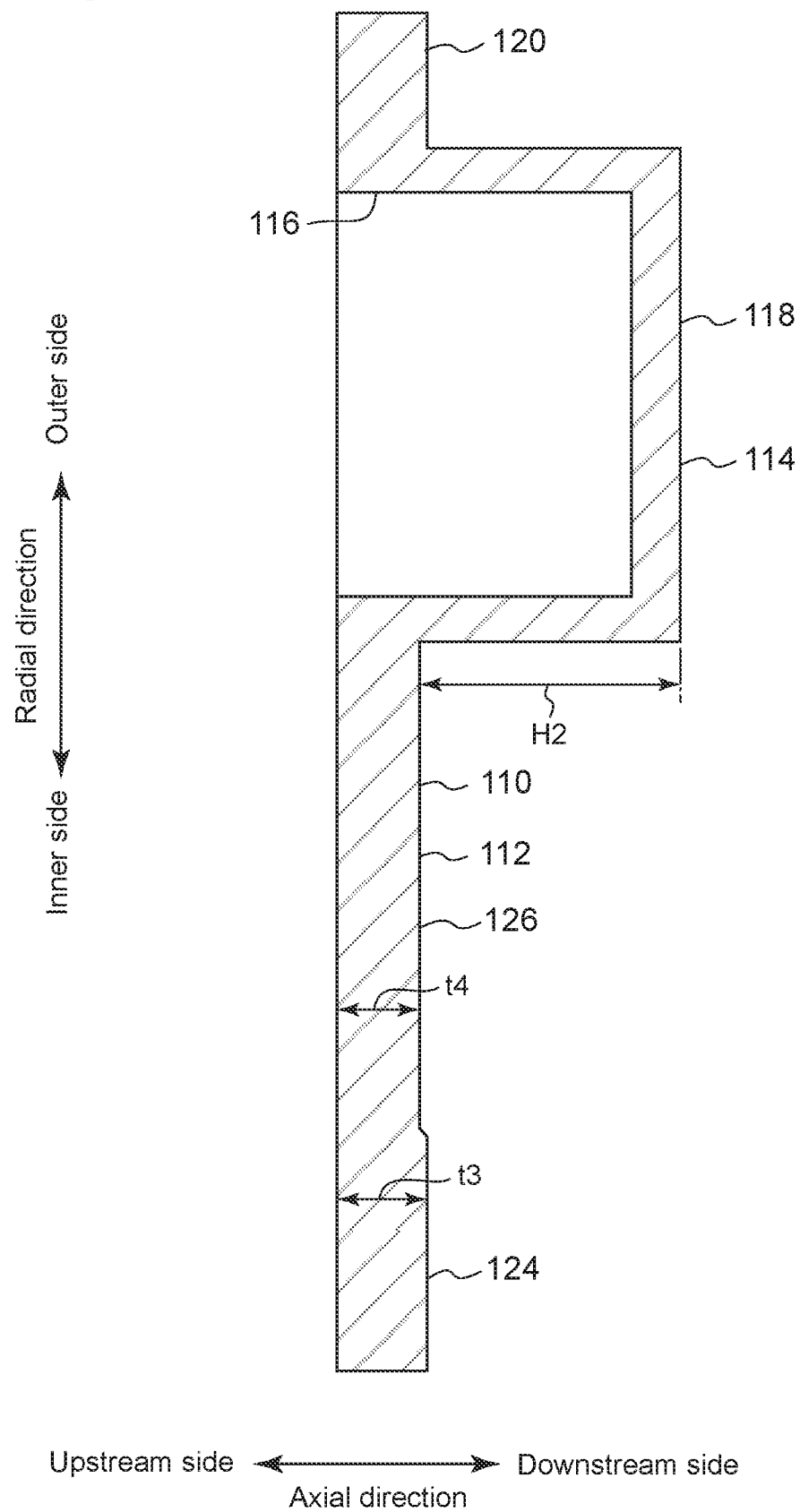
FIG. 13 is a schematic cross-sectional view taken along line B-B in FIG. 11.
Figure 14:
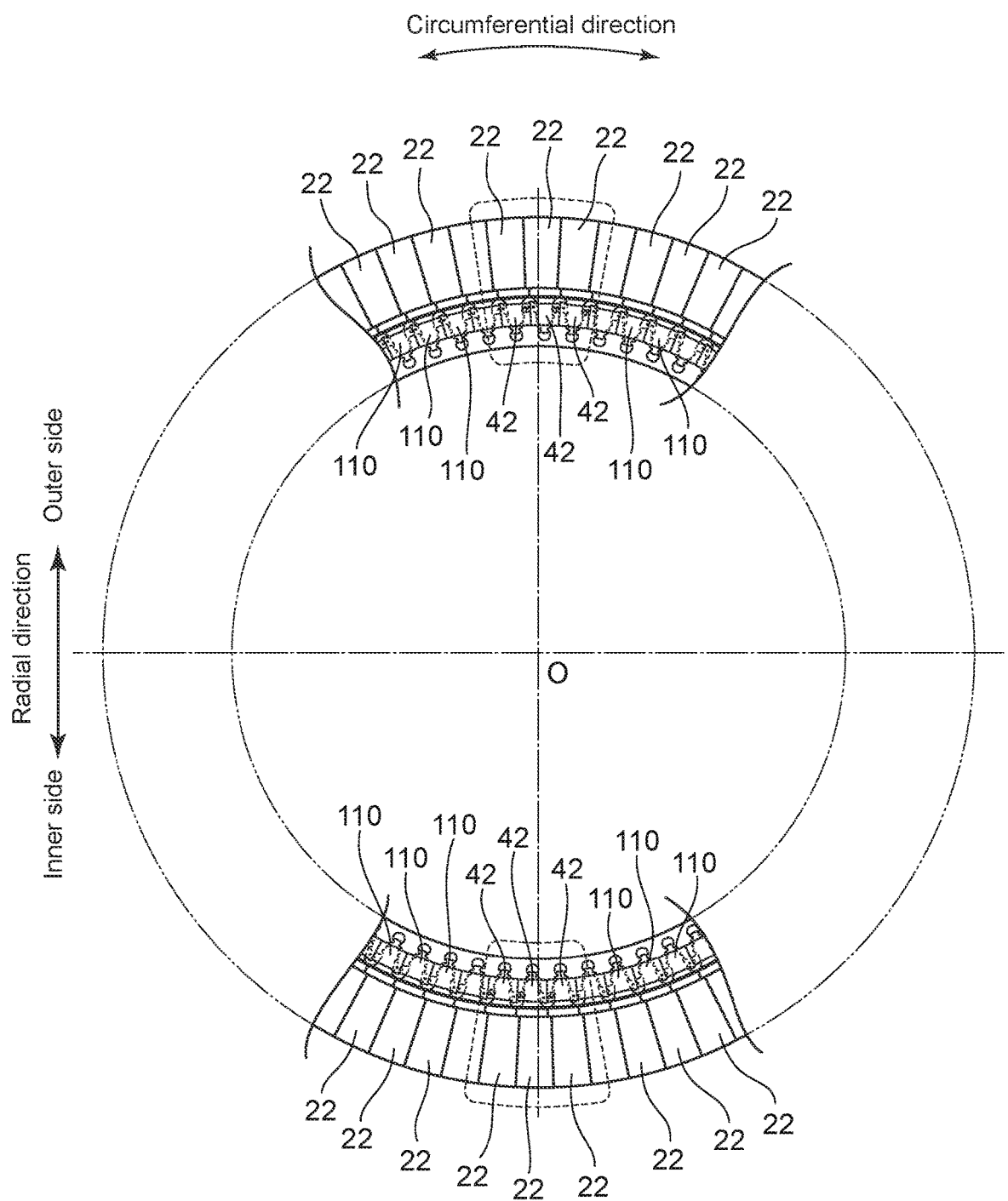
FIG. 14 is a diagram showing the circumferential arrangement of seal plate assemblies 42 and seal plates 110 in a gas turbine rotor 16 according to an embodiment.

FIG. 11 is a schematic diagram of a seal plate 110 according to an embodiment, viewed from upstream in the axial direction. FIG. 12 is a schematic diagram of the seal plate 110 according to an embodiment, viewed from downstream in the axial direction. FIG. 13 is a schematic cross-sectional view taken along line B-B in FIG. 11. FIG. 14 is a diagram showing the circumferential arrangement of the seal plate assemblies 42 and the seal plates 110 in the gas turbine rotor 16 according to an embodiment.

In an embodiment, as shown in FIGS. 11 to 14, the gas turbine rotor 16 includes a seal plate assembly 42 and a plurality of seal plates 44 each disposed at a position different from the seal plate assembly 42 and not provided with the seal plate restraint part 46.

As shown in FIGS. 11 to 13, the seal plate 110 includes a plate part 112 and a projecting part 114 protruding downstream in the axial direction (direction to which second surface 52 of seal plate 44 faces) from the plate part 112. The projecting part 114 includes at least one recessed or thinned portion 116 (second thinned portion) having different dimension from the thinned portion 104. In the illustrated embodiment, the at least one thinned portion 116 includes a plurality of thinned portions 116 arranged in the circumferential direction. The radial size S7 of each thinned portion 116 is larger than the circumferential size S8 of each thinned portion 116. Further, the radial dimension h2 of a portion of the seal plate 110 except a projection 122 described later is larger than the radial dimension h1 of a portion of the seal plate 44 except the projection 100.

The seal plates 110 are arranged in the circumferential direction, and a circumferential end portion of each seal plate 110 is superimposed on a circumferential end portion of another circumferentially adjacent seal plate 110 to form a stepped portion 118 where the circumferential end portions of the two adjacent seal plates 110 overlap each other. This structure prevents leakage of cooling air in the clearance 38 through a gap between the circumferential end portions of the circumferentially adjacent seal plates 110 to combustion gas.

Further, a radially outer end portion 120 of the seal plate 110 is provided with a projection 122 protruding radially outward. The radially outer end portion 120 of the seal plate 110 and the projection 122 are together fitted into the outer groove 36 (see FIG. 6) of the blade 22. At this time, the projection 122 of the seal plate 110 abuts on a step (not shown) provided in the outer groove 36 and thereby restricts movement of the seal plate 110 in the circumferential direction.

As shown in FIG. 13, an axially downstream end surface 118 of the projecting part 114 is formed along a plane perpendicular to the axial direction. Further, as shown in FIG. 12, the projecting part 114 protrudes downstream in the axial direction from the plate part 72 over a range W3 which is 80% or more of an existence range W2 where the seal plate 44 exists in the circumferential direction. In the embodiment shown in FIG. 12, the projecting part 114 protrudes downstream uniformly over the entire circumferential range W3 except for a range where the stepped portion is formed on one circumferential side of the downstream surface of the seal plate 110.

As shown in FIG. 13, the plate part 112 of the seal plate 110 includes two or more portions having different thicknesses. In the illustrated embodiment, the thickness t3 of the radially inner end portion 124 of the plate part 112 is equal to the thickness t1, and the thickness t4 of a portion 126 of the plate part 112 between the radially inner end portion 124 and the accommodation chamber forming part 76 is equal to the thickness t2. Further, the protrusion amount H2 of the projecting part 114 from the plate part in the axial direction is equal to the protrusion amount H1 (see FIG. 10) of the accommodation chamber forming part of the seal plate from the plate part in the axial direction.

As shown in FIG. 14, the plurality of seal plate assemblies 42 includes two or more seal plate assemblies 42 which are adjacent to each other in the circumferential direction. Further, the plurality of seal plate assemblies 42 includes a plurality of seal plate assemblies 42 arranged symmetrically with respect to the rotation center O of the rotor disc 18.

In the illustrated exemplary embodiment, the plurality of seal plate assemblies 42 includes three seal plate assemblies 42 which are adjacent in the circumferential direction and other three seal plate assemblies 42 which are symmetrical to the former three seal plate assemblies 42 with respect to the rotation center O. Further, in an angular range where the six seal plate assemblies 42 are not disposed in the circumferential direction, a plurality of seal plates 110 not provided with the seal plate restraint part 46 are arranged in the circumferential direction. Although the seal plate 44 provided with the seal plate restraint part 46 differs from the seal plates 110 not provided with the seal plate restraint part 46 in radial dimension of a portion of the seal plate except the projection, locking plates 56 for holding the seal plate 44 and the seal plate 110 may have the same shape, and locking pieces 58 configured to press the respective locking plates toward the end surface 54 of the rotor disc 18 may have the same shape.

(Method for Disassembling Gas Turbine)

A method for disassembling/assembling the gas turbine 2 having the above configuration (method for disassembling or assembling gas turbine) will now be described. Firstly, the method for disassembling the gas turbine 2 will be described. The gas turbine 2 is disassembled, for instance, at the time of maintenance.

Figure 15:
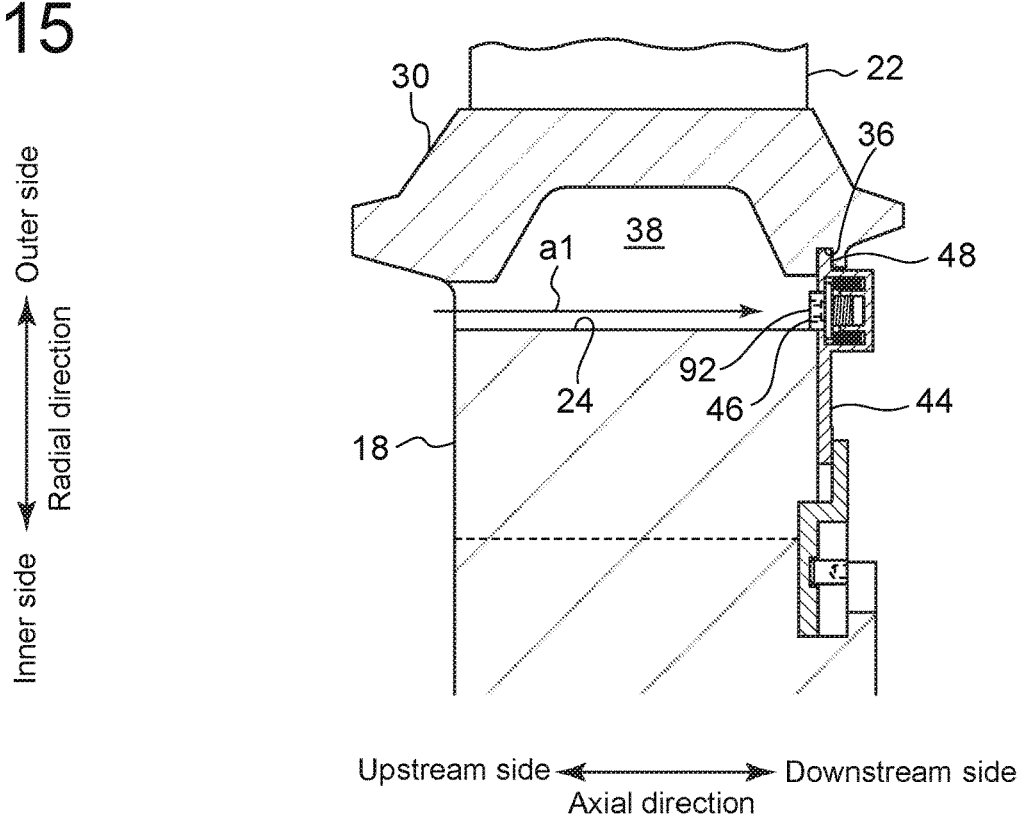
FIG. 15 is a diagram for describing a method for disassembling a gas turbine 2 according to an embodiment.
Figure 16:
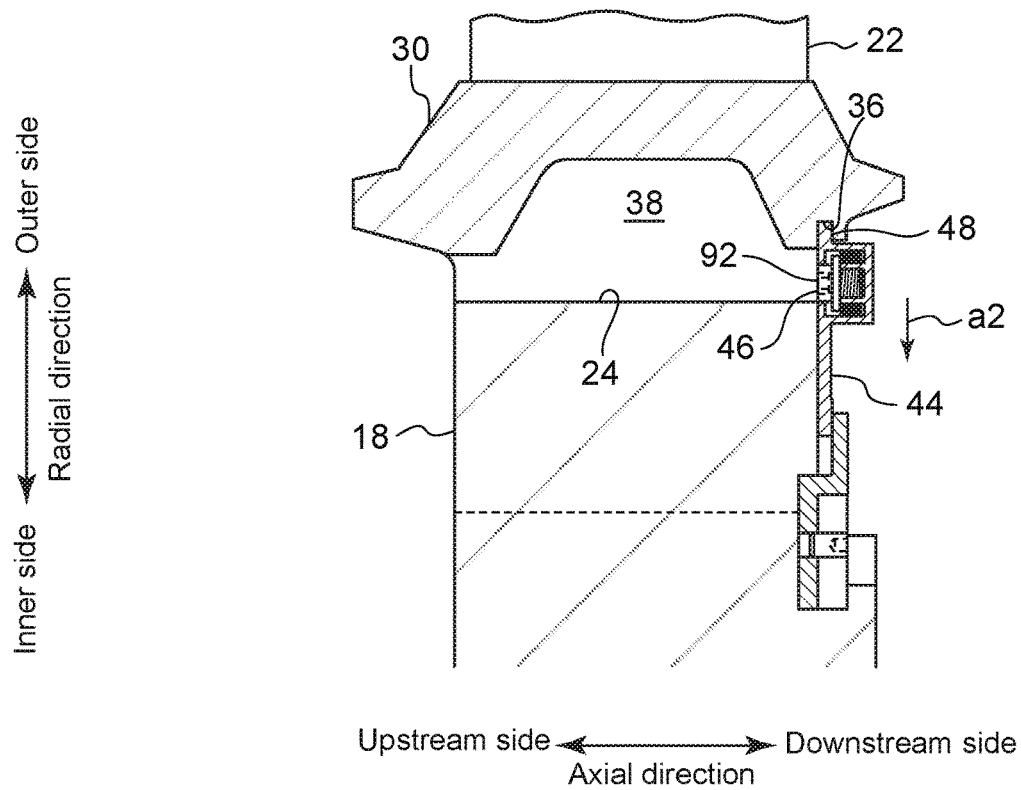
FIG. 16 is a diagram for describing a method for disassembling a gas turbine 2 according to an embodiment.

First, as shown by arrow a1 in FIG. 15, a jig (not shown) is engaged with the jig engagement portion 92 of the seal plate restraint part 46 through the clearance 38 from the upstream side in the axial direction. Then, the seal plate restraint part 46 is rotated and screwed by the jig to move the seal plate restraint part 46 downstream along the axial direction. That is, the seal plate restraint part 46 is moved relative to the seal plate 44. Thereby, a seal plate restraint state (see FIG. 15) where at least a part of the seal plate restraint part 46 protrudes upstream in the axial direction from the seal plate 44 and thereby restricts movement of the seal plate 44 in the radial direction is switched to a seal plate non-restraint state (see FIG. 16) where the seal plate restraint part 46 does not restrict movement of the seal plate 44 in the radial direction (seal-plate-restraint-state switching step).

In the seal-plate-restraint-state switching step, by moving the seal plate restraint part 46 downstream in the axial direction, an engagement state (see FIG. 15) where the seal plate restraint part 46 engages with the outer peripheral surface 24 of the rotor disc 18 is switched to a non-engagement state (see FIG. 16) where the seal plate restraint part 46 does not engage with the outer peripheral surface 24 of the rotor disc 18, thus switching between the seal plate restraint state and the seal plate non-restraint state. That is, in the seal-plate-restraint-state switching step, the seal plate restraint part 46 is moved from a position (see FIG. 15) where the seal plate restraint part 46 and the outer peripheral surface 24 of the rotor disc 18 overlap in the axial direction to a position (see FIG. 16) where the seal plate restraint part 46 and the outer peripheral surface 24 of the rotor disc 18 do not overlap in the axial direction to switch between the seal plate restraint state and the seal plate non-restraint state.

Figure 17:
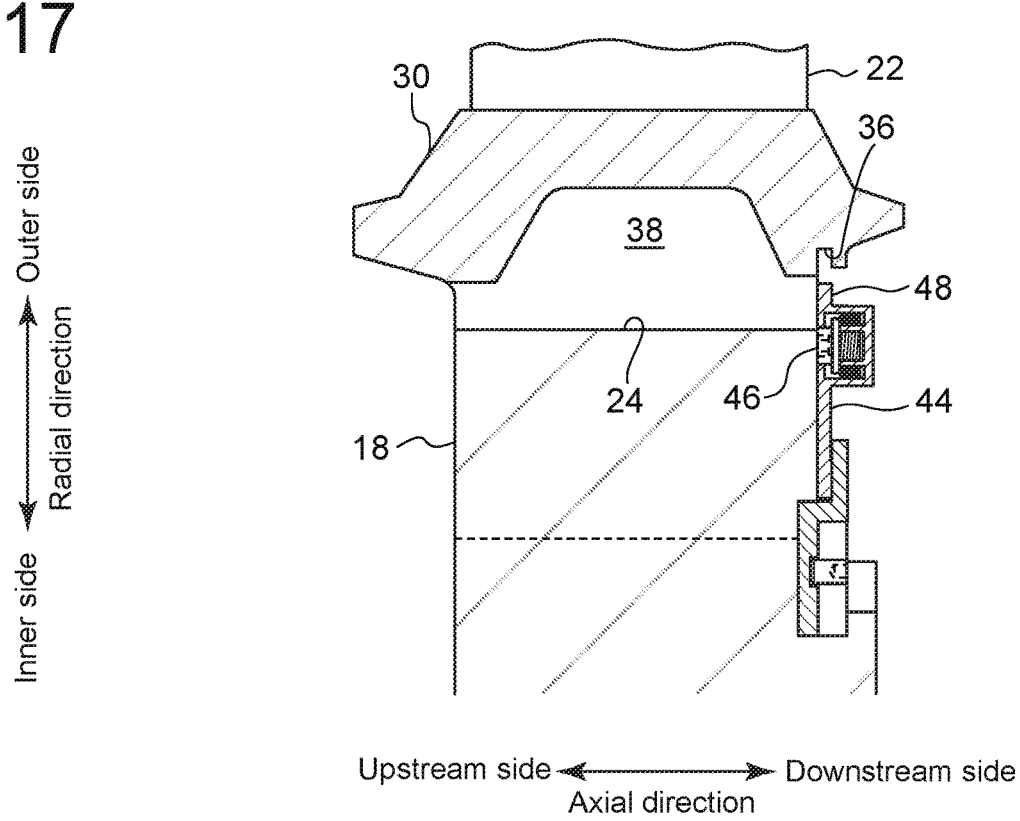
FIG. 17 is a diagram for describing a method for disassembling a gas turbine 2 according to an embodiment.

Next, a jig is engaged with the jig engagement recess 108 (see FIG. 8) of the seal plate 44 from the upstream side in the axial direction. Then, as shown by arrow a2 in FIG. 16, the seal plate 44 is pushed down and moved radially inward by the jig to release engagement between the radially outer end portion 48 of the seal plate 44 and the outer groove 36 of the blade 22. Thereby, a blade restraint state (see FIG. 16) where the seal plate 44 restricts movement of the blade 22 along the axial direction is switched to a blade non-restraint state (see FIG. 17) where the seal plate 44 does not restrict movement of the blade 22 along the axial direction (blade-restraint-state switching step).

Figure 18:
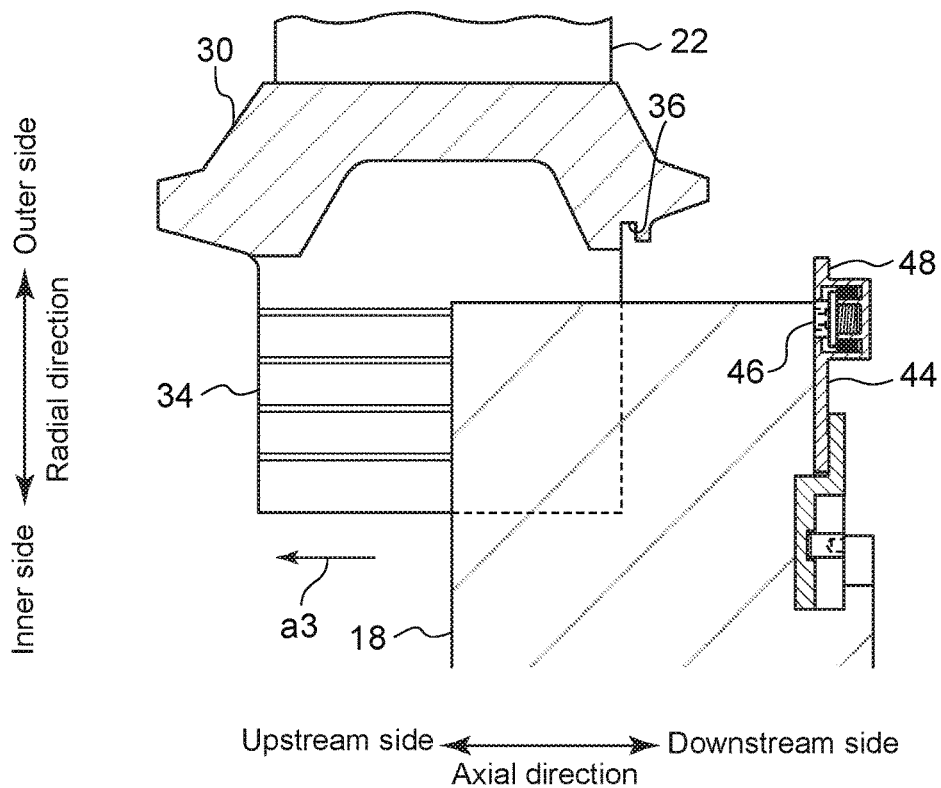
FIG. 18 is a diagram for describing a method for disassembling a gas turbine 2 according to an embodiment.

Then, as shown by arrow a3 in FIG. 18, the blade 22 is pulled out upstream in the axial direction from the blade groove 26 of the rotor disc 18 to switch from a blade fitting state (see FIG. 3) where the blade root 34 of the blade 22 is fitted in the blade groove 26 of the rotor disc 18 to a blade non-fitting state where the blade root 34 of the blade 22 is not fitted in the blade groove 26 of the rotor disc 18 (blade-fitting-state switching step). By executing the above steps, removal of the blade 22 from the rotor disc 18 is completed.

(Method for Assembling Gas Turbine)

Secondly, the method for assembling the gas turbine 2 will be described. The gas turbine 2 is assembled, for instance, at the time of manufacturing the gas turbine 2 or at the time of maintenance. The procedure of the method for assembling the gas turbine 2 is reverse to that of the method for disassembling the gas turbine 2, as described below.

Figure 19:
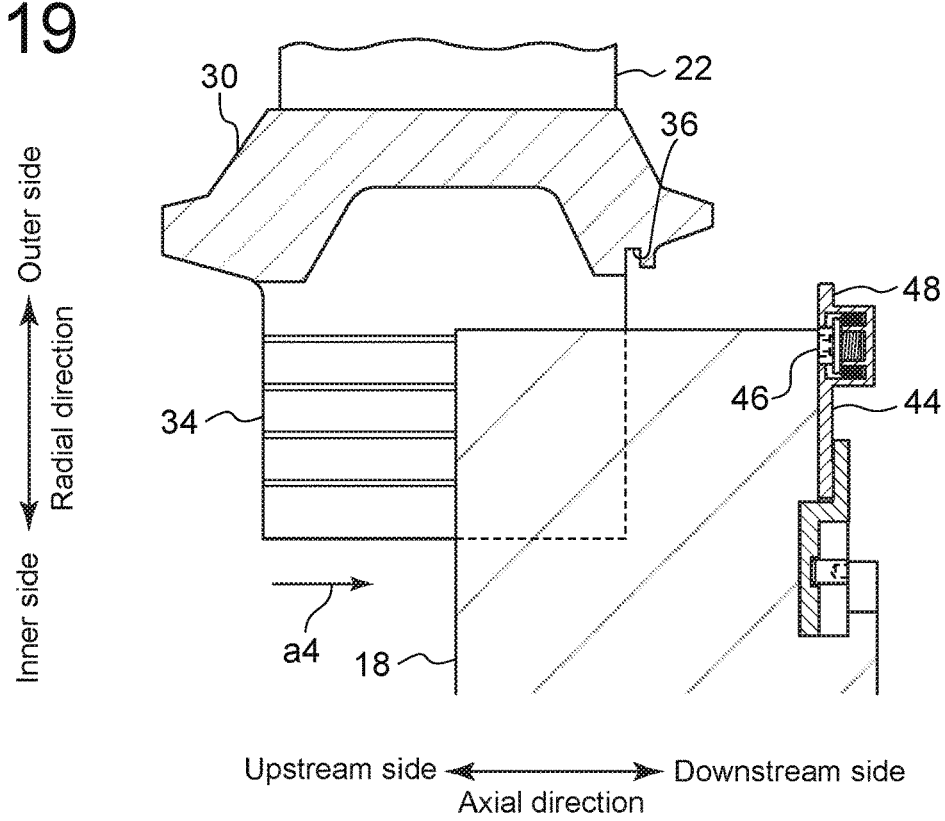
FIG. 19 is a diagram for describing a method for disassembling a gas turbine 2 according to an embodiment.

First, as shown by arrow a4 in FIG. 19, the blade root 34 of the blade 22 is inserted into the blade groove 26 (see FIG. 3) of the rotor disc 18 from the upstream side in the axial direction to switch from the blade non-fitting state where the blade root 34 of the blade 22 is not fitted in the blade groove 26 of the rotor disc 18 to the blade fitting state where the blade root 34 of the blade 22 is fitted in the blade groove 26 of the rotor disc 18 (blade-fitting-state switching step).

Figure 20:
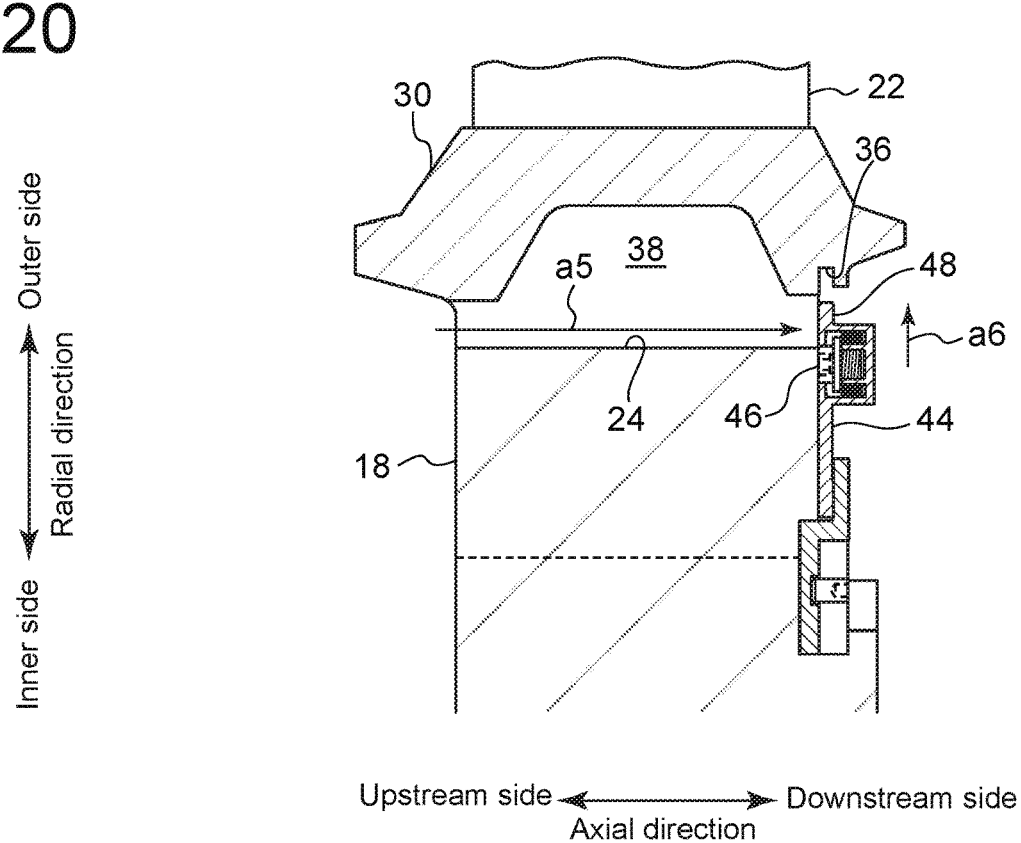
FIG. 20 is a diagram for describing a method for assembling a gas turbine 2 according to an embodiment.

Next, as shown by arrow a5 in FIG. 20, a jig is engaged with the jig engagement recess 108 (see FIG. 8) of the seal plate 44 through the clearance 38 from the upstream side in the axial direction. Then, as shown by arrow a6, the seal plate 44 is pushed up and moved radially outward by the jig to engage the radially outer end portion 48 of the seal plate 44 with the outer groove 36 of the blade 22. Thereby, the blade non-restraint state (see FIG. 20) where the seal plate 44 does not restrict movement of the blade 22 along the axial direction is switched to the blade non-restraint state (see FIG. 21) where the seal plate 44 restricts movement of the blade 22 along the axial direction (blade-restraint-state switching step).

Then, a jig (not shown) is engaged with the jig engagement portion 92 of the seal plate restraint part 46 from the upstream side in the axial direction. Then, the seal plate restraint part 46 is rotated by the jig to move the seal plate restraint part 46 upstream along the axial direction. Thereby, the seal plate non-restraint state (see FIG. 21) where the seal plate restraint part 46 does not restrict movement of the seal plate 44 in the radial direction is switched to the seal plate restraint state (see FIG. 22) where at least a part of the seal plate restraint part 46 protrudes upstream in the axial direction from the seal plate 44 and thereby restricts movement of the seal plate 44 in the radial direction (seal-plate-restraint-state switching step).

In the seal-plate-restraint-state switching step, by moving the seal plate restraint part 46 upstream in the axial direction, the non-engagement state (see FIG. 21) where the seal plate restraint part 46 does not engage with the rotor disc 18 is switched to the engagement state (see FIG. 22) where the seal plate restraint part 46 engages with the rotor disc 18, thus switching from the seal plate non-restraint state to the seal plate restraint state. That is, in the seal-plate-restraint-state switching step, the seal plate restraint part 46 is moved from a position (see FIG. 21) where the seal plate restraint part 46 and the rotor disc 18 do not overlap in the axial direction to a position (see FIG. 22) where the seal plate restraint part 46 and the rotor disc 18 overlap in the axial direction to switch from the seal plate non-restraint state to the seal plate restraint state. By executing the above steps, attachment of the blade 22 to the rotor disc 18 is completed.

Thirdly, some advantages obtainable from the above method for disassembling/assembling the gas turbine 2 will be described.

As described with reference to FIGS. 15, 16, 21, and 22, in the seal-plate-restraint-state switching step, the seal plate non-restraint state and the seal plate restraint state are switched by operating the seal plate restraint part 46 from the upstream side in the axial direction, i.e., from a side on which the seal plate restraint part 46 protrudes from the seal plate 44 (side closer to the rotor disc 18 than the seal plate 44 is in axial direction).

Thus, it is possible to switch between the seal plate restraint state and the seal plate non-restraint state from the opposite side of the rotor disc 18 from the seal plate 44, while visually recognizing whether the seal plate restraint part 46 is in the seal plate restraint state or the seal plate non-restraint state, when disassembling or assembling the gas turbine 2. Thus, it is easy to appropriately switch between the seal plate restraint state and the seal plate non-restraint state from the opposite side of the rotor disc 18 from the seal plate 44.

Thus, it is easy to appropriately switch between the engagement state and the non-engagement state between the seal plate 44 and the blade 22 from the opposite side of the rotor disc 18 from the seal plate 44, when disassembling or assembling the gas turbine 2.

In particular, in a case where a casing of the gas turbine 2 has an opening (e.g., opening for attaching combustor 6 or entrance for operators) on the upstream side of the rotor disc 18, it is possible to attach or remove the blade 22 with respect to the rotor disc 18, without removing the casing 10 of the gas turbine 2, from the upstream side of the rotor disc 18. Thus, it is possible to improve maintenance performance of the gas turbine 2.

Further, in the seal-plate-restraint-state switching step in the method for disassembling/assembling the gas turbine 2, the seal plate restraint state and the seal plate non-restraint state are switched by moving the seal plate restraint part 46 along the axial direction.

Thus, for instance, even if force acts on the seal plate restraint part 46 in a direction different from the axial direction of the seal plate restraint part 46 by friction a7 (see FIG. 7) caused between the outer peripheral surface 24 of the rotor disc 18 and the seal plate restraint part 46 due to vibration during turning (low-speed rotation) of the gas turbine rotor 16, or due to acceleration or deceleration of rotation of the rotor disc 18 during turning of the gas turbine rotor 16, the seal plate non-restraint state and the seal plate restraint state are not easily switched.

Thus, it is possible to control switching between the engagement state and the non-engagement state between the seal plate 44 and the blade 22 at an unintended timing.

Further, in the seal-plate-restraint-state switching step in the method for disassembling/assembling the gas turbine 2, the seal plate restraint state and the seal plate non-restraint state are switched by rotating the seal plate restraint part 46 while the male thread 86 (see FIG. 6) provided in the seal plate restraint part 46 is screwed with the female thread 84 (see FIG. 6) provided in the seal plate 44.

With the above configuration, since the seal plate non-restraint state and the seal plate restraint state are switched by rotating the seal plate restraint part 46 while the male thread 86 is screwed with the female thread 84, it is possible to easily control the protruding state of the seal plate restraint part 46. That is, it is possible to control the moving amount of the male thread 86 relative to the female thread 84, and thus it is possible to prevent the seal plate restraint part 46 from protruding unintentionally. Thus, it is possible to enhance the effect of controlling switching between the engagement state and the non-engagement state between the seal plate 44 and the blade 22 at an unintended timing. Further, since the seal plate non-restraint state and the seal plate restraint state are not switched unless the seal plate restraint part 46 is rotated, it is possible to move the seal plate 44 in the radial direction smoothly and easily while keeping the seal plate non-restraint state, for instance.

When the gas turbine rotor 16 is rotating at high rotational speed, the seal plate 44 is held to the outer groove 36 by centrifugal force, and thus the seal plate restraint part 46 is not in contact with the outer peripheral surface 24 of the rotor disc. However, when the gas turbine rotor 16 is turning, the seal plate 44 moves radially inward due to its own weight, and the seal plate restraint part 46 comes into contact with the outer peripheral surface 24. At this time, the seal plate restraint part 46 intends to rotate in a direction opposite to the rotational direction of the gas turbine rotor 16 due to friction.

Accordingly, the male thread 86 and the female thread 84 are threaded so as to rotate in a direction in which the seal plate restraint part 46 protrudes when they receive friction from the outer peripheral surface 24 of the rotor disc 18 during turning of the gas turbine rotor 16. For instance, in a case where the rotational direction of the gas turbine rotor 16 is counterclockwise in the upstream view, the male thread 86 and the female thread 84 are threaded so as to rotate in a direction in which the seal plate restraint part 46 protrudes upstream in the axial direction when the seal plate restraint part 46 intends to rotate clockwise in the upstream view.

Further, in the seal-plate-restraint-state switching step in the method for disassembling/assembling the gas turbine 2, the seal plate restraint state and the seal plate non-restraint state are switched by moving the seal plate restraint part 46 along the axial direction against a biasing force of the biasing part 94 (see FIG. 6) biasing the seal plate restraint part 46.

Accordingly, even if a weaker force than the biasing force of the biasing part acts on the seal plate restraint part 46, the seal plate restraint state is not switched to the seal plate non-restraint state. Thus, it is possible to enhance the effect of controlling switching between the engagement state and the non-engagement state between the seal plate 44 and the blade 22 at an unintended timing.

Further, the biasing force of the biasing part 94 reduces loosening of the thread 86. Thus, also for this reason, it is possible to enhance the effect of controlling switching between the engagement state and the non-engagement state between the seal plate 44 and the blade 22 at an unintended timing.

Figure 21:
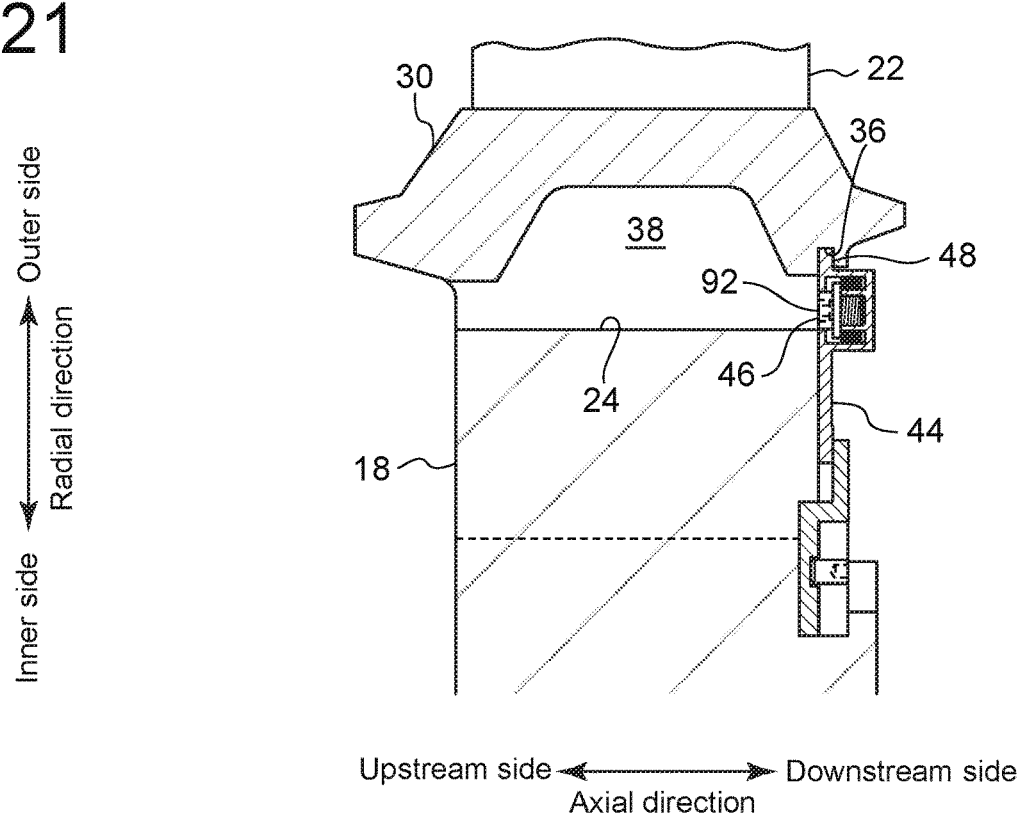
FIG. 21 is a diagram for describing a method for assembling a gas turbine 2 according to an embodiment.
Figure 22:
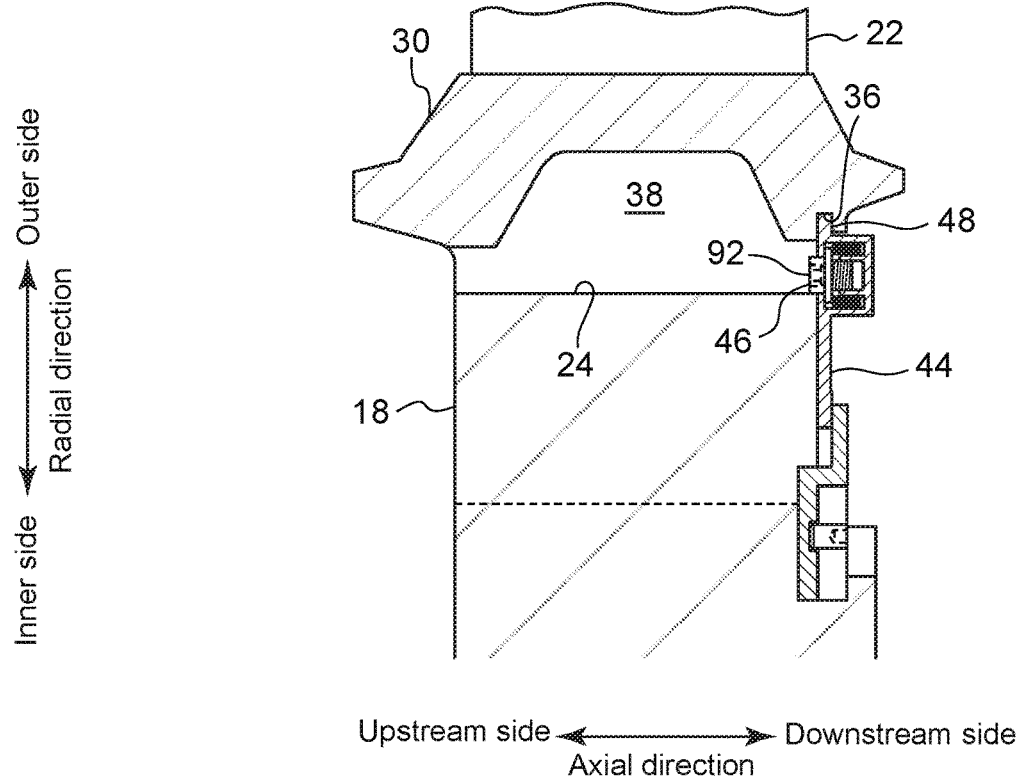
FIG. 22 is a diagram for describing a method for assembling a gas turbine 2 according to an embodiment.

Further, in the seal-plate-restraint-state switching step, as shown in FIGS. 7, 15, and 21, the seal plate restraint state and the seal plate non-restraint state are switched by operating the seal plate restraint part 46 from the upstream side in the axial direction, via the clearance 38 between the platform 30 of the blade 22 and the region 128 on the outer peripheral surface 24 of the rotor disc 18 except the blade groove 26 for receiving the blade 22. In this case, the seal plate restraint state and the seal plate non-restraint state are switched by operating the seal plate restraint part 46 through a space between two adjacent blades 22 on the radially inner side of the platforms of the two blades 22.

With this method, it is possible to easily switch between the engagement state and the non-engagement state between the seal plate and the blade. The reasons will now be described.

The resonance of the blade 22 can be avoided by adjusting the natural frequency of the blade 22 through adjustment of the length of the shank 32 between the platform 30 and the blade root 34 of the blade 22. Further, the shape and the size of the blade root 34 of the blade 22 are determined based on required strength. Meanwhile, it is not preferable to increase the outer diameter of the rotor disc 18 larger than necessary, in view of suppressing the increase in centrifugal force of the rotor disc 18.

Accordingly, in case of adopting a configuration which suppresses the increase in centrifugal force of the rotor disc 18 while avoiding the resonance of the blade 22, a wide clearance 38 is likely to be formed between the platform 30 of the blade 22 and the region 128 on the outer peripheral surface 24 of the rotor disc 18 except the blade groove 26 for receiving the blade 22.

Thus, it is possible to operate the seal plate restraint part 46 via the wide clearance 38 to switch between the seal plate non-restraint state and the seal plate restraint state, which facilitates the switching. Consequently, it is possible to easily switch between the engagement state and the non-engagement state between the seal plate and the blade.

(Modification of Seal Plate Assembly)

Next, modifications according to some embodiments will be described. Seal plate assemblies 42(42B to 42K, M) according to the following modifications differ from the above-described seal plate assembly 42(42A) in the configuration for switching between the seal plate non-restraint state and the seal plate restraint state. In the following modifications, elements having the same functions as those in the above embodiments are denoted by the same reference signs, and description thereof will be omitted. The characteristic features of each modification will be mainly described below.

Figure 23:
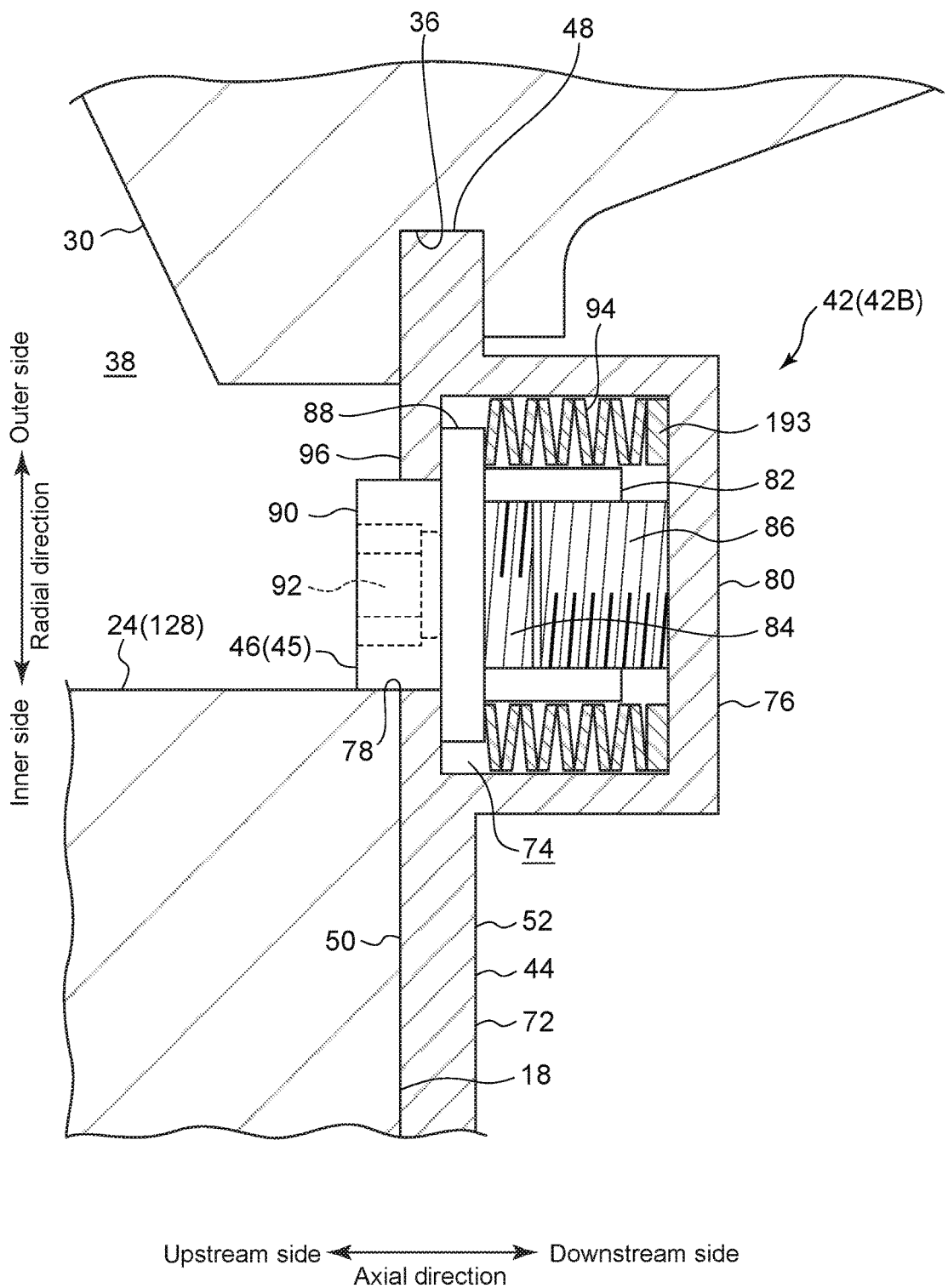
FIG. 23 is an enlarged cross-sectional view of the vicinity of a seal plate restraint part 46 (movable part) of a seal plate assembly 42(42B) according to an embodiment, taken along the axial direction.

FIG. 23 is an enlarged cross-sectional view of the vicinity of a seal plate restraint part 46 (movable part) of a seal plate assembly 42(42B) according to an embodiment, taken along the axial direction.

In the seal plate assembly 42(42A) shown in FIG. 6, the cylindrical part 82 having the female thread 84 is included in the accommodation chamber forming part 76 of the seal plate 44, while the male thread 86 screwed with the female thread 84 is included in the seal plate restraint part 46. By contrast, in the seal plate assembly 42(42B) shown in FIG. 23, the cylindrical part 82 having the female thread 84 is included in the seal plate restraint part 46, while the male thread 86 screwed with the female thread 84 is included in the accommodation chamber forming part 76 of the seal plate 44.

The above configuration also enables operation on the upstream side in the axial direction to rotate the seal plate restraint part 46 and thereby move the seal plate restraint part 46 along the axial direction, as in the seal-plate-restraint-state switching step described above. Thereby, it is possible to switch between the seal plate non-restraint state where the seal plate restraint part 46 does not restrict movement of the seal plate 44 in the radial direction and the seal plate restraint state where at least a part of the seal plate restraint part 46 protrudes upstream in the axial direction from the seal plate 44 and thereby restricts movement of the seal plate 44 in the radial direction.

Figure 24:
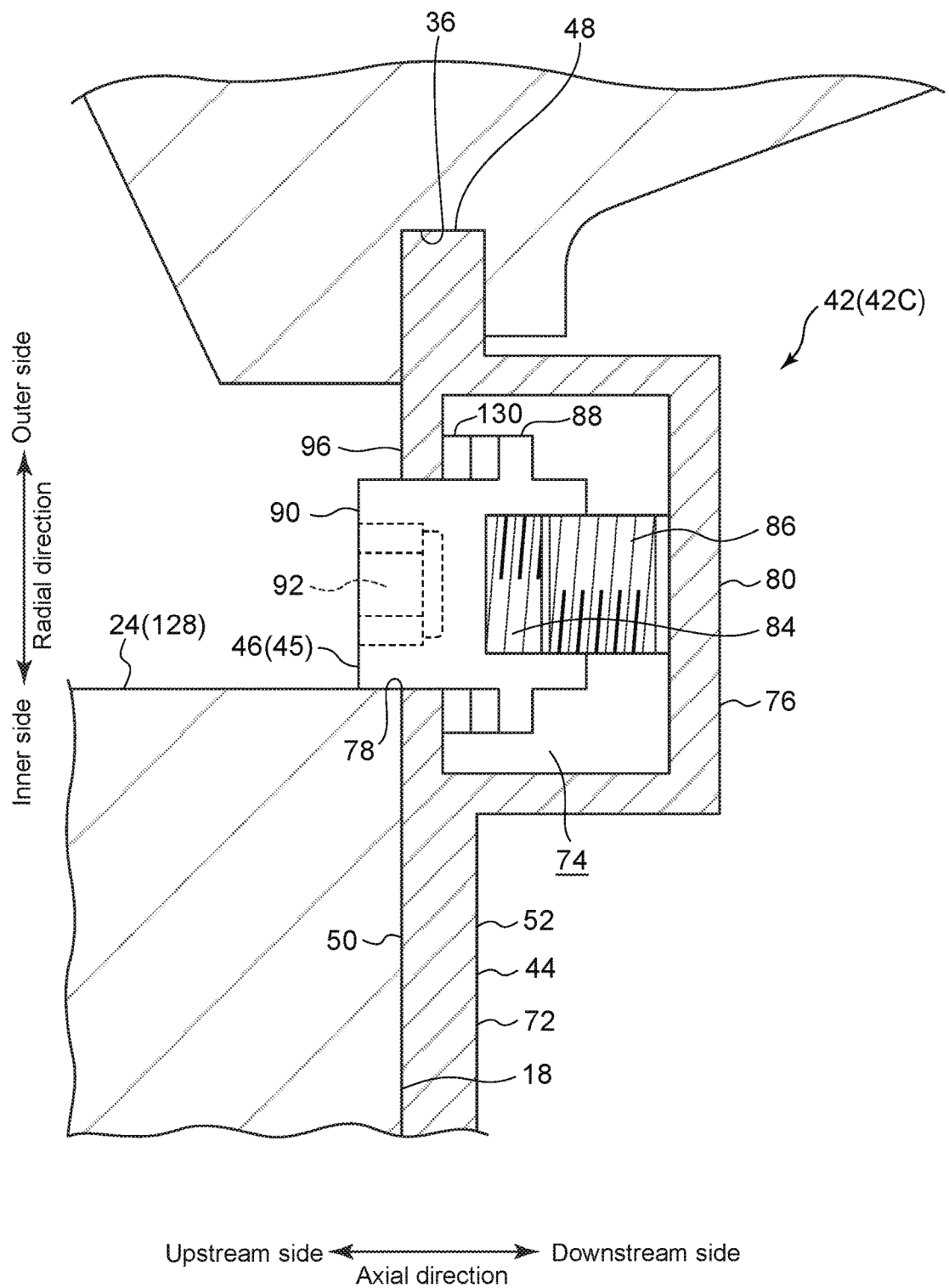
FIG. 24 is an enlarged cross-sectional view of the vicinity of a seal plate restraint part 46 (movable part) of a seal plate assembly 42(42C) according to an embodiment, taken along the axial direction.

FIG. 24 is an enlarged cross-sectional view of the vicinity of a seal plate restraint part 46 (movable part) of a seal plate assembly 42(42C) according to an embodiment, taken along the axial direction.

In the seal plate assembly 42 shown in FIG. 24, as in the embodiment shown in FIG. 23, the cylindrical part 82 having the female thread 84 is included in the seal plate restraint part 46, while the male thread 86 screwed with the female thread 84 is included in the accommodation chamber forming part 76 of the seal plate 44. The outer peripheral surface of the cylindrical part 82 is provided with a brim part 88 protruding outward in the radial direction of the female thread 84, and a Nord-Lock washer 130 is disposed between the brim part 88 and a brim restraint part 96 of the accommodation chamber forming part 76.

The above configuration also enables operation on the upstream side in the axial direction to rotate the seal plate restraint part 46 and thereby move the seal plate restraint part 46 along the axial direction, as in the seal-plate-restraint-state switching step described above. Thereby, it is possible to switch between the seal plate non-restraint state where the seal plate restraint part 46 does not restrict movement of the seal plate 44 in the radial direction and the seal plate restraint state where at least a part of the seal plate restraint part 46 protrudes upstream in the axial direction from the seal plate 44 and thereby restricts movement of the seal plate 44 in the radial direction.

Further, with the above configuration, since the Nord-Lock washer 130 serves to restrict rotation of the seal plate restraint part 46, it is possible to control switching between the seal plate restraint state and the seal plate non-restraint state at an unintended timing.

Figure 25:
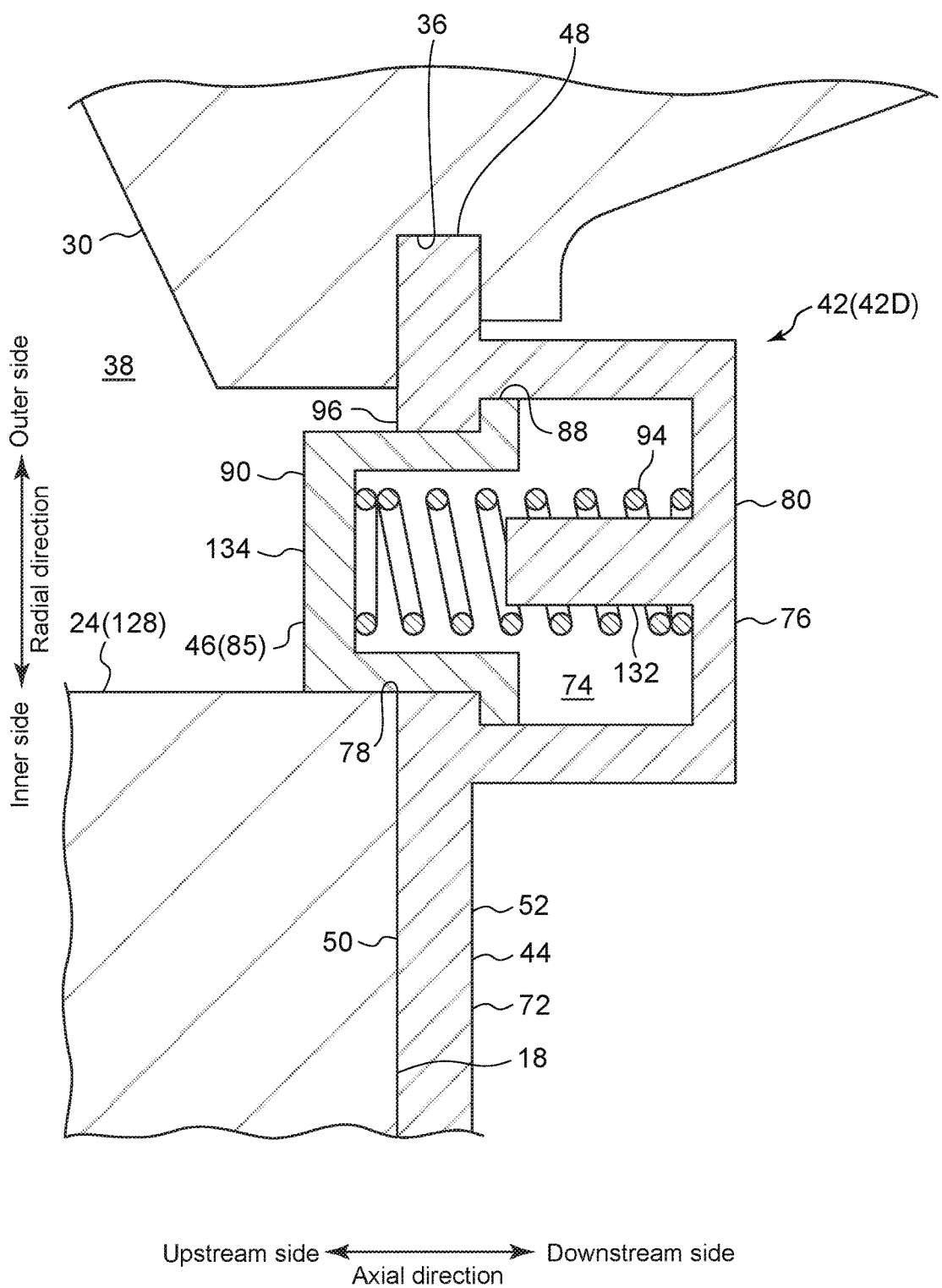
FIG. 25 is an enlarged cross-sectional view of the vicinity of a seal plate restraint part 46 (movable part) of a seal plate assembly 42(42D) according to an embodiment, taken along the axial direction.

FIG. 25 is an enlarged cross-sectional view of the vicinity of a seal plate restraint part 46 (movable part) of a seal plate assembly 42(42D) according to an embodiment, taken along the axial direction.

In the embodiment shown in FIG. 25, the seal plate assembly 42 includes a seal plate restraint part 46 formed as a cylindrical member 85 having a closed axially upstream end, and a biasing part 94 biasing the seal plate restraint part 46 upstream in the axial direction. In the illustrated embodiment, the biasing part 94 is configured as a coil spring. The biasing part 94 is supported by a strut 132 protruding in the axial direction from the wall part 80 on the downstream side of the accommodation chamber forming part 76 of the seal plate 44. The seal plate assembly 42(42D) has a simpler structure than the seal plate assembly 42(42A to 42C) in that a thread mechanism is not provided in the seal plate restraint part 46 and in the seal plate 44.

Figure 26:
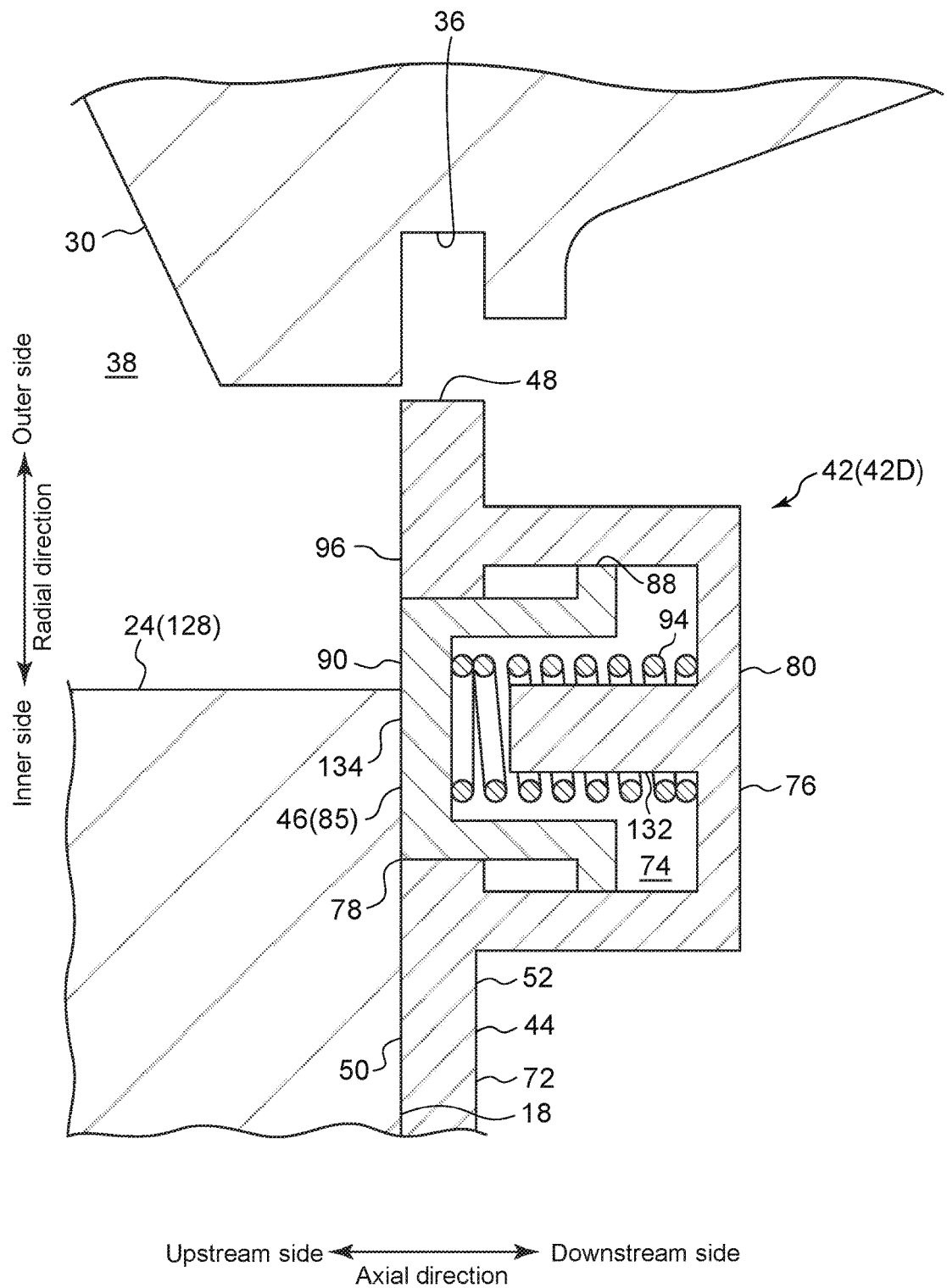
FIG. 26 is an enlarged cross-sectional view of the vicinity of a seal plate restraint part 46 (movable part) of a seal plate assembly 42(42D) according to an embodiment, taken along the axial direction.

In the seal plate assembly 42(42D), as shown in FIGS. 25 and 26, by pushing an axially upstream end surface 134 of the seal plate restraint part 46 downstream in the axial direction against the biasing force of the biasing part 94, the seal plate restraint part 46 can be moved downstream along the axial direction. Thereby, it is possible to switch from the seal plate restraint state (see FIG. 25) where at least a part of the seal plate restraint part 46 protrudes in the axial direction from the seal plate 44 and thereby restricts movement of the seal plate 44 in the radial direction to the seal plate non-restraint state (see FIG. 26) where the seal plate restraint part 46 does not restrict movement of the seal plate 44 in the radial direction.

In the embodiment shown in FIGS. 25 and 26, in contract to the above-described seal plate assemblies 42(42A to 42C), a thread mechanism is not provided in the seal plate restraint part. Therefore, it is necessary to impart a downstream force to the seal plate restraint part 46 in order to keep the seal plate non-restraint state. Accordingly, in the blade-restraint-state switching step, while pushing the upstream end surface 134 of the seal plate restraint part 46 in the downstream direction to keep the seal plate non-restraint state, a jig is engaged with the jig engagement recess 108 (see FIG. 8) formed in the seal plate 44, and the seal plate 44 is moved in the radial direction. Thereby, the blade restraint state can be switched to the blade non-restraint state.

Figure 27:
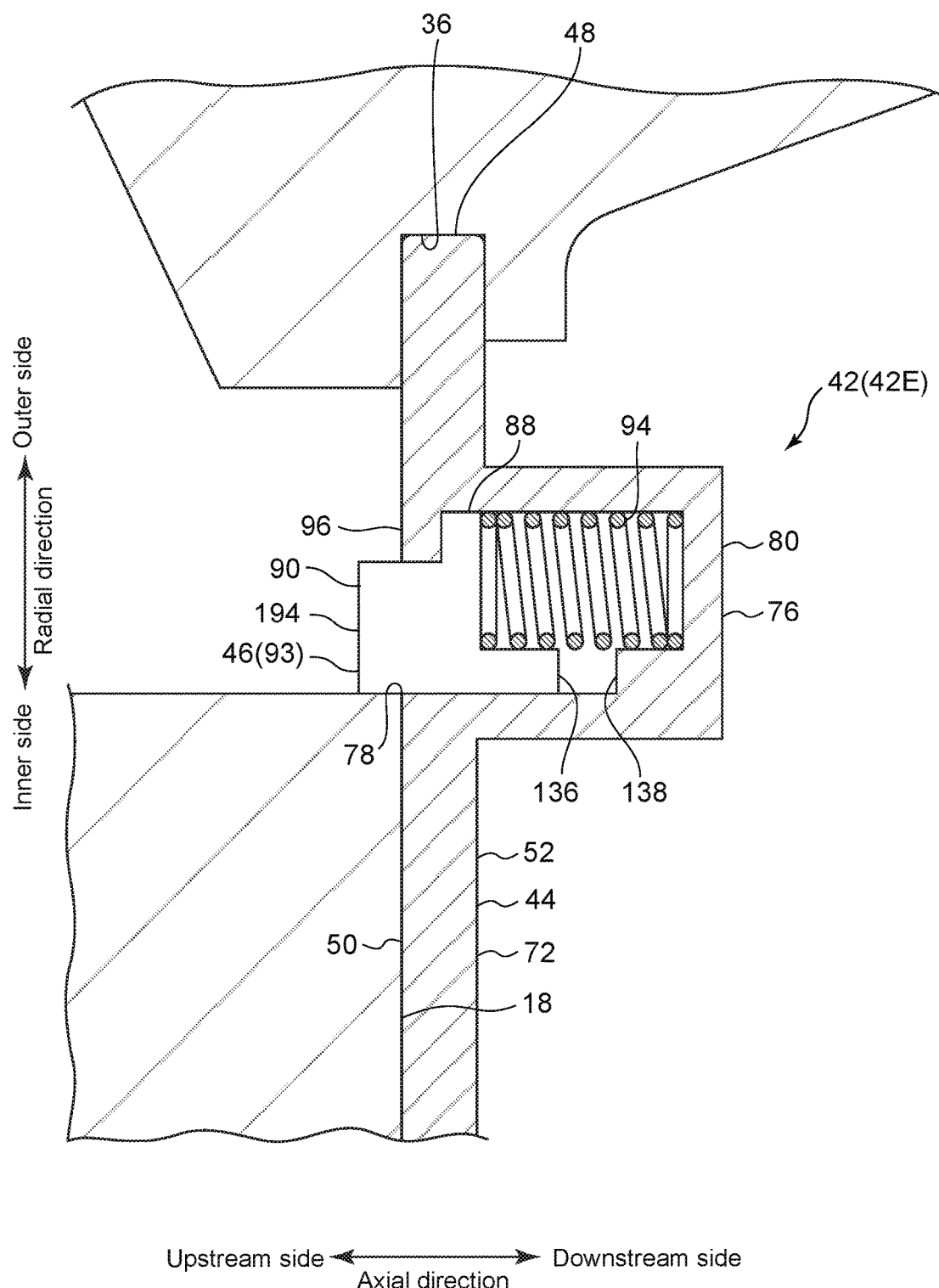
FIG. 27 is an enlarged cross-sectional view of the vicinity of a seal plate restraint part 46 (movable part) of a seal plate assembly 42(42E) according to an embodiment, taken along the axial direction.

FIG. 27 is an enlarged cross-sectional view of the vicinity of a seal plate restraint part 46 (movable part) of a seal plate assembly 42(42E) according to an embodiment, taken along the axial direction.

42(42E) shown in FIG. 27 includes a seal plate restraint part 46 configured as a pin 93 and a biasing part 94 configured as a coil spring. The seal plate restraint part 46 includes a compression restriction part 136 disposed on a downstream end in the axial direction, a brim part 88 protruding radially outward from the compression restriction part 136, and a protruding part 90 protruding upstream in the axial direction from the brim part 88. The biasing part 94 is configured to bias the brim part 88 upstream. The accommodation chamber forming part 76 has a facing part 138 which faces the compression restriction part 136 in the axial direction. The compression restriction part 136 is configured to come into contact with the facing part 138, and this contact restricts axially downstream movement of the seal plate restraint part 46, thereby preventing excessive compression of the biasing part 94. The seal plate assembly 42(42E) has a simpler structure than the seal plate assembly 42(42A to 42C) in that a thread mechanism is not provided in the seal plate restraint part 46 and in the seal plate 44.

Figure 28:
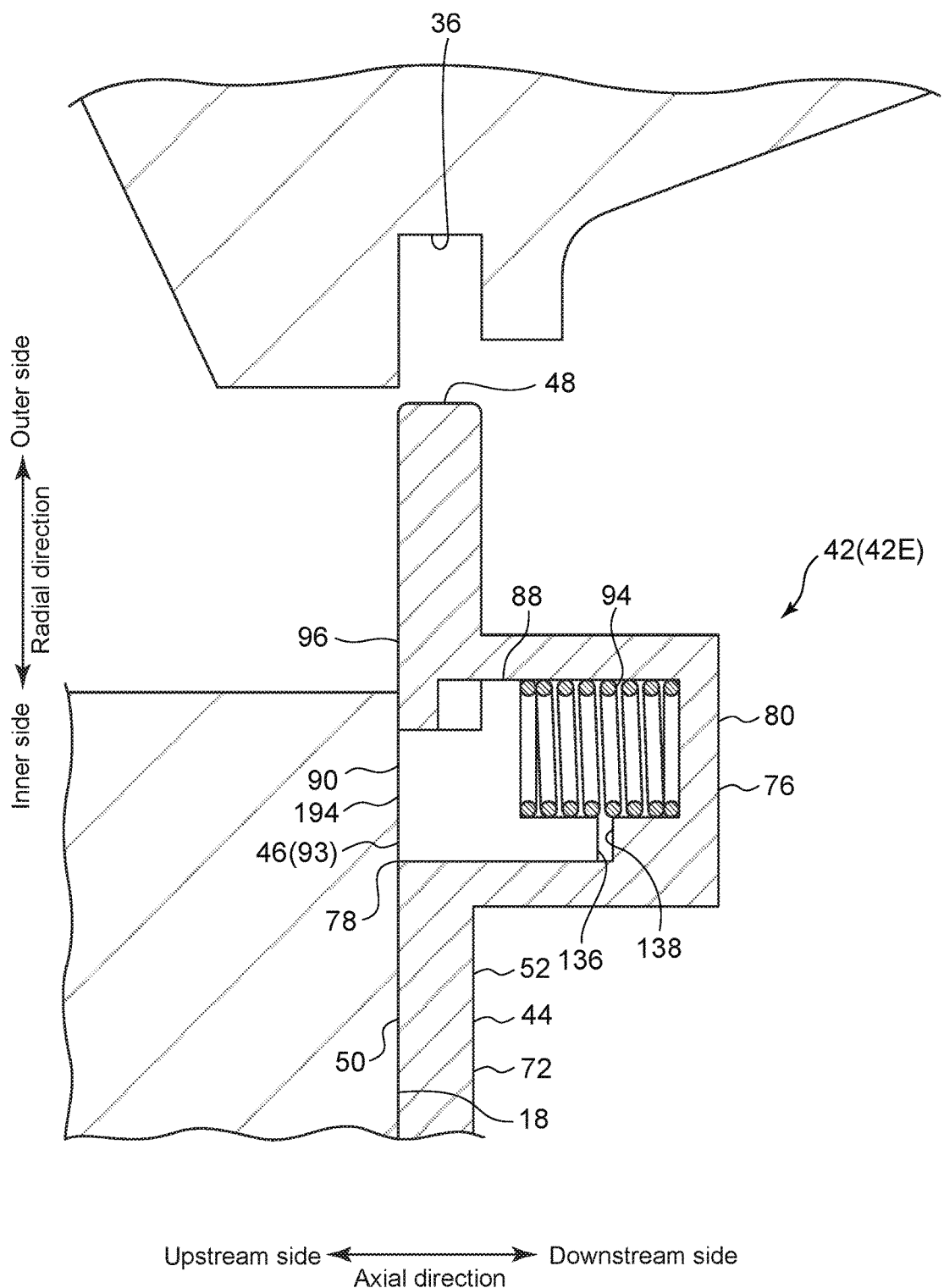
FIG. 28 is an enlarged cross-sectional view of the vicinity of a seal plate restraint part 46 (movable part) of a seal plate assembly 42(42E) according to an embodiment, taken along the axial direction.

In the seal plate assembly 42(42E), as shown in FIGS. 27 and 28, by pushing an axially upstream end surface 194 of the seal plate restraint part 46 downstream in the axial direction, the seal plate restraint part 46 can be moved downstream along the axial direction, as in the seal plate assembly 42(42E). Thereby, it is possible to switch from the seal plate restraint state (see FIG. 27) where at least a part of the seal plate restraint part 46 protrudes upstream in the axial direction from the seal plate 44 and thereby restricts movement of the seal plate 44 in the radial direction to the seal plate non-restraint state (see FIG. 28) where the seal plate restraint part 46 does not restrict movement of the seal plate 44 in the radial direction. Further, the blade-restraint-state switching step can also be performed in the same way as in the seal plate assembly 42(42E).

Figure 29:
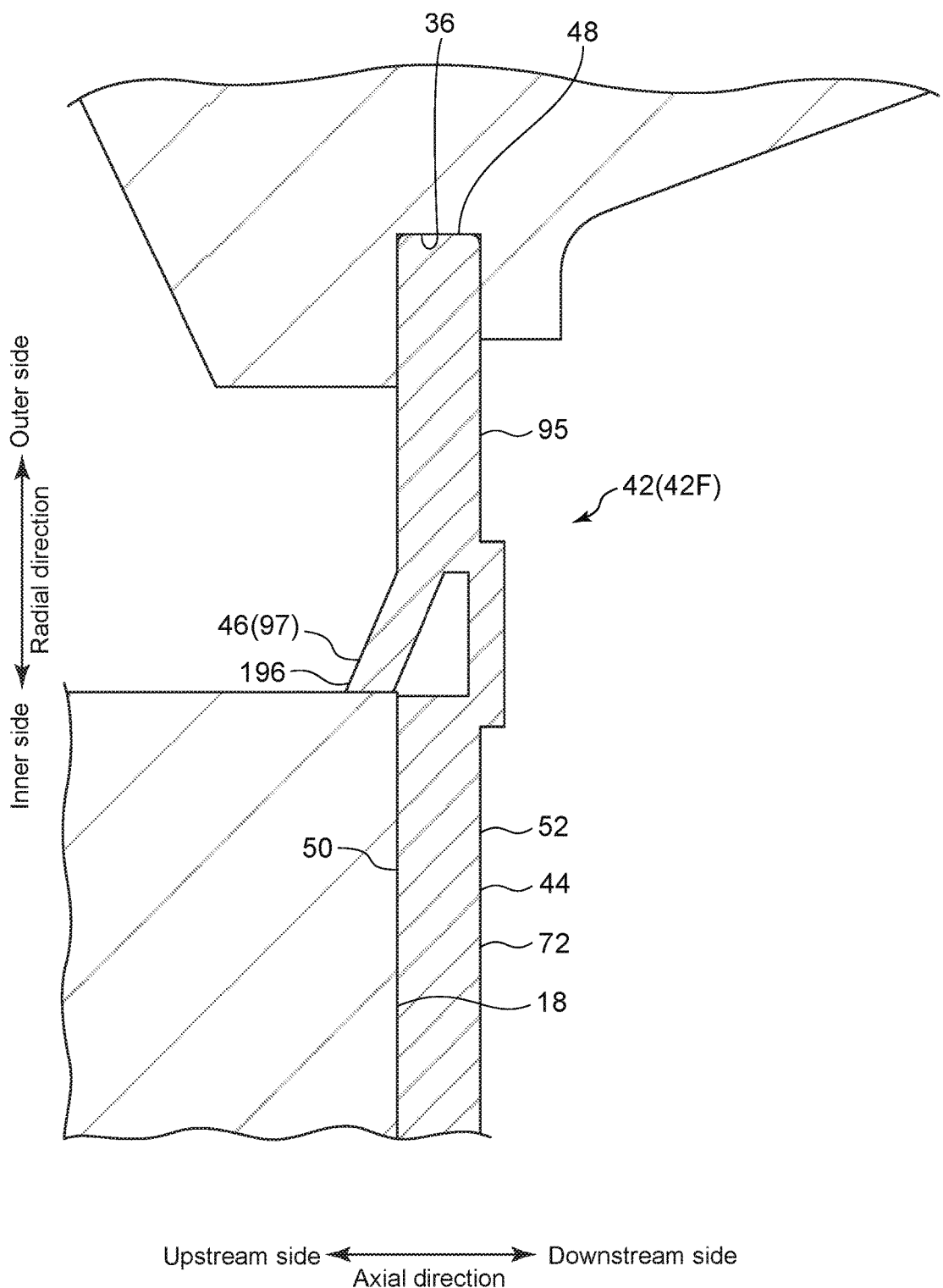
FIG. 29 is an enlarged cross-sectional view of the vicinity of a seal plate restraint part 46 (movable part) of a seal plate assembly 42(42F) according to an embodiment, taken along the axial direction.

FIG. 29 is an enlarged cross-sectional view of the vicinity of a seal plate restraint part 46 (movable part) of a seal plate assembly 42(42F) according to an embodiment, taken along the axial direction.

In the embodiment shown in FIG. 29, the seal plate 44 and the seal plate restraint part 46 are formed integrally. The seal plate restraint part 46 is formed as a branch part 97 diverging from a body part 95 of the seal plate 44, and protrudes upstream in the axial direction and inward in the radial direction from the body part 95 in the seal plate restraint state. This seal plate assembly 42 has a simpler structure than the seal plate assemblies 42(42A to 42E) in that it does not include the biasing part and the thread mechanism.

Figure 30:
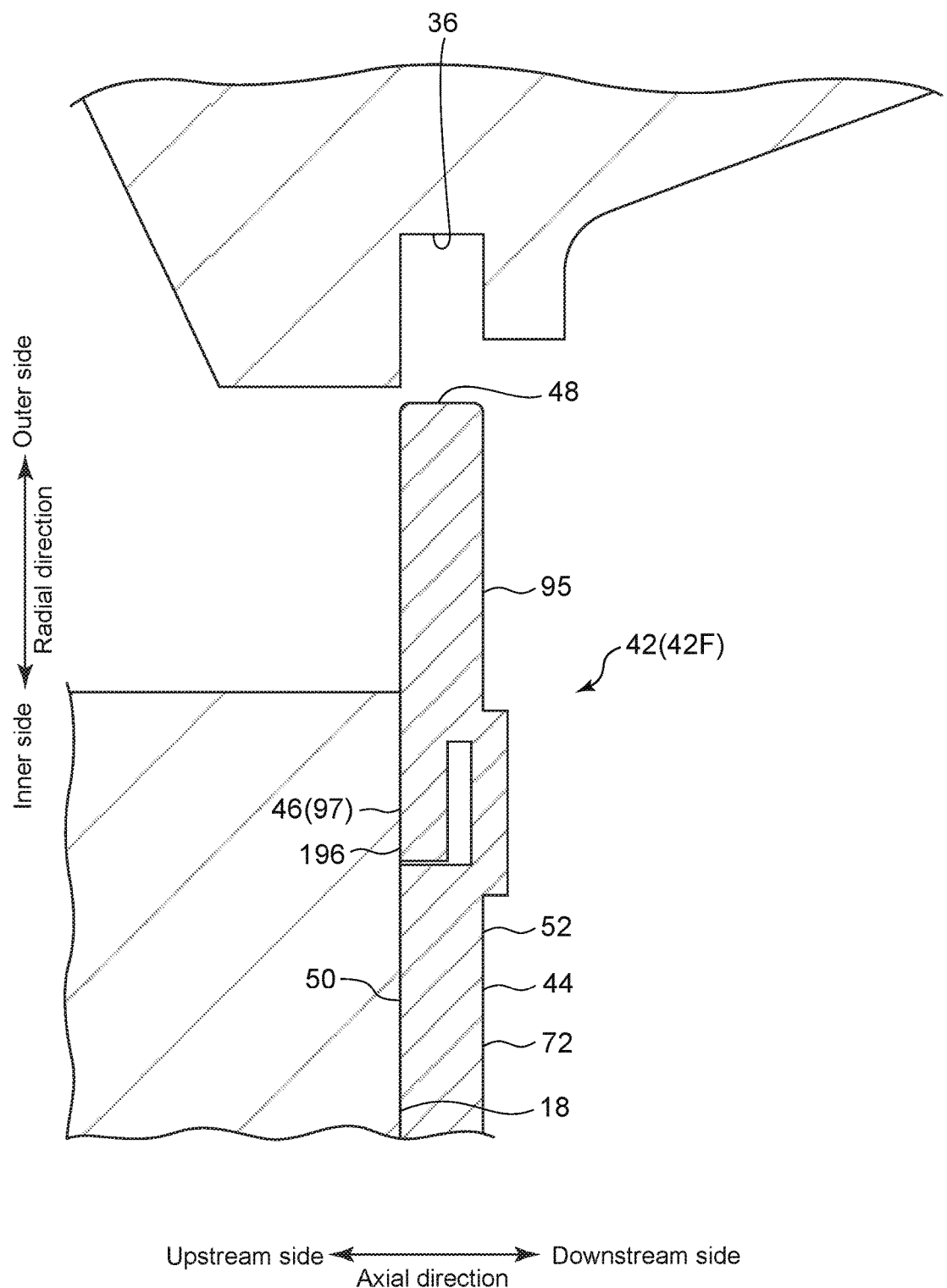
FIG. 30 is an enlarged cross-sectional view of the vicinity of a seal plate restraint part 46 (movable part) of a seal plate assembly 42(42F) according to an embodiment, taken along the axial direction.

In this seal plate assembly 42, as shown in FIGS. 29 and 30, by pushing an end surface 196 of the seal plate restraint part 46 from the upstream side in the axial direction to plastically deform the seal plate restraint part 46 downstream in the axial direction, it is possible to switch from the seal plate restraint state (see FIG. 29) where at least a part of the seal plate restraint part 46 protrudes upstream in the axial direction from the seal plate 44 and thereby restricts movement of the seal plate 44 in the radial direction to the seal plate non-restraint state (see FIG. 30) where the seal plate restraint part 46 does not restrict movement of the seal plate 44 in the radial direction. Further, by pulling the seal plate restraint part 46 from the upstream side in the axial direction to plastically deform the seal plate restraint part 46 upstream in the axial direction, it is possible to switch from the seal plate non-restraint state (see FIG. 30) where the seal plate restraint part 46 does not restrict movement of the seal plate 44 in the radial direction to the seal plate restraint state (FIG. 29) where at least a part of the seal plate restraint part 46 protrudes upstream in the axial direction from the seal plate 44 and thereby restricts movement of the seal plate 44 in the radial direction.

Figure 31:
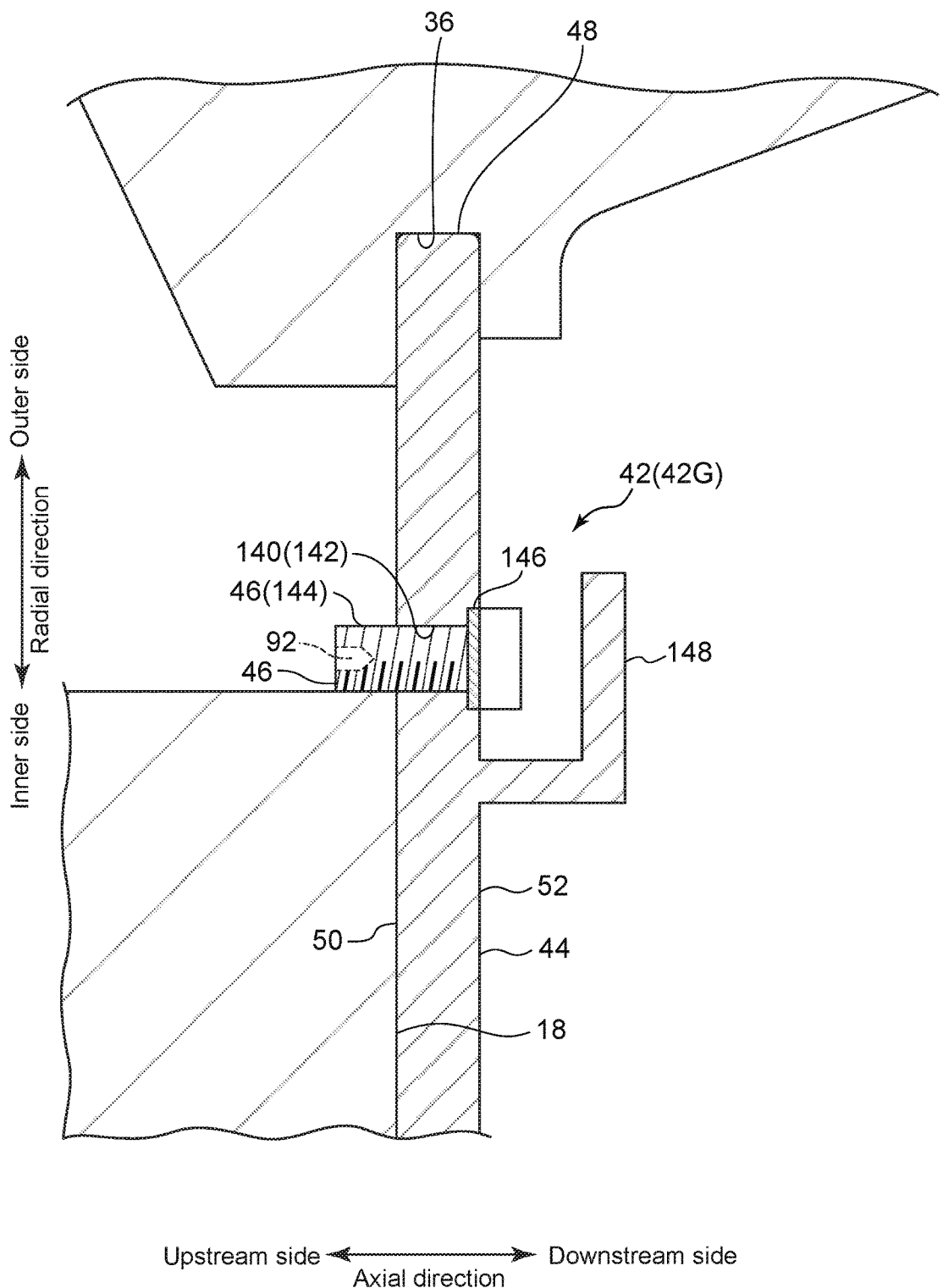
FIG. 31 is an enlarged cross-sectional view of the vicinity of a seal plate restraint part 46 (movable part) of a seal plate assembly 42(42G) according to an embodiment, taken along the axial direction.

FIG. 31 is an enlarged cross-sectional view of the vicinity of a seal plate restraint part 46 (movable part) of a seal plate assembly 42(42G) according to an embodiment, taken along the axial direction.

In the embodiment shown in FIG. 31, the seal plate 44 includes a female thread 142 provided in a through hole 140 which penetrates the seal plate 44 in the axial direction, and the seal plate restraint part 46 is configured as a male thread (screw) 144 screwed with the female thread 142. The male thread 144 has an axial length longer than that of the female thread 142. The leading end (axially upstream end) of the male thread 144 is provided with a jig engagement portion 92 capable of engaging with a jig for rotating the male thread. Further, the seal plate assembly 42(42G) includes a washer 146 disposed between the head of the male thread 144 and the seal plate 44.

With the above configuration, by screwing the male thread 144 into the female thread 142 from the downstream side in the axial direction, the male thread 144 penetrates the seal plate 44 and the leading end of the male thread 144 protrudes upstream in the axial direction from the seal plate 44. The seal plate 44 has a receiving part 148 for preventing the male thread 144 from falling from the seal plate 44 on the downstream side in the axial direction. The receiving part 148 has an L-shaped cross-section composed of a protruding portion protruding downstream in the axial direction from a position of the seal plate 44 more radially inward than the through hole 140 and an extending portion extending radially outward from the downstream end of the protruding portion. This seal plate assembly 42 has a simpler structure than some seal plate assemblies 42(42A, 42B, 42D, 42E) described above in that it does not include the biasing part.

Figure 32:
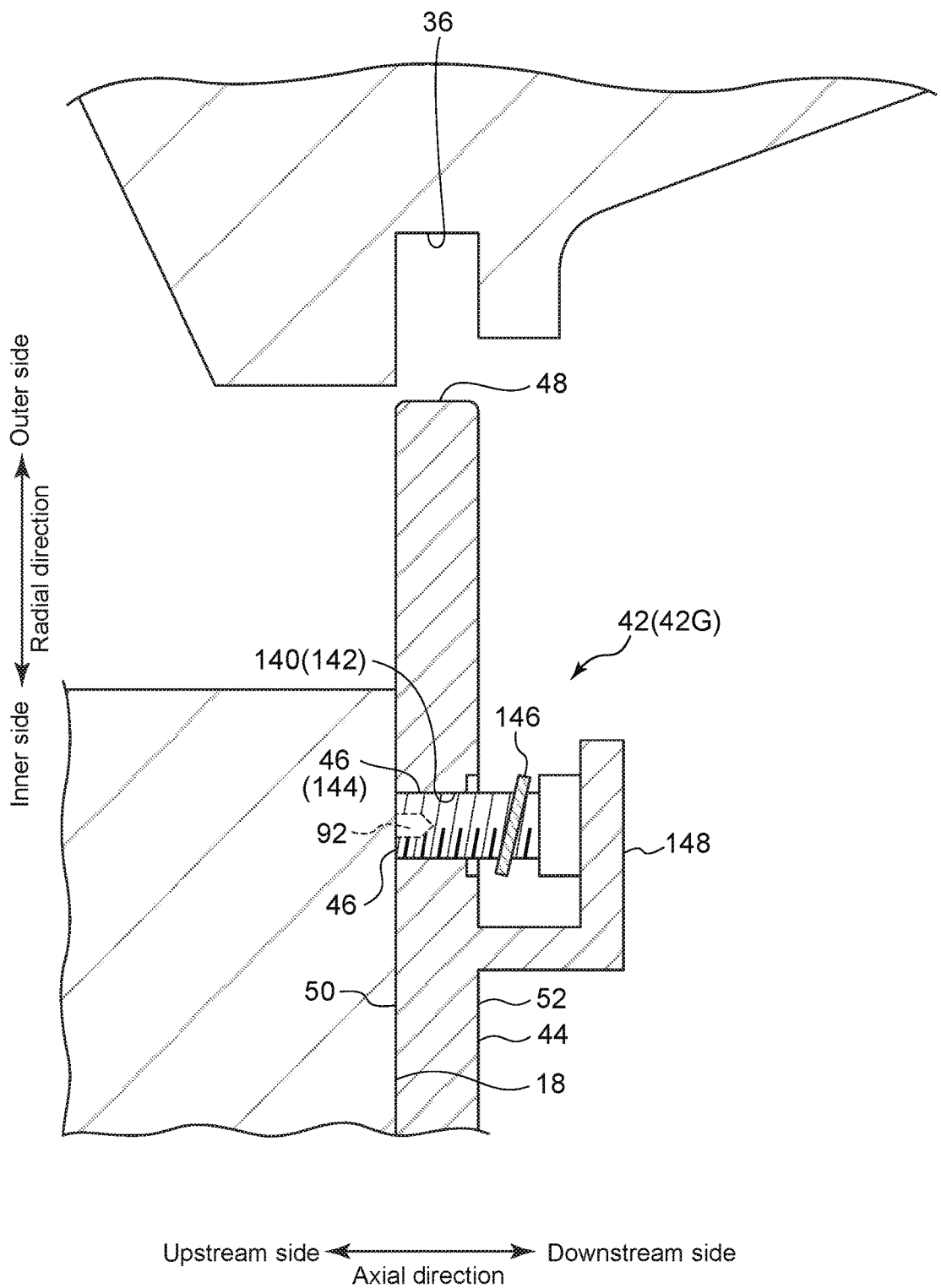
FIG. 32 is an enlarged cross-sectional view of the vicinity of a seal plate restraint part 46 (movable part) of a seal plate assembly 42(42G) according to an embodiment, taken along the axial direction.

In this seal plate assembly 42, by operating the jig engagement portion 92 of the male thread 144 from the upstream side in the axial direction to rotate the male thread 144, the male thread 144 can be moved along the axial direction. Thereby, it is possible to switch between the seal plate non-restraint state (see FIG. 32) where the male thread 144 does not restrict movement of the seal plate 44 in the radial direction and the seal plate restraint state (see FIG. 31) where at least a part of the male thread 144 protrudes in the axial direction from the seal plate 44 and thereby restricts movement of the seal plate 44 in the radial direction.

The above-described seal plate assemblies 42(42A to 42G) according to some embodiments switch between a state where the seal plate restraint part 46 does not engage with the rotor disc 18 and a state where the seal plate restraint part 46 engages with the rotor disc 18 by moving the seal plate restraint part 46 along the axial direction, thereby enabling switching between the seal plate restraint state and the seal plate non-restraint state.

In contrast to them, the following seal plate assemblies 42 according to some embodiments switch between a state where the seal plate restraint part 46 does not engage with the seal plate 44 and a state where the seal plate restraint part 46 engages with the seal plate 44 by moving the seal plate restraint part 46 along the axial direction, thereby enabling switching between the seal plate restraint state and the seal plate non-restraint state.

Figure 33:
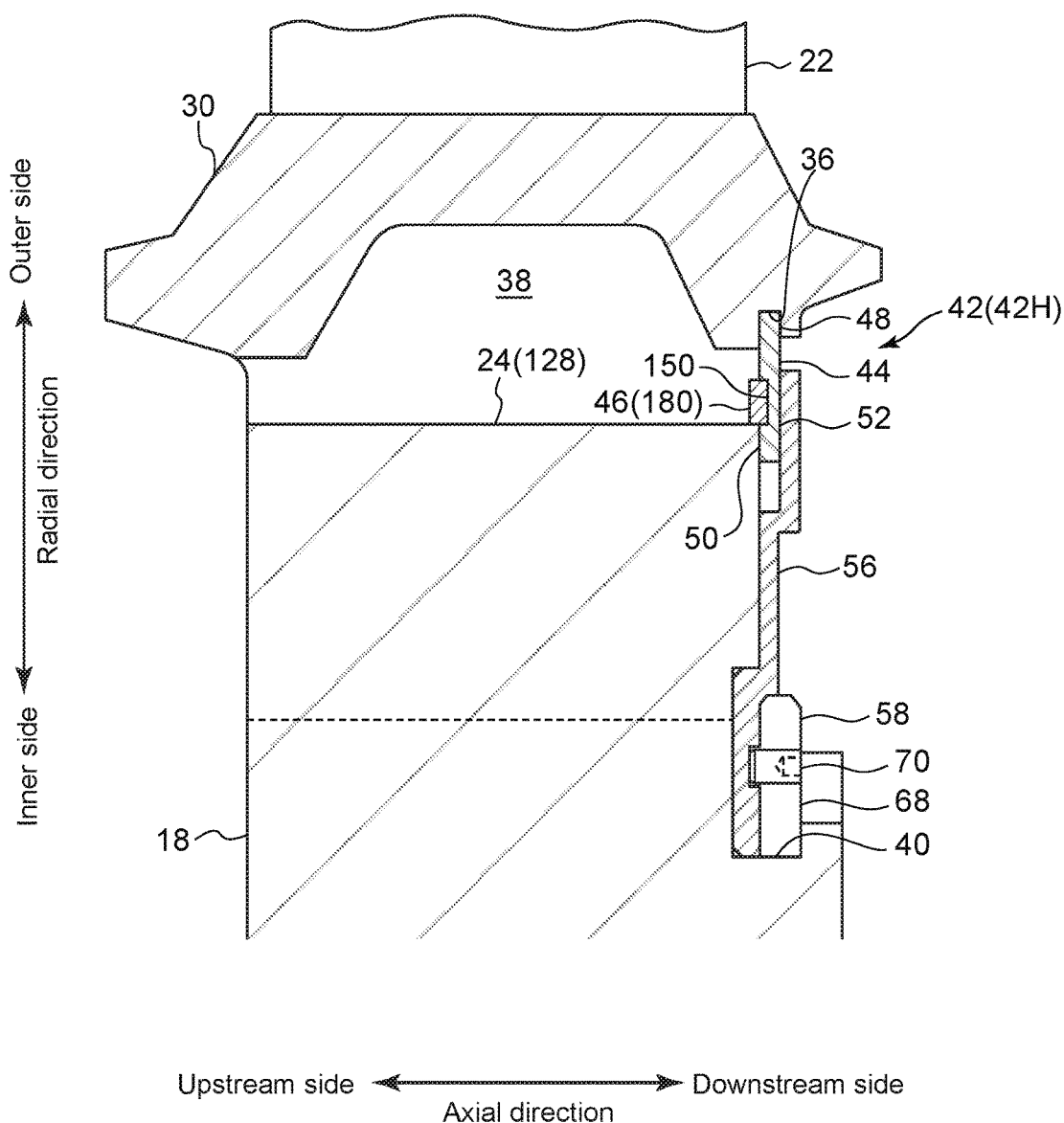
FIG. 33 is a diagram for describing the configuration of a seal plate assembly 42(42H) according to an embodiment, which shows a partial cross-section of a gas turbine rotor 16 taken along the axial direction.

FIG. 33 is a diagram for describing the configuration of a seal plate assembly 42(42H) according to an embodiment, which shows a partial cross-section of the gas turbine rotor 16 taken along the axial direction.

The seal plate assembly shown in FIG. 33 includes a seal plate 44 and a seal plate restraint part 46 configured as a seal plate fall prevention piece 180 (recess engagement member). The seal plate 44 has a first surface 50 and a second surface 52 which face in opposite directions, as in the above embodiments. The first surface 50 faces upstream in the axial direction, while the second surface 52 faces downstream in the axial direction.

In the embodiment shown in FIG. 33, a recess 150 is formed in the first surface 50. The seal plate restraint part 46 is mounted in the recess 150 of the seal plate 44. The size of the seal plate restraint part 46 in the axial direction is larger than the depth of the recess 150 in the axial direction. Thus, in a state where the seal plate restraint part 46 is mounted in the recess 150, at least a part of the seal plate restraint part 46 protrudes in the axial direction from the seal plate 44 and thereby enables restriction of movement of the seal plate 44 in the radial direction.

Figure 34:
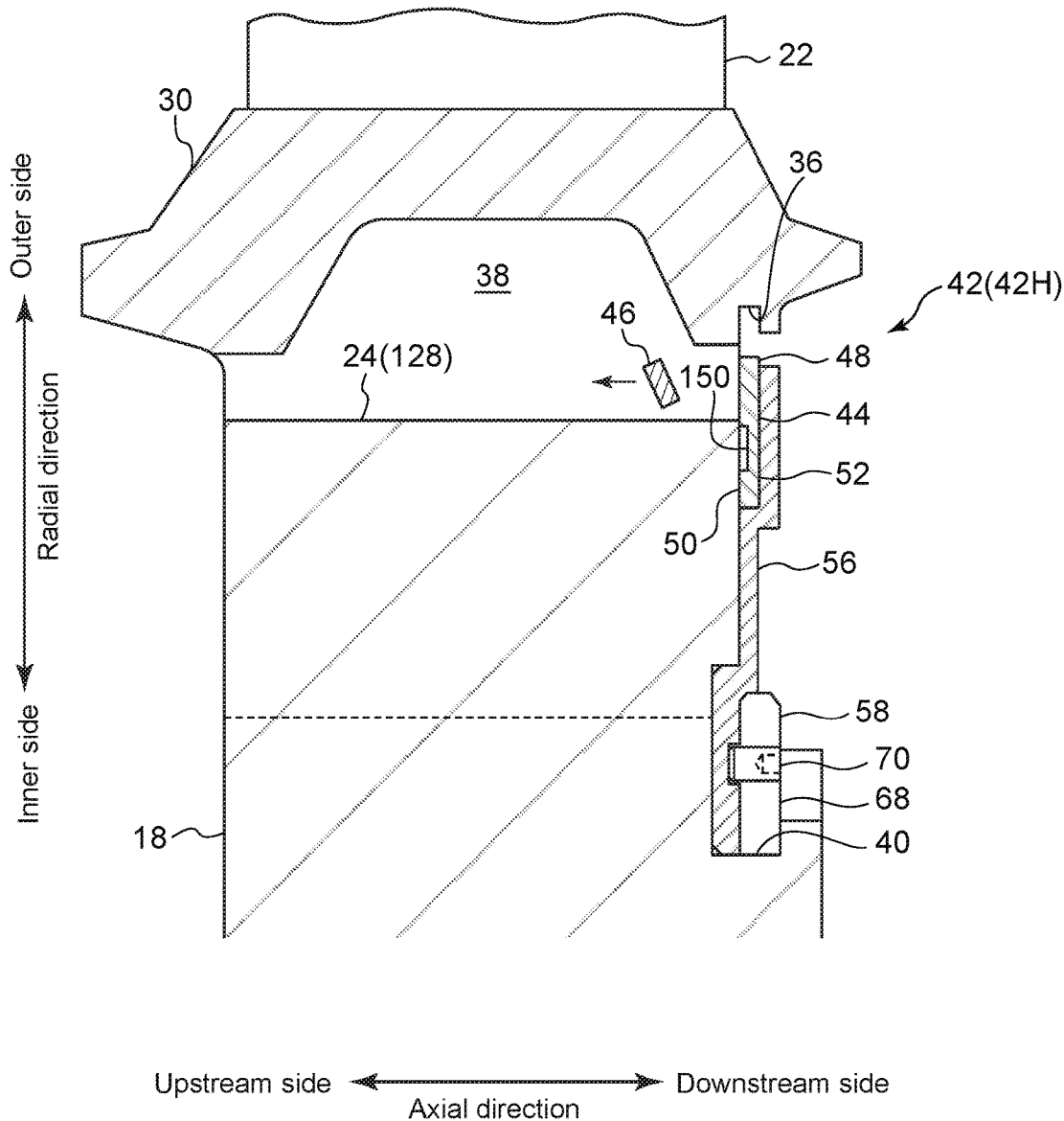
FIG. 34 is a diagram for describing the configuration of a seal plate assembly 42(42H) according to an embodiment, which shows a partial cross-section of a gas turbine rotor 16 taken along the axial direction.

With the above configuration, by removing the seal plate restraint part 46 mounted in the recess 150 of the seal plate 44 from the recess 150, or by mounting the seal plate restraint part 46 in the recess 150, it is possible to switch between the seal plate non-restraint state (see FIG. 34) and the seal plate restraint state (see FIG. 33). That is, a state where the seal plate restraint part 46 does not engage with the seal plate 44 and a state where the seal plate restraint part 46 engages with the seal plate 44 are switched by moving the seal plate restraint part 46 along the axial direction, thereby switching between the seal plate restraint state and the seal plate non-restraint state. Further, the seal plate assembly 42(42H) makes it possible to shorten the length of the seal plate 44 in the radial direction, compared to other embodiments, for instance, the seal plate assembly 42(42A). Further, the length of the locking plate 56 in the radial direction may be changed as appropriate.

Figure 35:
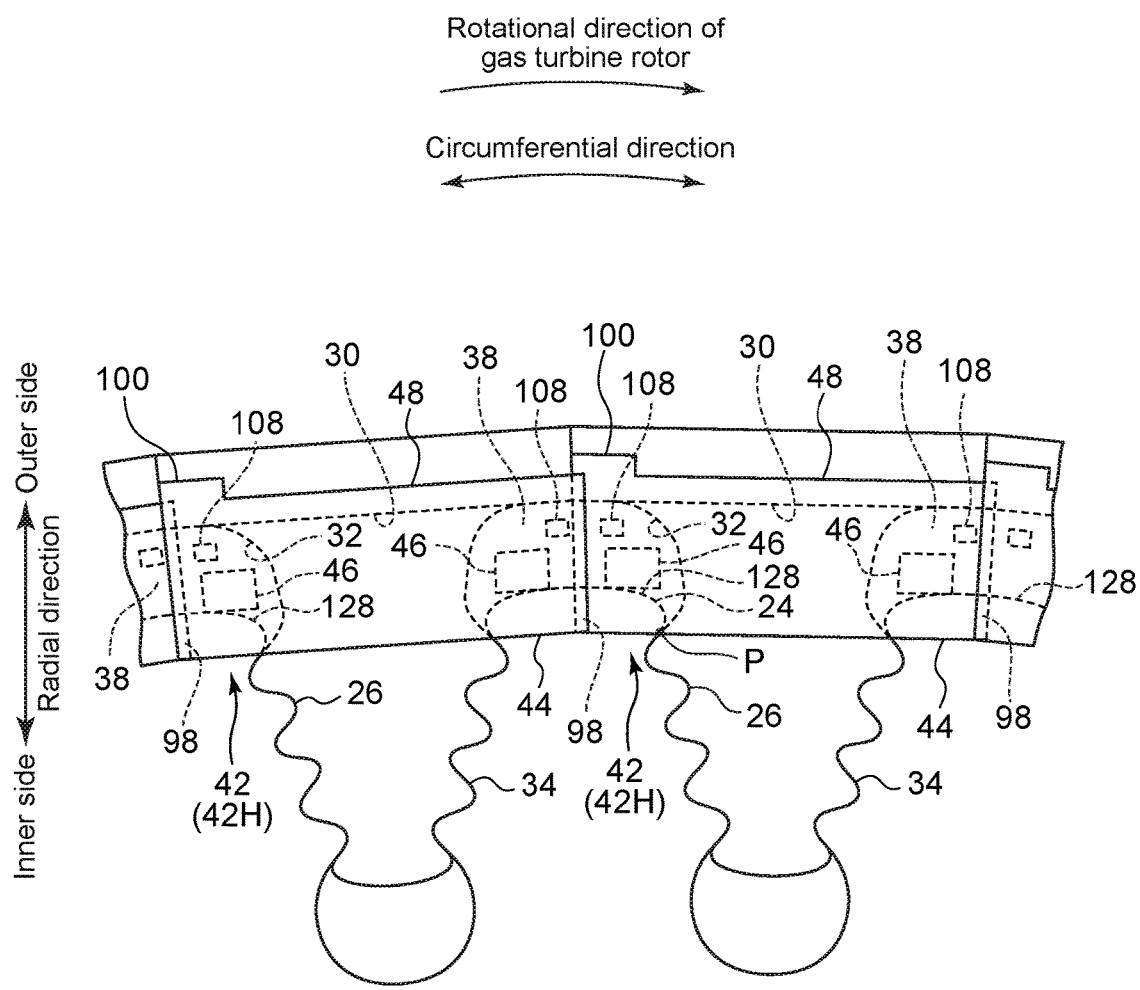
FIG. 35 is a diagram for describing the configuration of a seal plate assembly 42(42H) according to an embodiment, which shows a partial cross-section of a gas turbine rotor 16 taken along the axial direction.

In addition, as shown in FIG. 35, two or more seal plate restraint parts 46 may be mounted on the seal plate 44. In the embodiment shown in FIG. 35, each seal plate restraint part 46 is disposed so as to overlap the clearance 38 when viewed in the axial direction. Further, while, in the illustrated embodiment, the recess 150 is disposed in the vicinity of the center of the first surface 50 of the seal plate 44 in the radial direction, it is not limited thereto. The recess 150 may be disposed in a radially inner end of the first surface 50 of the seal plate 44, for instance.

Figure 36:
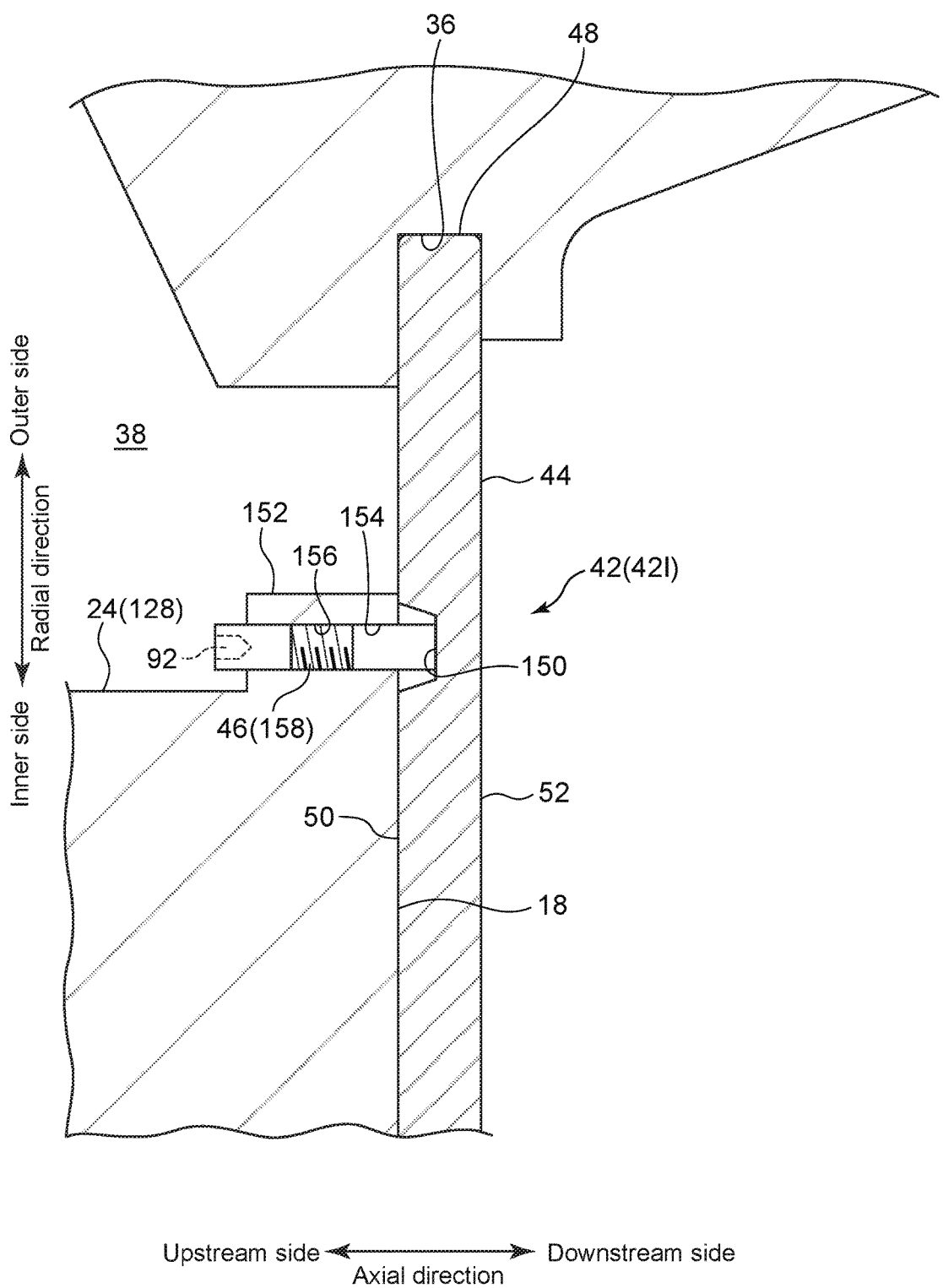
FIG. 36 is a diagram for describing the configuration of a seal plate assembly 42(42I) according to an embodiment, which shows a partial cross-section of a gas turbine rotor 16 taken along the axial direction.

FIG. 36 is a diagram for describing the configuration of a seal plate assembly 42(42I) according to an embodiment, which shows a partial cross-section of the gas turbine rotor 16 taken along the axial direction.

In the embodiment shown in FIG. 36, the rotor disc 18 includes a projecting part 152 protruding radially outward along the first surface 50 of the seal plate 44. The projecting part 152 is provided with a through hole 154 penetrating in the axial direction, and a female thread 156 is formed in the through hole 154. The seal plate restraint part 46 of the seal plate assembly 42(42I) includes a male thread 158 configured to be inserted into the through hole 154 and screw with the female thread 156. An axially downstream end portion of the seal plate restraint part 46 engages with the recess 150 formed in the first surface 50 of the seal plate 44.

Figure 37:
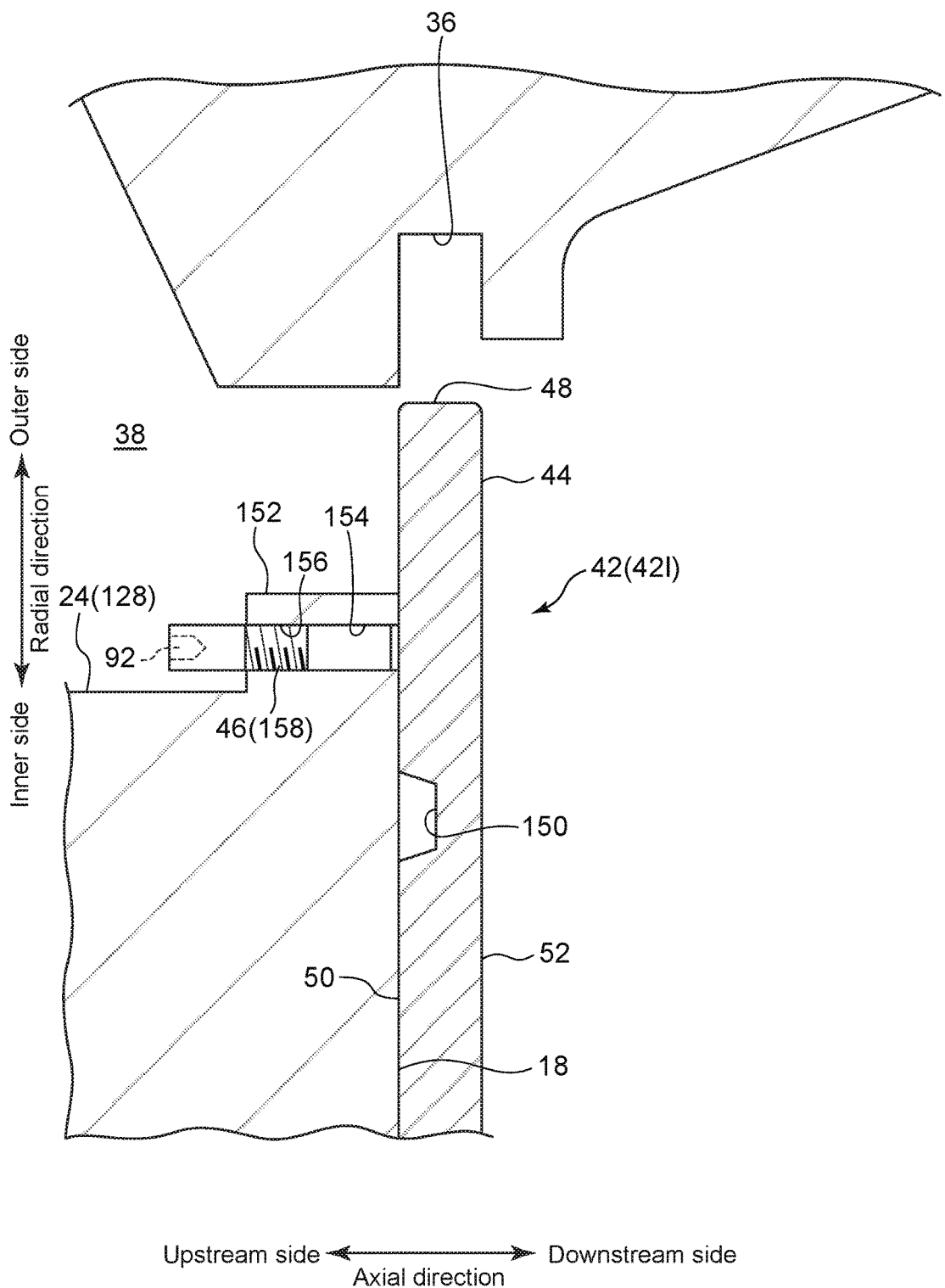
FIG. 37 is a diagram for describing the configuration of a seal plate assembly 42(42I) according to an embodiment, which shows a partial cross-section of a gas turbine rotor 16 taken along the axial direction.

With the above configuration, by rotating and moving the seal plate restraint part 46 in the axial direction while the male thread 158 provided in the seal plate restraint part 46 is screwed with the female thread 156 provided in the rotor disc 18, it is possible to switch between the seal plate non-restraint state (see FIG. 37) where the seal plate restraint part 46 does not restrict movement of the seal plate 44 in the radial direction and the seal plate restraint state (FIG. 36) where at least a part of the seal plate restraint part 46 protrudes in the axial direction from the seal plate 44 and thereby restricts movement of the seal plate 44 in the radial direction.

Figure 38:
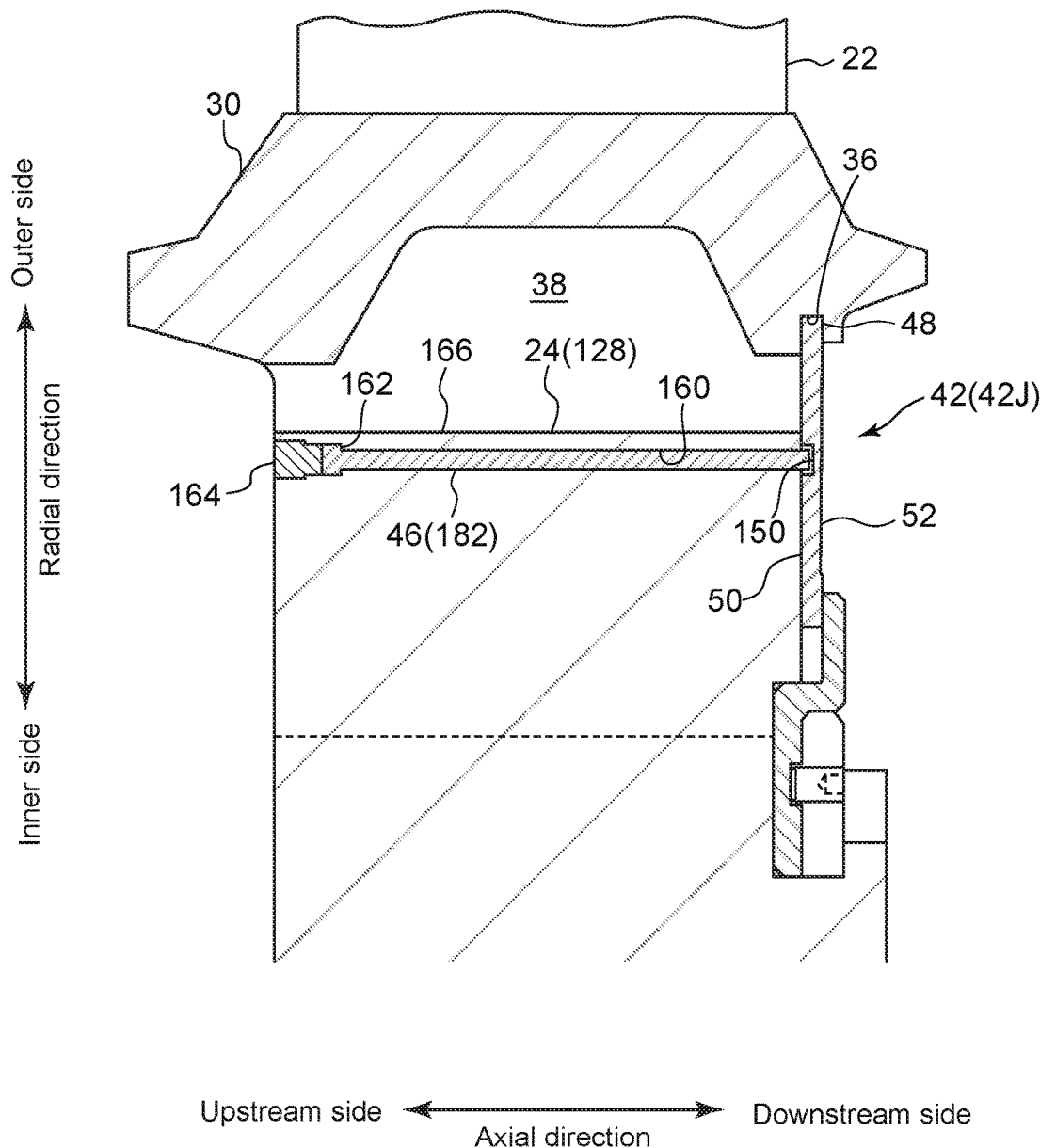
FIG. 38 is a diagram for describing the configuration of a seal plate assembly 42(42J) according to an embodiment, which shows a partial cross-section of a gas turbine rotor 16 taken along the axial direction.

FIG. 38 is a diagram for describing the configuration of a seal plate assembly 42(42J) according to an embodiment, which shows a partial cross-section of the gas turbine rotor 16 taken along the axial direction.

The seal plate assembly 42 shown in FIG. 38 includes a seal plate 44 and a seal plate restraint part 46 configured as a seal plate fall prevention pin 182 (recess engagement member). The seal plate 44 has a first surface 50 and a second surface 52 which face in opposite directions, as in the above embodiments. The first surface 50 faces upstream in the axial direction, while the second surface 52 faces downstream in the axial direction.

In the embodiment shown in FIG. 38, a recess 150 is formed in the first surface 50. Further, the rotor disc 18 has a through hole 160 penetrating in the axial direction (direction perpendicular to first surface 50). The seal plate fall prevention pin 182 is inserted into the through hole 160 and extends in the axial direction, and the leading end of the seal plate fall prevention pin 182 engages with the recess 150. The through hole 160 is provided with a stepped portion. A stepped portion 162 formed in the seal plate fall prevention pin 182 abuts on the stepped portion of the through hole 160, thereby determining the position of the seal plate fall prevention pin 182 in the axial direction. In the seal plate restraint state, while the stepped portion 162 of the seal plate fall prevention pin 182 abuts on the stepped portion of the through hole 160, the leading end of the seal plate fall prevention pin 182 engages with the recess 150 as described above. Further, a fall prevention pin cap 164 for preventing axially upstream movement of the seal plate fall prevention pin 182 is disposed on the axially upstream side of the seal plate fall prevention pin 182.

Figure 39:
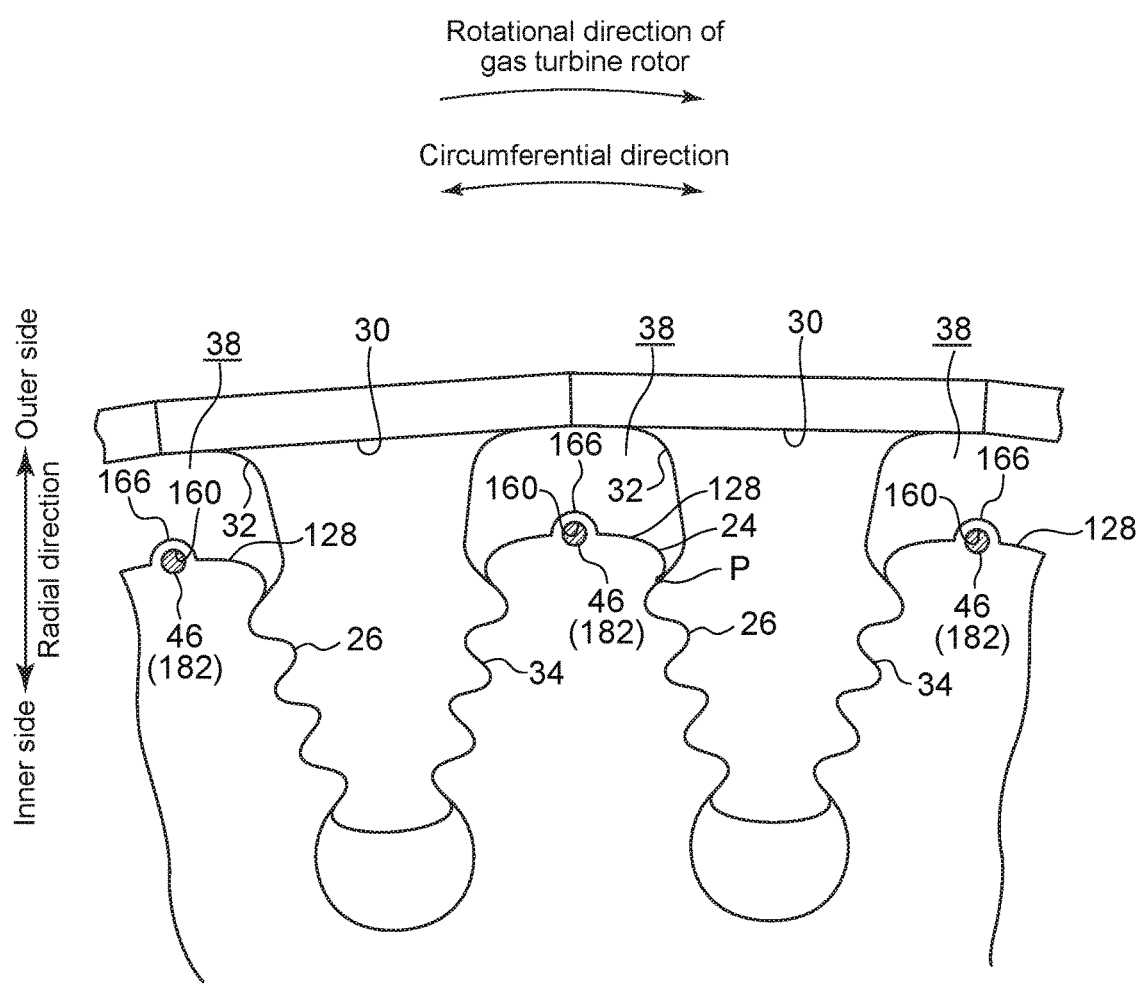
FIG. 39 is a schematic diagram showing the arrangement of seal plate restraint parts 46 of seal plate assemblies 42(42J), viewed from downstream in the axial direction.

In the embodiment shown in FIGS. 38 and 39, the region 128 on the outer peripheral surface 24 of the rotor disc 18 includes a thickened portion 166 extending in the axial direction, and the through hole 160 is formed in the thickened portion 166. In the illustrated embodiment, the seal plate fall prevention pin 182 has a circular cross-sectional shape.

Figure 40:
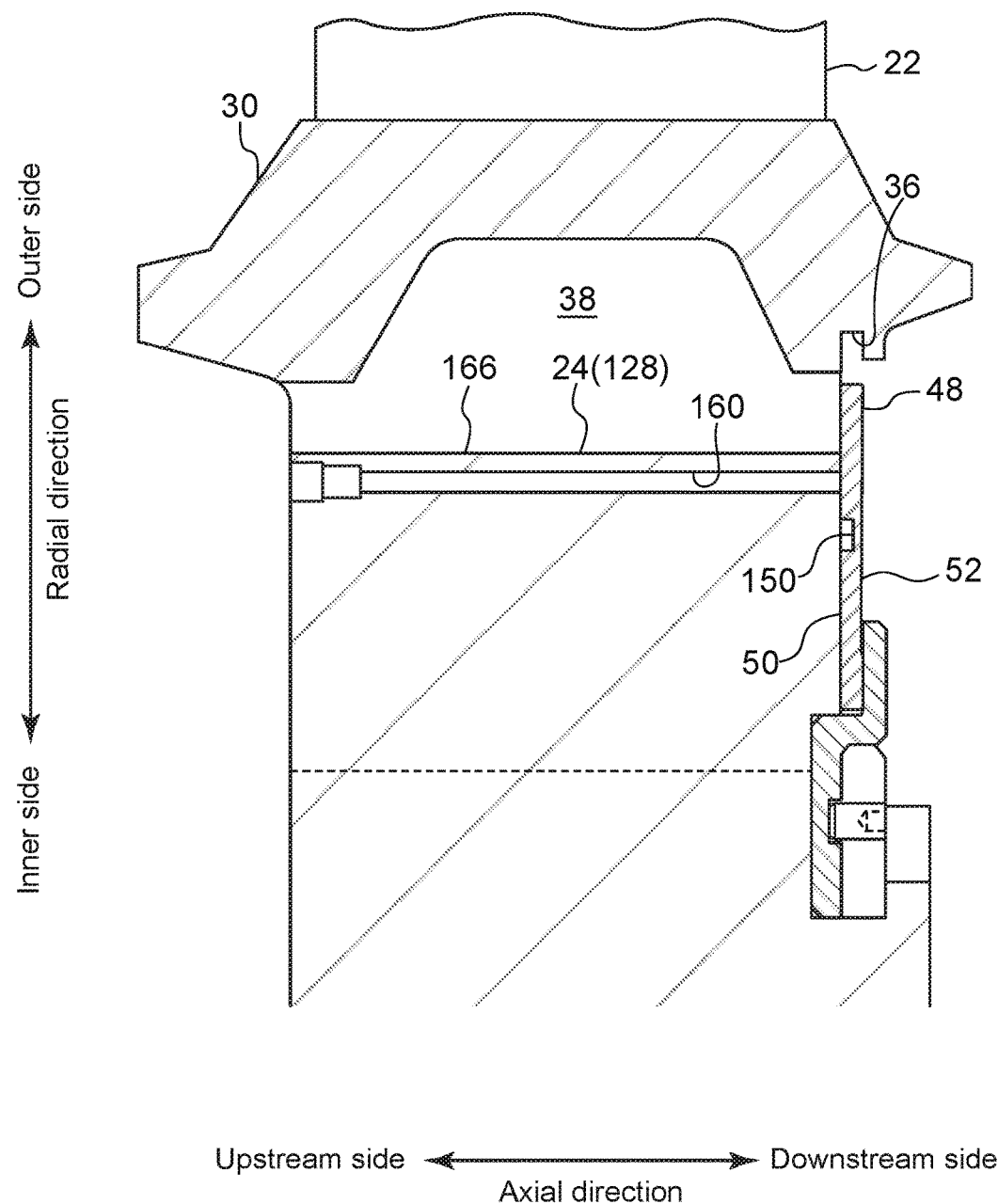
FIG. 40 is a diagram showing a state where a seal plate restraint part 46 is removed in a seal plate assembly 42(42J) according to an embodiment.

With the above configuration, by operating the seal plate fall prevention pin 182 via the through hole 160 to move the seal plate fall prevention pin 182 in the axial direction with the fall prevention pin cap 164 being detached, it is possible to switch between a state where the leading end of the seal plate fall prevention pin 182 does not engage with the recess 150 of the seal plate 44 and a state where the leading end of the seal plate fall prevention pin 182 engages with the recess 150 of the seal plate 44. Thereby, it is possible to switch between the seal plate non-restraint state (see FIG. 40) and the seal plate restraint state (see FIG. 38).

Figure 41:
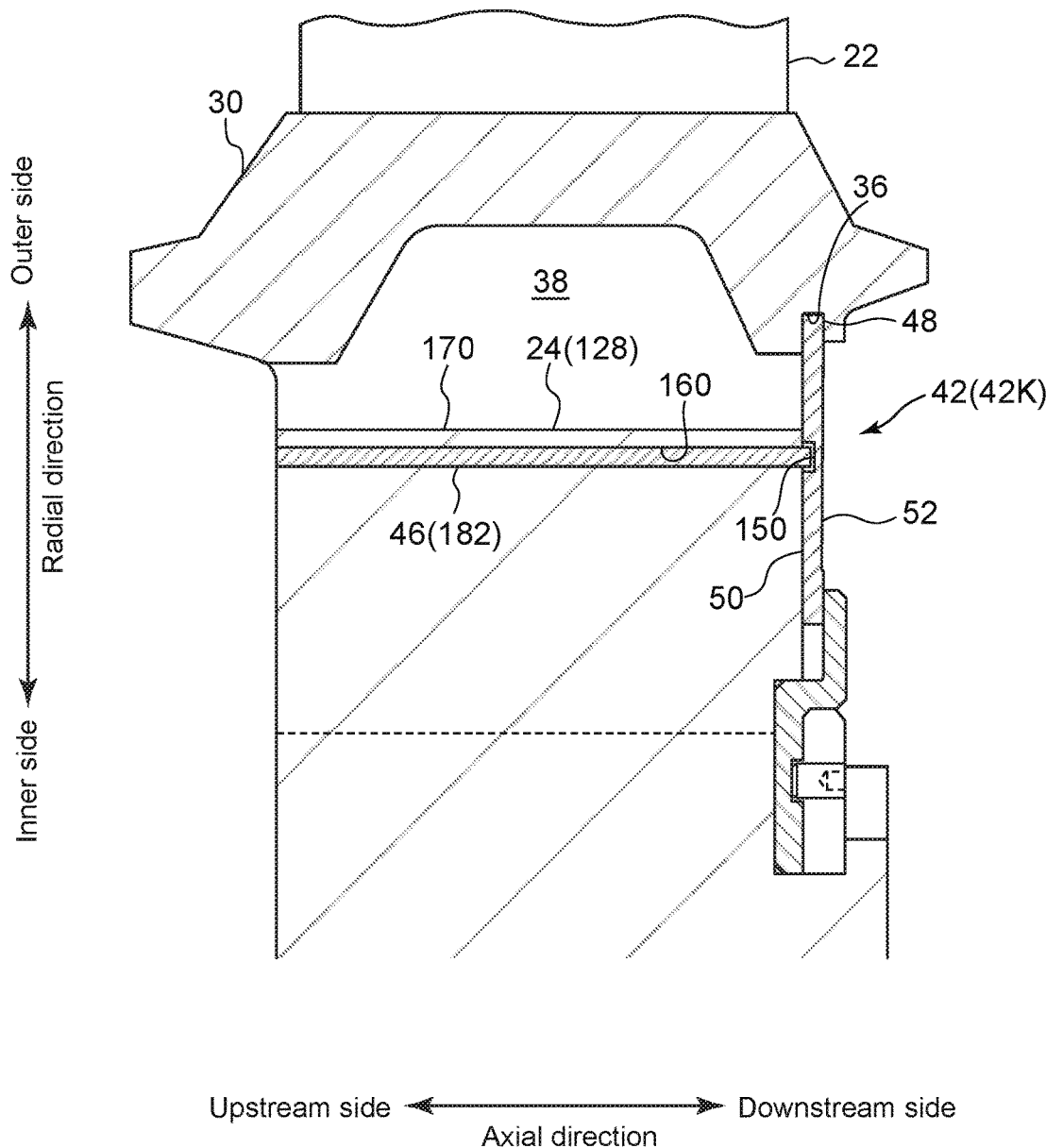
FIG. 41 is a diagram for describing the configuration of a seal plate assembly 42(42K) according to an embodiment, which shows a partial cross-section of a gas turbine rotor 16 taken along the axial direction.
Figure 42:
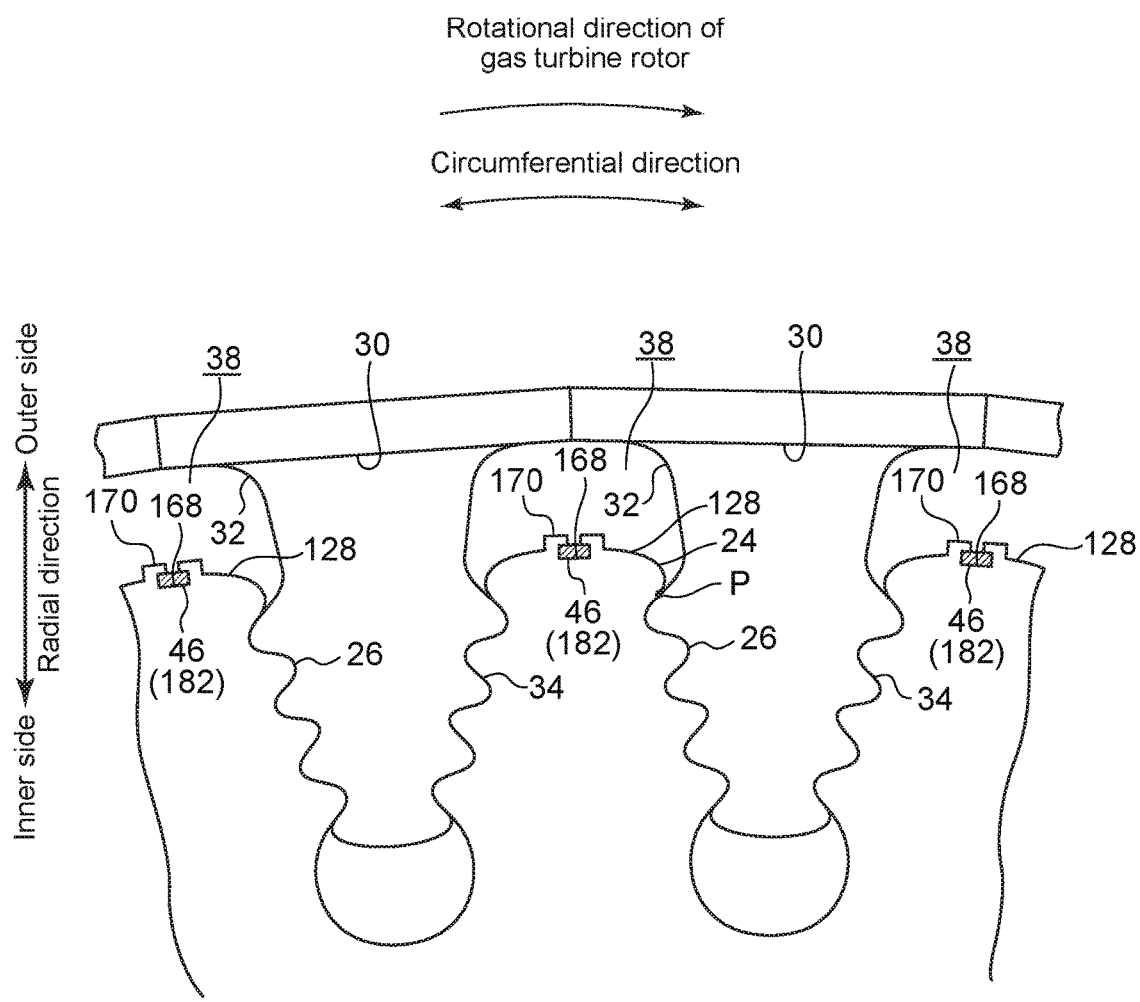
FIG. 42 is a schematic diagram showing the arrangement of seal plate restraint parts 46 of seal plate assemblies 42(42K), viewed from downstream in the axial direction.

As shown in FIGS. 41 and 42, the seal plate fall prevention pin 182 may be inserted into a pin groove part 168 formed in the region 128 on the outer peripheral surface 24 of the rotor disc 18 along the axial direction. In the embodiment shown in FIGS. 41 and 42, the pin groove part 168 has a retaining portion 170 configured to prevent the seal plate fall prevention pin 182 from falling out from the pin groove part 168 radially outward. In the illustrated embodiment, the seal plate fall prevention pin 182 has a rectangular cross-sectional shape.

With the above configuration, similarly, by moving the seal plate fall prevention pin 182 in the axial direction, it is possible to switch between a state where the leading end of the seal plate fall prevention pin 182 does not engage with the recess 150 of the seal plate 44 and a state where the leading end of the seal plate fall prevention pin 182 engages with the recess 150 of the seal plate 44. Thereby, it is possible to switch between the seal plate non-restraint state (see FIG. 42) and the seal plate restraint state (see FIG. 41).

Figure 43:
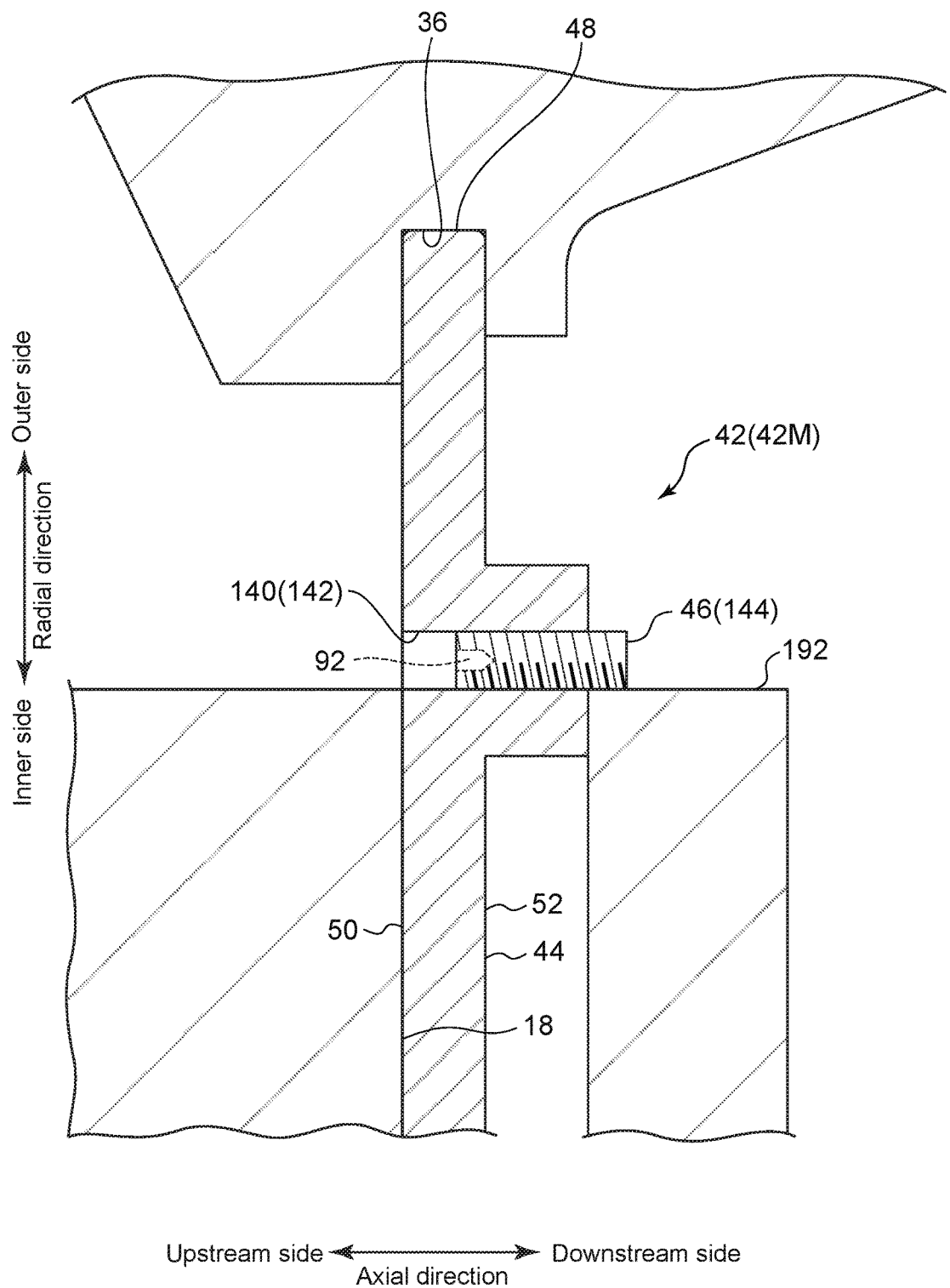
FIG. 43 is a diagram for describing the configuration of a seal plate assembly 42(42M) according to an embodiment, which shows a partial cross-section of a gas turbine rotor 16 taken along the axial direction.

FIG. 43 is a diagram for describing the configuration of a seal plate assembly 42(42M) according to an embodiment, which shows a partial cross-section of the gas turbine rotor 16 taken along the axial direction.

Figure 44:
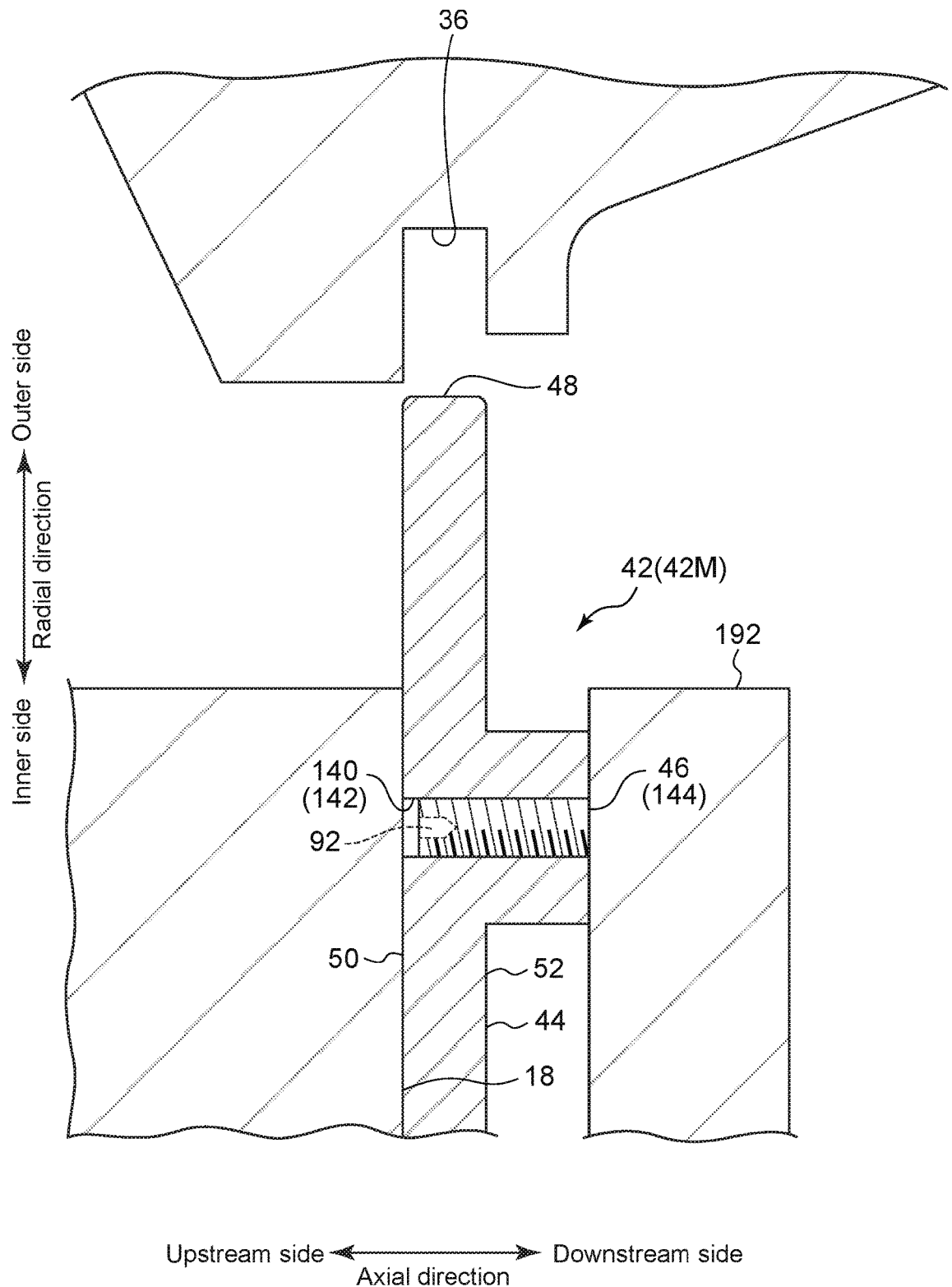
FIG. 44 is a diagram for describing the configuration of a seal plate assembly 42(42M) according to an embodiment, which shows a partial cross-section of a gas turbine rotor 16 taken along the axial direction.

The seal plate assembly 42 shown in FIG. 31 has been described as the embodiment configured so that the leading end of the male thread 144 serving as the seal plate restraint part 46 is capable of protruding upstream in the axial direction from the seal plate 44. In contract to this embodiment, the seal plate assembly 42 shown in FIG. 43 is configured so that the male thread 144 serving as the seal plate restraint part 46 is capable of protruding downstream in the axial direction from the seal plate 44. In this case, the gas turbine rotor 16 includes a support part 192 disposed downstream of the seal plate in the axial direction and configured to engage with the male thread 144. With the above configuration, by moving the male thread 144 along the axial direction to switch between a state where the male thread 144 does not engage with the support part 192 and a state where the male thread 144 engages with the support part 192, the seal plate non-restraint state (see FIG. 44) and the seal plate restraint state (see FIG. 43) are switched. The support part 192 may be a part of the rotor disc 18 or may be disposed on the rotational axis of the gas turbine rotor 16 separately from the rotor disc 18.

In the seal plate assembly 42(42M), by operating the jig engagement portion 92 of the male thread 144 from the upstream side in the axial direction to rotate the male thread 144 and move the male thread 144 along the axial direction, it is possible to switch between the seal plate non-restraint state where the male thread 144 does not restrict movement of the seal plate 44 in the radial direction and the seal plate restraint state where at least a part of the male thread 144 protrudes downstream in the axial direction from the seal plate 44 and thereby restricts movement of the seal plate 44 in the radial direction.

Although, in the above-described embodiments, the position of the seal plate restraint part 46 as viewed in the axial direction has been described with the drawings only for the seal plate assemblies 42(42A, 42G), also in the other seal plate assemblies 42(42B to 42F, 42H, 42I, 42K, M), the seal plate restraint part 46 is positioned so as to overlap the clearance 38 when viewed in the axial direction.

Thus, it is possible to operate the seal plate restraint part 46 via the wide clearance 38 to switch between the seal plate non-restraint state and the seal plate restraint state, which facilitates the switching. Consequently, it is possible to easily switch between the engagement state and the non-engagement state between the seal plate and the blade.

Figure 45:
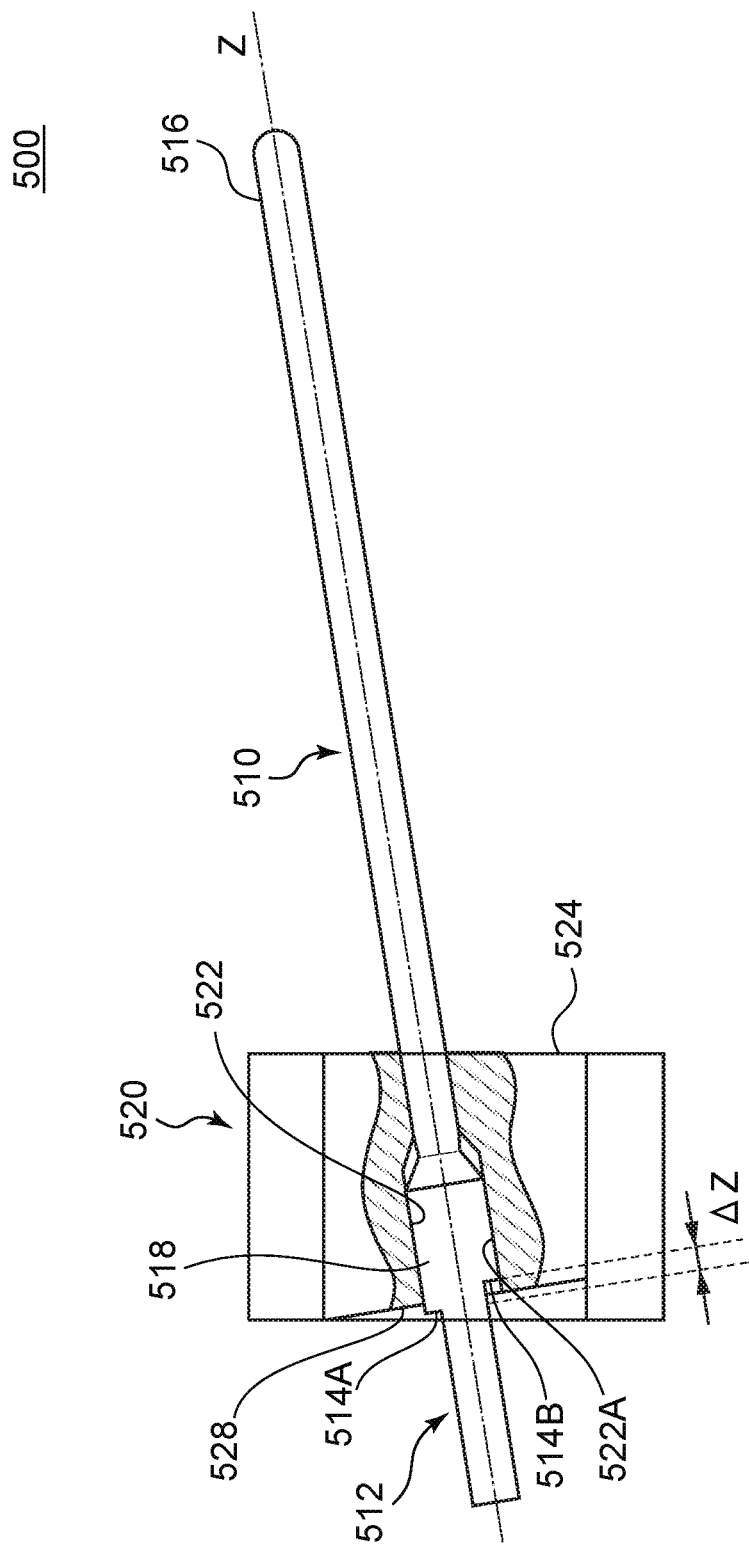
FIG. 45 is a plan view showing a configuration example of an inspection device for identifying the assembly state of a seal plate assembly 42.
Figure 46:
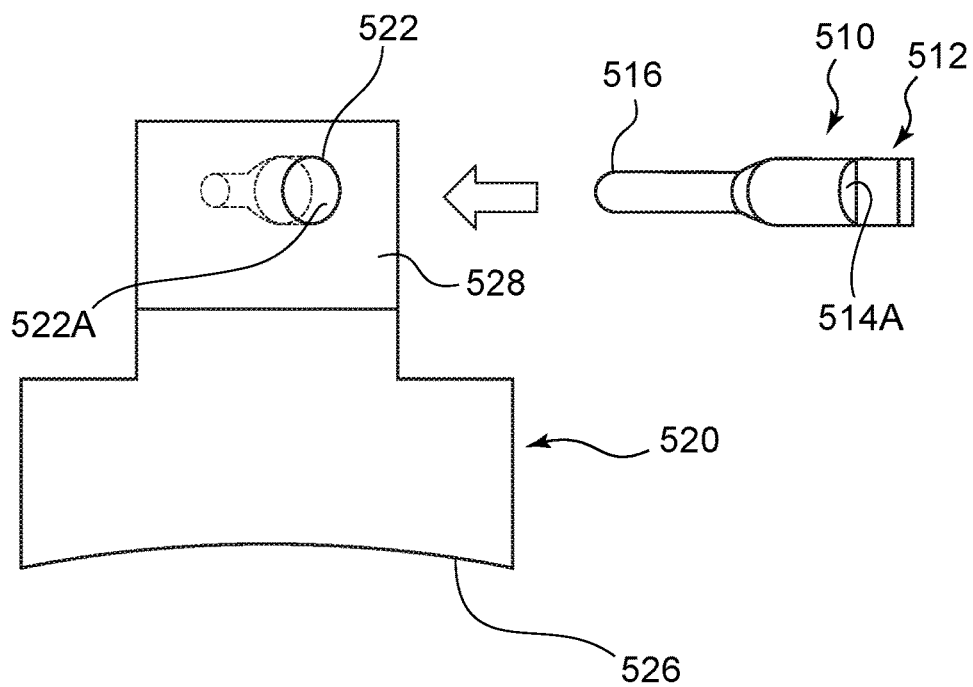
FIG. 46 is a diagram of an inspection device viewed from upstream in the insertion direction of an inspection rod.
Figure 47:
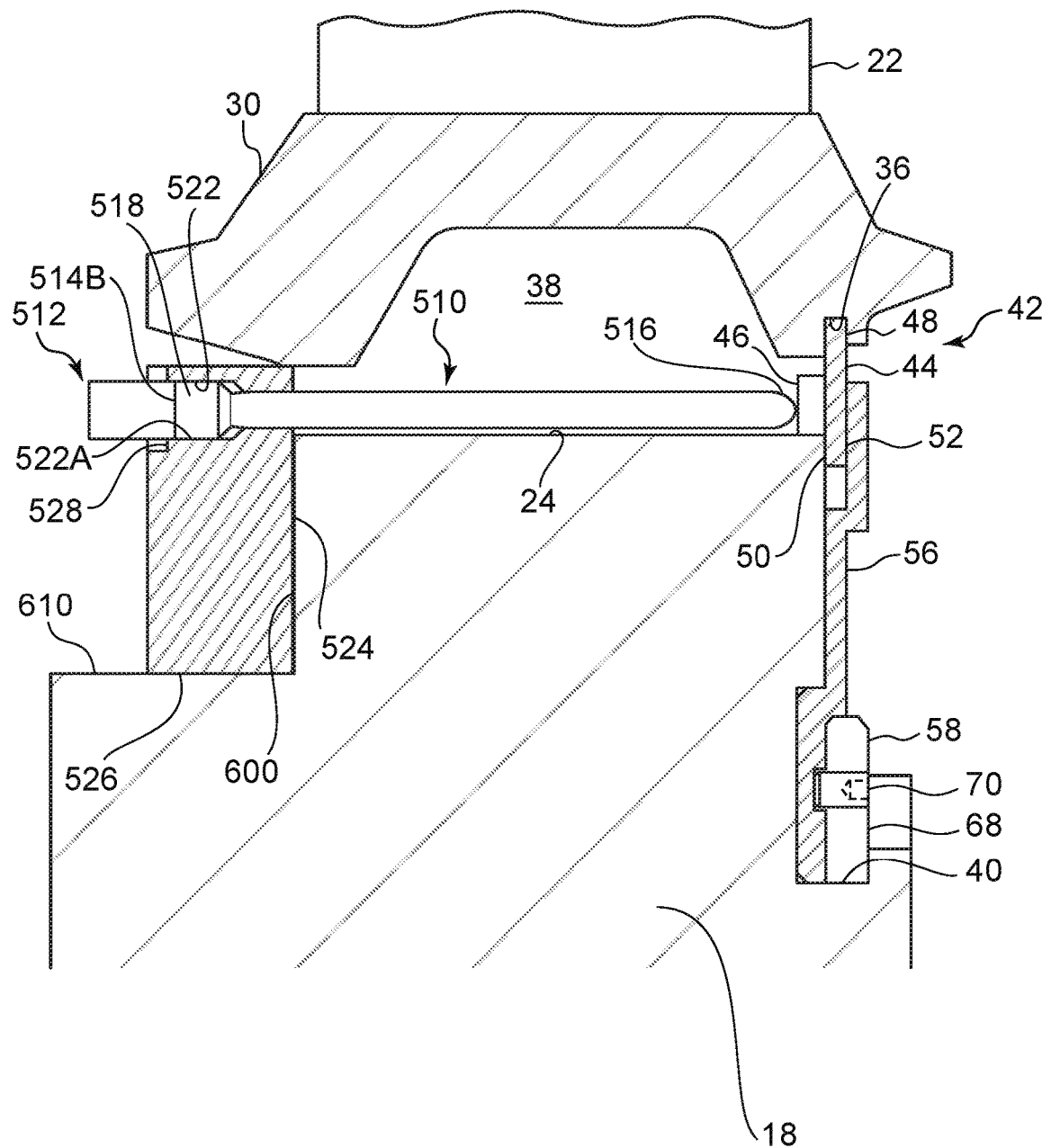
FIG. 47 is a diagram showing a usage state of the inspection device shown in FIGS. 45 and 46.

FIG. 45 is a plan view showing a configuration example of an inspection device for identifying the assembly state of the seal plate assembly 42 (which shows a partial cross-section in the vicinity of a holding hole 522 of an inspection rod holder 520). FIG. 46 is a diagram of an inspection device viewed from upstream in the insertion direction of an inspection rod. FIG. 47 is a diagram showing a usage state of the detection device shown in FIGS. 45 and 46.

The inspection device 500 shown in FIGS. 45 and 46 is used to check appropriateness of the assembly state of the seal plate assembly 42 by measuring whether the protrusion amount of the seal plate restraint part 46 of the seal plate assembly 42 from the seal plate 44 is within a predetermined range, as shown in FIG. 47.

The inspection device 500 is useful when it is difficult to directly measure the protrusion amount of the seal plate restraint part 46, and the inspection device 500 can be used for the seal plate assemblies 42(42A to 42I), for instance. Although, in the example shown in FIG. 47, the inspection target is the seal plate assembly 42(42A to 42H) including the seal plate restraint part 46 engaging with the outer peripheral surface 24 of the rotor disc 18, the seal plate assembly 42I can also be inspected by the inspection device 500. In a case where a distal end portion 516 of an inspection rod 510 described later is configured to come into contact with the seal plate restraint part 46 in the through hole 140 of the seal plate 44 of the seal plate assembly 42M, the seal plate assembly 42M can also be inspected by the inspection device 500.

In some embodiments, as shown in FIGS. 45 and 46, the inspection device 500 includes an inspection rod 510 and an inspection rod holder 520 for holding the inspection rod 510 in a predetermined orientation.

The inspection rod 510 is movable in a longitudinal direction of the inspection rod 510 relative to the inspection rod holder 520 in a state where the inspection rod 510 is restrained by the inspection rod holder 520 in a predetermined orientation. The inspection rod 510 is an elongated member longer than the clearance 38 between the shanks 32 of two circumferentially adjacent blades 22 and having a cross-sectional shape to pass through the clearance 38.

A proximal end portion 512 of the inspection rod 510 has at least one measurement surface 514(514A, 514B). The measurement surface 514 is used for determining whether the insertion depth of the inspection rod 510 into the inspection rod holder 520 is within a predetermined range during use of the inspection device 500, as described later in detail.

In the exemplary embodiment shown in FIG. 45, a pair of measurement surfaces 514A, 514B is disposed on both sides of the central axis Z of the inspection rod 510. The measurement surfaces 514A, 514B are located at different positions in the longitudinal direction of the inspection rod 510. A distance ΔZ between the measurement surfaces 514A and 514B is set to be smaller than (e.g., 0.5 times or less) the protrusion length of the seal plate restraint part 46 when the seal plate assembly 42(42A to 42H) is in the appropriate assembly state (i.e., length of engagement between seal plate restraint part 46 and outer peripheral surface 24 of rotor disc 18).

A distal end portion 516 of the inspection rod 510 is a portion which comes into contact with the seal plate restraint part 46 during use of the inspection device 500. The distal end portion 516 may be configured to be insertable into a recess (not shown in FIG. 47) provided in the seal plate restraint part 46. In this case, the distal end portion 516 of the inspection rod 510 is easily brought into contact with a predetermined portion in the recess of the seal plate restraint part 46 during use of the inspection device 500, and thus it is possible to improve the reliability of inspection.

The recess of the seal plate restraint part 46 may be the jig engagement portion 92.

The inspection rod 510 includes an enlarged diameter part 518, disposed on the distal end side of the measurement surface 514, for engaging with an enlarged diameter portion 522A of the holding hole 522. During use of the inspection device 500, the enlarged diameter part 518 of the inspection rod 510 is fitted into the enlarged diameter portion 522A of the holding hole 522, so that the orientation of the inspection rod 510 is restricted. Thus, it is possible to perform stable inspection with the inspection device 500.

On the other hand, the inspection rod holder 520 has the holding hole 522 for holding the inspection rod 510, and an axial-direction positioning surface 524 for determining the position of the inspection rod holder 520 with respect to the axial direction of the gas turbine 2 during use of the inspection device 500.

In the exemplary embodiment shown in FIG. 45, the axial-direction positioning surface 524 abuts on an axial-direction reference surface 600 (see FIG. 47) during use of the inspection device 500, and thereby enabling positioning of the inspection rod holder 520 with respect to the axial direction. The axial-direction reference surface 600 may be an axial end surface of the rotor disc 18 as in the example shown in FIG. 47, or may be an axial end surface of the shank 32 or the blade root 34 of the blade 22.

Further, the inspection rod holder 520 may include, in addition to the axial-direction positioning surface 524, a radial-direction positioning surface 526 which abuts on a radial-direction reference surface 610 during use of the inspection device 500 for positioning of the inspection rod holder 520 with respect to the radial direction. In the example shown in FIG. 47, the radial-direction reference surface 610 is provided on the rotor disc 18.

The radial-direction positioning surface 526 of the inspection rod holder 520 may have a shape corresponding to the radial-direction reference surface 610. In the example shown in FIG. 46, the radial-direction positioning surface 526 has an arc shape when viewed from upstream in the insertion direction of the inspection rod 510.

The inspection rod holder 520 has a measurement reference surface 528 in the vicinity of the opening of the holding hole 522. The measurement reference surface 528 is a surface serving as a reference to be compared with the position of the measurement surface 514(514A, 514B) of the inspection rod 510 during use of the inspection device 500.

In the example shown in FIG. 45, the measurement reference surface 528 is provided, in the vicinity of the holding hole 522, at an end surface of the inspection rod holder 520 opposite the axial-direction positioning surface 524, as a flat surface perpendicular to the axial direction of the holding hole 522. The example shown in FIGS. 45 to 47 is designed assuming that the clearance 38 between the shanks 32 of circumferentially adjacent blades 22 extends obliquely with respect to the axial direction of the gas turbine 2, and thus the measurement reference surface 528 and the axial-direction positioning surface 524 are not parallel to each other but titled at an inclination angle. However, it is not limited to this example.

When using the inspection device 500 with the above configuration, as shown in FIG. 47, first, the axial-direction positioning surface 524 and the radial-direction positioning surface 526 of the inspection rod holder 520 are brought into contact with the axial-direction reference surface 600 and the radial-direction reference surface 610, respectively, to determine the position of the inspection rod holder 520. Thus, the relative position of the measurement reference surface 528 of the inspection rod holder 520 with respect to the seal plate assembly 42 is determined.

Next, the inspection rod 510 is inserted into the holding hole 522 of the inspection rod holder 520, and the inspection rod 510 is pushed into the holding hole 522 until the distal end portion 516 of the inspection rod 510 comes into contact with the seal plate restraint part 46 of the seal plate assembly 42 via the clearance 38. When the inspection rod 510 is pushed, the enlarged diameter part 518 of the inspection rod 510 is fitted into the enlarged diameter portion 522A of the holding hole 522, so that the orientation of the inspection rod 510 is restricted. The distal end portion 516 of the inspection rod 510 may be engaged with the recess (not shown) (e.g., jig engagement portion 92) of the seal plate restraint part 46.

Further, in a state where the inspection rod 510 is inserted and the distal end portion 516 of the inspection rod 510 is in contact with the seal plate restraint part 46, it is checked whether the assembly state of the seal plate assembly 42 is appropriate, based on the relative position of the measurement surface 514(514A, 54B) of the inspection rod 510 with respect to the measurement reference surface 528 of the inspection rod holder 520.

For instance, the position of the measurement reference surface 528 of the inspection rod holder 520 may be set to be positioned between the pair of measurement surfaces 514A, 514B of the inspection rod 510 in a case where the assembly state of the seal plate assembly 42 is appropriate. Thereby, it is possible to easily check the appropriateness of the assembly state of the seal plate assembly 42. That is, if both the measurement surfaces 514A, 514B are located on a side of the measurement reference surface 528 on which the seal plate assembly 42 is positioned (i.e., if both the measurement surfaces 514A, 514B are located within the holding hole 522), it is determined that the protrusion amount of the seal plate restraint part 46 from the seal plate 44 is insufficient, and the seal plate assembly 42 is not in the appropriate assembly state. Conversely, if one measurement surfaces 514A is located on a side of the measurement reference surface 528 opposite the side on which the seal plate assembly 42 is positioned (i.e., the measurement surface 514A is located outside the holding hole 522), and the other measurement surface 514B is located on the side of the measurement reference surface 528 on which the seal plate assembly 42 is positioned (i.e., the measurement surface 514B is located within the holding hole 522), it is determined that the protrusion amount of the seal plate restraint part 46 from the seal plate 44 is within a predetermined range, and the seal plate assembly 42 is in the appropriate assembly state.

Although in the inspection device 500 with the above configuration, the appropriateness of the assembly state of the seal plate assembly 42 is determined based on the relative positional relationship between the measurement surface 514 (514A, 514B) and the measurement reference surface 528, in other embodiments, the appropriateness of the assembly state of the seal plate assembly 42 may be determined by comparing a mark provided in the inspection rod 510 with the measurement reference surface 528.

Further, although in the inspection device 500 with the above configuration, the position of the inspection rod holder 520 is not determined with respect to the circumferential direction of the gas turbine 2, in other embodiments, the device may have a function for positioning the inspection rod holder 520 in the circumferential direction. In this case, at least one of the side surfaces of two shanks 32 which are adjacent to each other in the circumferential direction via the clearance 38 may be used as a circumferential-direction reference to be brought into contact with a circumferential-direction positioning part of the inspection rod holder 520.

Embodiments of the present invention were described in detail above, but the present invention is not limited thereto, and various amendments and modifications may be implemented.

For instance, although the seal plate assemblies 42(42A to 42K, M) have been described in conjunction with the case where the seal plate assembly 42 is disposed on the downstream side of the rotor disc 18 in the axial direction, the seal plate assembly may be disposed on the upstream side of the rotor disc in the axial direction.

That is, the seal plate assembly includes a seal plate disposed on a first side of the rotor disc in the axial direction of the rotor disc, and a seal plate restraint part for restricting movement of the seal plate relative to the rotor disc in the radial direction of the rotor disc. The method for disassembling/assembling a gas turbine includes a seal-plate-restraint-state switching step of moving the seal plate restraint part along the axial direction to switch between the seal plate non-restraint state where the seal plate restraint part does not restrict movement of the seal plate in the radial direction and the seal plate restraint state where at least a part of the seal plate restraint part protrudes in the axial direction from the seal plate and thereby restricts movement of the seal plate in the radial direction.

Thus, since the seal plate non-restraint state and the seal plate restraint state are switched by moving the seal plate restraint part along the axial direction in the seal-plate-restraint-state switching step, for instance, even if force acts on the seal plate restraint part in a direction different from the axial direction of the seal plate restraint part by friction caused between the outer peripheral surface of the rotor disc and the seal plate restraint part due to vibration during operation of the gas turbine, or due to acceleration or deceleration of rotation of the rotor disc during operation of the gas turbine, the seal plate non-restraint state and the seal plate restraint state are not easily switched. Thus, it is possible to control switching between the engagement state and the non-engagement state between the seal plate and the blade at an unintended timing.

REFERENCE SIGNS LIST

2 Gas turbine
4 Compressor
6 Combustor
8 Turbine
10 Turbine casing
12 Vane row
14 Blade row
16 Gas turbine rotor
18 Rotor disc
20 Vane
22 Blade
24 Outer peripheral surface
26 Blade groove
28 Blade body
30 Platform
32 Shank
34 Blade root
36 Outer groove
38 Clearance
40 Inner groove
42 Seal plate assembly
44, 110 Seal plate
45 Plug
46 Seal plate restraint part
48, 120 Radially outer end portion
50 First surface
52 Second surface
54, 102, 118, 134, 194, 196 End surface
56 Locking plate
58 Locking piece
60 Plate body part
62 Rising part
63 Edge
64, 124 Radially inner end portion
66 Lap part
68 Plate
70 Pressing screw
72, 112 Plate part
74 Accommodation chamber
76 Accommodation chamber forming part
78 Opening
80 Wall part
82 Cylindrical part
84, 142, 156, 184 Female thread
85 Cylindrical member
86 Thread
86 Male thread
86, 144, 158, 186 Male thread
88 Brim part
90 Protruding part
92 Jig engagement portion
94 Biasing part
95 Body part
96 Brim restraint part
97 Branch part
98, 118, 162 Stepped portion
100 Projection
104, 116 Thinned portion
105, 126 Portion
108 Jig engagement recess
114, 152 Projecting part
122 Projection
128 Region
130 Nord-Lock washer
132 Strut
136 Compression restriction part
138 Facing part
140, 154, 160 178 Through hole
146 Washer
148 Receiving part
150 Recess
164 Fall prevention pin cap
166 Thickened portion
168 Pin groove part 170 Retaining portion
180 Seal plate fall prevention piece
182 Seal plate fall prevention pin
192 Support part
193 Annular spacer
500 Inspection device
510 Inspection rod
512 Proximal end portion
514 (514A, 514B) Measurement surface
516 Distal end portion
518 Enlarged diameter part
520 Inspection rod holder
522 Holding hole
522A Enlarged diameter portion
524 Axial-direction positioning surface
526 Radial-direction positioning surface
528 Measurement reference surface
600 Axial-direction reference surface
610 Radial-direction reference surface

The invention claimed is:

1. A method for disassembling/assembling a gas turbine, the gas turbine including a seal plate disposed on a first side of a rotor disc in an axial direction of the rotor disc, and a seal plate restraint part for restricting movement of the seal plate relative to the rotor disc in a radial direction of the rotor disc, the seal plate restraint part being disposed entirely on the first side of the rotor disc, the method comprising switching a state of the seal plate restraint part by moving the seal plate restraint part along the axial direction to switch between a seal plate non-restraint state where the seal plate restraint part does not restrict movement of the seal plate in the radial direction, and a seal plate restraint state where at least a part of the seal plate restraint part protrudes in the axial direction from the seal plate and thereby restricts movement of the seal plate in the radial direction, wherein the switching of the state of the seal plate restraint part includes operating the seal plate restraint part from a second side of the rotor disc, that is opposite to the first side in the axial direction, to switch between the seal plate non-restraint state and the seal plate restraint state.

2. The method for disassembling/assembling a gas turbine according to claim 1, wherein the first side in the axial direction is a downstream side of a combustion gas flow in the axial direction, and a second side in the axial direction is an upstream side of the combustion gas flow in the axial direction.

3. The method for disassembling/assembling a gas turbine according to claim 1, wherein the switching of the state of the seal plate restraint part includes operating the seal plate restraint part through a space between two adjacent blades, on a radially inner side of platforms of the two blades, to switch between the seal plate non-restraint state and the seal plate restraint state.

4. The method for disassembling/assembling a gas turbine according to claim 1,
wherein the rotor disc includes a through hole extending along the axial direction, and
wherein the switching of the state of the seal plate restraint part includes operating the seal plate restraint part via the through hole to switch between the seal plate non-restraint state and the seal plate restraint state.

5. The method for disassembling/assembling a gas turbine according to claim 1, wherein the switching of the state of the seal plate restraint part includes switching between a state where the seal plate restraint part does not engage with the rotor disc and a state where the seal plate restraint part engages with the rotor disc by moving the seal plate restraint part along the axial direction to switch between the seal plate non-restraint state and the seal plate restraint state.

6. The method for disassembling/assembling a gas turbine according to claim 1, wherein the switching of the state of the seal plate restraint part includes moving the seal plate restraint part between a position where the seal plate restraint part and the rotor disc do not overlap in the axial direction and a position where the seal plate restraint part and the rotor disc overlap in the axial direction to switch between the seal plate non-restraint state and the seal plate restraint state.

7. The method for disassembling/assembling a gas turbine according to claim 1, wherein the switching of the state of the seal plate restraint part includes rotating the seal plate restraint part while one of a female thread or a male thread provided in the seal plate restraint part is screwed with the other of the female thread or the male thread provided in the seal plate to switch between the seal plate non-restraint state and the seal plate restraint state.

8. A method for disassembling/assembling a gas turbine, the gas turbine including a seal plate disposed on a first side of a rotor disc in an axial direction of the rotor disc, and a seal plate restraint part for restricting movement of the seal plate relative to the rotor disc in a radial direction of the rotor disc, the method comprising switching a state of the seal plate restraint part by moving the seal plate restraint part along the axial direction to switch between a seal plate non-restraint state where the seal plate restraint part does not restrict movement of the seal plate in the radial direction, and a seal plate restraint state where at least a part of the seal plate restraint part protrudes in the axial direction from the seal plate and thereby restricts movement of the seal plate in the radial direction, wherein the switching of the state of the seal plate restraint part includes rotating the seal plate restraint part while one of a female thread or a male thread provided in the seal plate restraint part is screwed with the other of the female thread or the male thread provided in the seal plate to switch between the seal plate non-restraint state and the seal plate restraint state, and wherein the switching of the state of the seal plate restraint part includes moving the seal plate restraint part along the axial direction against a biasing force of a biasing part biasing the seal plate restraint part to switch from the seal plate restraint state to the seal plate non-restraint state.

9. The method for disassembling/assembling a gas turbine according to claim 1, wherein the switching of the state of the seal plate restraint part includes switching between a state where the seal plate restraint part does not engage with the seal plate and a state where the seal plate restraint part engages with the seal plate to switch between the seal plate non-restraint state and the seal plate restraint state.

10. The method for disassembling/assembling a gas turbine according to claim 9,
wherein the seal plate restraint part is a seal plate fall prevention pin extending along the axial direction, and
wherein the switching of the state of the seal plate restraint part includes switching between a state where a leading end of the seal plate fall prevention pin does not engage with a recess formed in the seal plate and a state where the leading end of the seal plate fall prevention pin engages with the recess formed in the seal plate to switch between the seal plate non-restraint state and the seal plate restraint state.

11. The method for disassembling/assembling a gas turbine according to claim 9,
wherein the seal plate restraint part is a seal plate fall prevention piece, and
wherein the switching of the state of the seal plate restraint part includes removing the seal plate fall prevention piece mounted in a recess formed in the seal plate from the recess, or mounting the seal plate fall prevention piece in the recess, to switch between the seal plate non-restraint state and the seal plate restraint state.

12. The method for disassembling/assembling a gas turbine according to claim 1,
wherein the seal plate and the seal plate restraint part are formed integrally, and
wherein the switching of the state of the seal plate restraint part includes plastically deforming the seal plate restraint part to switch between the seal plate non-restraint state and the seal plate restraint state.

13. The method for disassembling/assembling a gas turbine according to claim 1, wherein the switching of the state of the seal plate restraint part includes rotating the seal plate restraint part while a male thread provided in the seal plate restraint part is screwed with a female thread provided in a through hole penetrating the seal plate to switch between the seal plate non-restraint state and the seal plate restraint state.

14. A method for disassembling/assembling a gas turbine,
the gas turbine including a seal plate disposed on a first side of a rotor disc in an axial direction of the rotor disc, and a seal plate restraint part for restricting movement of the seal plate relative to the rotor disc in a radial direction of the rotor disc,
the method comprising switching a state of the seal plate restraint part by moving the seal plate restraint part along the axial direction to switch between a seal plate non-restraint state where the seal plate restraint part does not restrict movement of the seal plate in the radial direction, and a seal plate restraint state where at least a part of the seal plate restraint part protrudes in the axial direction from the seal plate and thereby restricts movement of the seal plate in the radial direction,
wherein a jig engagement recess or a jig engagement protrusion capable of engaging with a jig is formed in a surface of the seal plate which faces toward a second side in the axial direction, and
wherein the method comprises moving the seal plate in the radial direction while the jig engagement recess or the jig engagement protrusion engages with the jig to switch between a blade non-restraint state where the seal plate does not restrict movement of a blade along the axial direction and a blade restraint state where the seal plate restricts movement of the blade along the axial direction.

15. A method for disassembling/assembling a gas turbine,
the gas turbine including a seal plate disposed on a first side of a rotor disc in an axial direction of the rotor disc, and a seal plate restraint part for restricting movement of the seal plate relative to the rotor disc in a radial direction of the rotor disc,
the method comprising switching a state of the seal plate restraint part by moving the seal plate restraint part along the axial direction to switch between a seal plate non-restraint state where the seal plate restraint part does not restrict movement of the seal plate in the radial direction, and a seal plate restraint state where at least a part of the seal plate restraint part protrudes in the axial direction from the seal plate and thereby restricts movement of the seal plate in the radial direction,
wherein the gas turbine includes a plurality of seal plate assemblies including the seal plate and the seal plate restraint part,
wherein the plurality of seal plate assemblies includes a pair of seal plate assemblies which are adjacent to each other in a circumferential direction of the rotor disc, and
wherein the method further comprises removing a pair of blades corresponding to the pair of seal plate assemblies from the rotor disc, moving other seal plates at different positions from the pair of seal plate assemblies in the circumferential direction through a space caused by removing the pair of blades, and removing the other seal plates.

16. The method for disassembling/assembling a gas turbine according to claim 1, wherein the switching of the state of the seal plate restraint part includes switching the seal plate non-restraint state and the seal plate restraint state while the rotor disc is covered on an outer side in the radial direction.

17. A method for producing a gas turbine,
the gas turbine including a seal plate disposed on a first side of a rotor disc in an axial direction of the rotor disc, and a seal plate restraint part for restricting movement of the seal plate relative to the rotor disc in a radial direction of the rotor disc, the seal plate restraint part being disposed entirely on the first side of the rotor disc,
the method comprising switching a state of the seal plate restraint part by moving the seal plate restraint part along the axial direction to switch from a seal plate non-restraint state where the seal plate restraint part does not restrict movement of the seal plate in the radial direction to a seal plate restraint state where at least a part of the seal plate restraint part protrudes in the axial direction from the seal plate and thereby restricts movement of the seal plate in the radial direction,
wherein the switching of the state of the seal plate restraint part includes operating the seal plate restraint part from a second side of the rotor disc, that is opposite to the first side in the axial direction, to switch from the seal plate non-restraint state to the seal plate restraint state.

18. The method for disassembling/assembling a gas turbine according to claim 1, wherein the switching of the state of the seal plate restraint part includes switching between a state where the seal plate restraint part does not engage with the outer peripheral surface of the rotor disc and a state where the seal plate restraint part engages with the outer peripheral surface of the rotor disc by moving the seal plate restraint part along the axial direction to switch between the seal plate non-restraint state and the seal plate restraint state.

* * * * *